(12) United States Patent
Sarihan

(10) Patent No.: US 9,037,701 B1
(45) Date of Patent: May 19, 2015

(54) SYSTEMS, APPARATUSES, AND METHODS FOR DISCOVERING SYSTEMS AND APPARATUSES

(75) Inventor: Tan Deniz Sarihan, Portland, OR (US)

(73) Assignee: Secovix Corporation, Potomac, MD (US)

( * ) Notice: Subject to any disclaimer, the term of this patent is extended or adjusted under 35 U.S.C. 154(b) by 197 days.

(21) Appl. No.: 13/101,032

(22) Filed: May 4, 2011

Related U.S. Application Data

(63) Continuation-in-part of application No. 13/098,329, filed on Apr. 29, 2011, now abandoned.

(60) Provisional application No. 61/331,334, filed on May 4, 2010, provisional application No. 61/329,502, filed on Apr. 29, 2010.

(51) Int. Cl.
 *G06F 15/173* (2006.01)
 *H04L 12/24* (2006.01)

(52) U.S. Cl.
 CPC ..................................... *H04L 41/12* (2013.01)

(58) Field of Classification Search
 CPC ..... H04L 41/12; H04L 43/0811; H04L 45/02; H04W 40/246; G06F 3/1236
 USPC .......................................................... 709/224
 See application file for complete search history.

(56) References Cited

U.S. PATENT DOCUMENTS

| | | | | |
|---|---|---|---|---|
| 5,619,615 A | * | 4/1997 | Pitchaikani et al. | 706/10 |
| 6,477,572 B1 | * | 11/2002 | Elderton et al. | 709/224 |
| 6,804,712 B1 | * | 10/2004 | Kracht | 709/223 |
| 7,853,939 B2 | * | 12/2010 | Kato et al. | 717/158 |
| 2007/0204231 A1 | * | 8/2007 | Cunningham et al. | 709/223 |
| 2008/0167899 A1 | * | 7/2008 | Agrawal et al. | 705/1 |
| 2008/0297372 A1 | * | 12/2008 | Wouters | 340/825.69 |

* cited by examiner

*Primary Examiner* — Phuoc Nguyen
(74) *Attorney, Agent, or Firm* — Marger Johnson & McCollom P.C.

(57) ABSTRACT

A machine-implemented method can include finding one or more unique commands for each of a plurality of device command sets over one or more connections, wherein the finding is based at least in part on one or more of a device model, a device type, and a device version. The method can also include creating a decision tree based at least in part on the one or more unique commands, and generating a list of identified devices based at least in part on the decision tree.

14 Claims, 56 Drawing Sheets

SYSTEMS, APPARATUSES, AND METHODS FOR DISCOVERING SYSTEMS AND APPARATUSES

RELATED APPLICATION DATA

The present application is a continuation-in-part of U.S. patent application Ser. No. 13/098,329, titled "INTENTION DETECTION AND ACTION SYSTEMS, APPARATUSES, AND METHODS" and filed on Apr. 29, 2011, which claims the benefit of U.S. Provisional Patent Application No. 61/329,502, titled "INTENTION IDENTIFICATION AND ACTION SYSTEMS, APPARATUSES, AND METHODS" and filed on Apr. 29, 2010, and U.S. Provisional Patent Application No. 61/331,334, titled "SYSTEMS, METHODS, AND APPARATUSES FOR DISCOVERING COMMUNICATION SYSTEMS" and filed on May 4, 2010, all of which are fully incorporated by reference herein.

FIELD

The present systems, apparatuses, methods explained in this document relates to directory systems, discovery systems, information sharing, cryptography, controlling singularity and plurality of systems, apparatuses, devices.

BACKGROUND

Operating communication apparatuses or systems involves multiple steps.

For example to call a party or multiple parties, operator of a video conferencing apparatus needs to collect connection information for the video conferencing apparatus or apparatuses that belongs to other party. This may be phone number, ISDN number, IP address.

Once operator finds the address, operator needs to find other information like connection speed, protocols supported and compare it to local video conferencing apparatus capabilities to make sure conference call may happen between two apparatuses.

Sometimes operator makes a manual test call before the actual call to make sure everything works.

Some people might want to have technical people have available before and during the call to make sure call will go through and there are no problems during the call.

Sometimes it may be impossible to or hard the find all the info needed to make a conference call because each party may not have that information readily available or people who have the information may not be available to provide it.

The more the steps involved, the less likely may be the technology adoption and return on investment of such systems, and possible operator errors may increase.

Systems, apparatuses, methods to reduce the number of steps to achieve a certain intent and complexity have been introduced in the past.

For example use of directory systems is a way to improve usability of a system.

Certain systems, apparatuses may read and write certain data that is connected to an external database, like reading an address book from corporate servers and adding new addresses to that centralized corporate servers.

All these systems, apparatuses need some sort of manual input and has interoperability issues.

SUMMARY

The systems, apparatuses, methods explained in this document advances the current art by introducing discovery apparatus which performs automatic identification and recognition of the connected apparatuses, systems which may include at least one or more of communication apparatuses, office automation system apparatuses, home automation apparatuses, e-mail apparatuses, calendaring apparatuses, multipoint conferencing apparatuses, web conferencing apparatuses, video conferencing apparatuses, audio conferencing apparatuses, telephone systems, apparatuses that allows multiple parties to communicate with each other, apparatuses that allows controlling behavior of other apparatuses.

Once identified and recognized by discovery apparatus, communications mapping apparatus finds the capabilities of apparatuses that are found, resolves any conflicts with some or no user input, and makes the capabilities of the apparatuses, systems available to controlling systems which control those apparatuses and systems.

Policy apparatuses which may be standalone or part of the apparatuses, may help implement legal or company policy requirements or preferences with each one of the apparatuses mentioned.

The capabilities may be made publicly accessible by making a lookup system available for other systems, apparatuses, parties to lookup the information.

The capabilities may be made public by publishing the lookup information to public sharing apparatuses, other systems, apparatuses, parties to lookup the information.

Root server connector apparatus may register access information for different apparatuses in the organization to root servers so other organizations may find how to access the organization.

Root server policy apparatus, which may be standalone or part of root server apparatus, may protect root server from unauthorized registrations and access.

Capabilities and limitations of systems in different organizations may be automatically found by utilizing root servers which points to lookup and publishing servers for the resources in the organization being looked for.

Pooling apparatus may allow pooling of resources such as conference rooms so any one of the resources in the pool may be allocated and used on demand or by schedule.

Security implementations like usernames, passwords, certificate, certificate authorities may provide secure access and authorization between apparatuses.

Proxy lookup apparatuses may serve as a public facing apparatus allowing organizations to keep lookup apparatuses internal and have different policies.

Proxy lookup apparatuses may also provide caching and save computing resources.

In an ideal case, abovementioned apparatuses one or more individual apparatuses per apparatus type to provide more processing power and redundancy. In certain embodiments each one or more of the abovementioned apparatuses may be combined into one apparatus, which may provide space and cost savings.

In a full implementation of above apparatuses, a person's video conferencing apparatus may find information to make a video call from any conference room in their organization to multiple party or parties in any conference room in their respective organizations with minimal or no input from the user and video conferencing apparatus proceeds to call using the information obtained automatically, all the while optionally making sure such a call, costs and technical equipment and communication lines being used are in line with the policy of organizations, which may improve the adoption of such systems and may make them enjoyable to use.

BRIEF DESCRIPTION OF DRAWINGS

The novel features of the systems, apparatuses, methods explained in this document are set forth in the appended claims. However, for explanation purposes, several embodiments of the systems, apparatuses, methods are presented in the following figures.

DETAILED DESCRIPTION

In the following description, numerous details are given for purpose of explanation. However, one of ordinary skill in the art will realize that the systems, apparatuses, methods may be practiced without the use of these specific details. In other instances, well known structures and devices are shown in abbreviated form in order not to obscure the description of the systems, apparatuses, methods with unnecessary detail.

In this document detection generally refers to determining the intent which may include detecting, categorizing, identifying, recognizing the intent.

Figure 1:
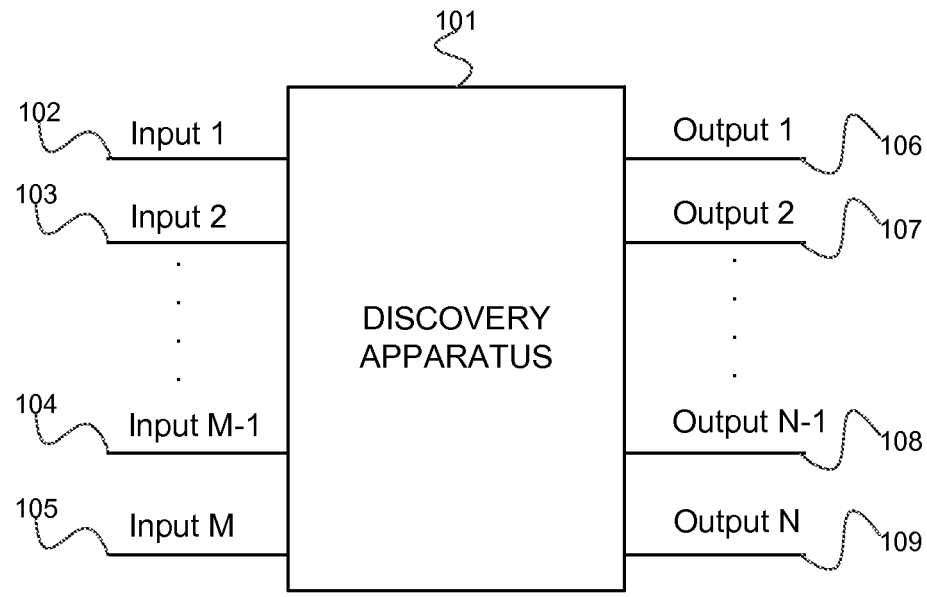
FIG. 1 illustrates a block diagram of discovery apparatus.

FIG. 1 illustrates a block diagram of discovery apparatus.

A discovery apparatus 101 may include at least one input connection, which may be labeled as input 1 102, input 2 103, numbered through input M−1 104, input M 105.

A discovery apparatus 101 may include at least one output connection, which may be labeled as output 1 106, output 2 107, numbered through output N−1 108, output N 109.

A discovery apparatus may include one or more of CPU, GPU, RAM, ROM, BIOS, firmware, storage, bus, bus controllers, switch, switch controllers, memory controller, CPU cache, memory cache, storage cache, storage, wired network I/O, wireless network I/O, I/O controller, audio I/O, storage I/O, expansion ports, local I/O, general purpose controllers, power supplies, multipurpose I/O ports, RS422 ports, RS232 ports, parallel ports, Bluetooth interfaces, infrared interfaces, relays, analog I/O ports, digital I/O ports, chassis, keyboard, mouse, display monitors, LCD displays and other hardware and software components that will make the system functional, such as using a PC based platform with Linux, or single board computers with real time operating systems.

A discovery apparatus collects various data from its data connections, data connections may be in the form of wet contact switch, dry contact switch, data communication, analog circuit state, digital circuit state, serial communication, RS422, RS232, parallel communication, wireless communication, Bluetooth, Infrared, wired communication, interfaces with other apparatuses, interfaces with other systems, TCP/IP communications, and form of communications that allows discovery apparatus to receive data from operator, environment, systems, apparatuses and other discovery apparatuses.

Figure 47:
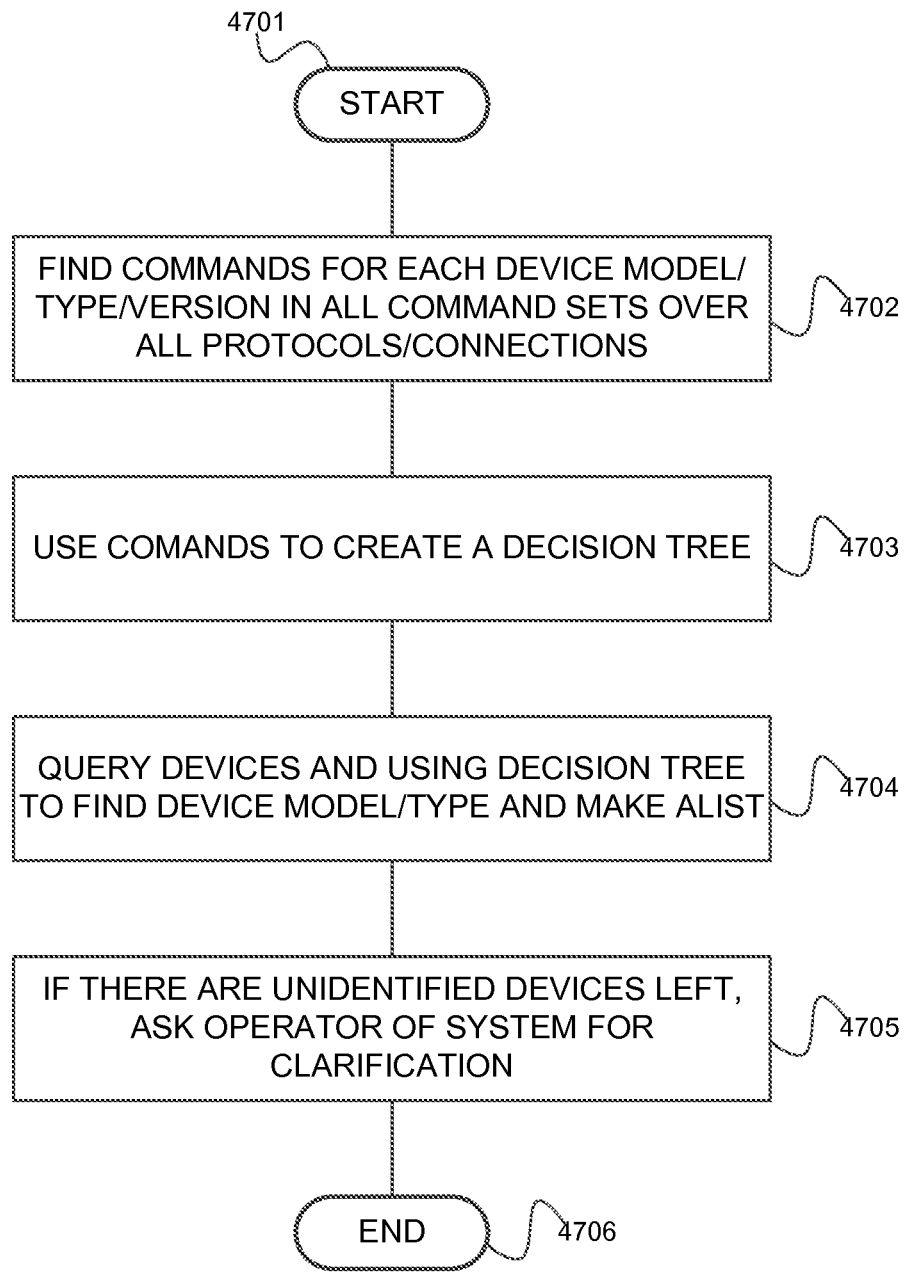
FIG. 47 illustrates an example of initial discovery method

A discovery apparatus may use discovery methods, such as the initial discovery method explained in FIG. 47.

A discovery apparatus may detect the presence of apparatuses, systems it may have information about or it may be communicating directly with or it may be communicating through another apparatus such as controlling apparatus. Such information may include whether device is connected or disconnected, whether it responds to commands.

A discovery apparatus may identify, if available, the manufacturer, model, version, firmware version of apparatuses, systems it may have information about or it may be communicating directly with or it may be communicating through another apparatus such as controlling apparatus.

A discovery apparatus may identify capabilities of apparatuses, systems it may have information about or it may be communicating directly with or it may be communicating through another apparatus such as controlling apparatus. Such information may include speeds of communication supported, number of communications channels supported, resolutions supported, connection types supported, environmental operating range.

A discovery apparatus may identify the control commands supported by apparatuses, systems it may have information about or it may be communicating directly with or it may be communicating through another apparatus such as controlling apparatus. Such information may include full command set, or partial command set, alternative command set, compatible command set, multiple command sets.

A discovery apparatus may identify information about people, resources by communicating with calendaring apparatuses, systems it may have information about or it may be communicating directly with or it may be communicating through another apparatus such as controlling apparatus. Such information may include information in calendar entries, attendee lists in calendar entries, attachments in calendar entries, scheduling, availability usage information, auditing information.

A discovery apparatus may identify information about people, resources by communicating with web conferencing apparatuses, systems it may have information about or it may be communicating directly with or it may be communicating through another apparatus such as controlling apparatus. Such information may include availability, scheduling, URLs, IP addresses, port numbers, usernames, passwords usage information, auditing information.

A discovery apparatus may identify information about people, resources by communicating with video conferencing apparatuses, systems it may have information about or it may be communicating directly with or it may be communicating through another apparatus such as controlling apparatus. Such information may include free/busy status, address book, scheduling, URLs, IP addresses, port numbers, usernames, passwords usage information, auditing information.

A discovery apparatus may identify information about people, resources by communicating with audio conferencing apparatuses, systems it may have information about or it may be communicating directly with or it may be communicating through another apparatus such as controlling apparatus. Such information may include free/busy status, address book, scheduling, phone numbers, URLs, IP addresses, port numbers, usernames, passwords, certificates, SIP addresses, gateway addresses, call manager addresses, multipoint conference unit addresses, DSP resource information, DSP utilization information usage information, auditing information.

A discovery apparatus may identify information about people, resources by communicating with multi point conferencing apparatuses, systems it may have information about or it may be communicating directly with or it may be communicating through another apparatus such as controlling apparatus. Such information may include free/busy status, address book, scheduling, phone numbers, URLs, IP addresses, port numbers, usernames, passwords, certificates, SIP addresses, gateway addresses, call manager addresses, multipoint conference unit addresses, DSP resource information, DSP utilization information usage information, auditing information.

A discovery apparatus may identify information about people, resources by communicating with e-mail apparatuses, systems it may have information about or it may be communicating directly with or it may be communicating through another apparatus such as controlling apparatus. Such information may include e-mails, contacts, availability, free/busy status, address book, scheduling, e-mail configuration, server side rules, client side rules, usage information, auditing information.

A discovery apparatus may identify information about people, resources by communicating with apparatuses, systems it may have information about or it may be communicating directly with or it may be communicating through another apparatus such as controlling apparatus, where apparatuses, systems allows one or more parties to communicate e.g. with each other. Such information may include availability, free/busy status, address book, scheduling.

A discovery apparatus may identify information about people, resources by communicating with phone or telephone apparatuses, systems it may have information about or it may be communicating directly with or it may be communicating through another apparatus such as controlling apparatus. Such information may include availability, free/busy status, address book, scheduling, phone numbers, directory information.

A discovery apparatus may identify issues about people, resources by communicating with apparatuses, systems it may have information about or it may be communicating directly with or it may be communicating through another apparatus such as controlling apparatus and communicating information about the issues with apparatuses, systems that may be involved. A discovery apparatus may take corrective action, may update its records, may inform other apparatuses about the information received, may inform other systems about the information received, may cause other apparatuses, systems to take actions that may be determined by discovery apparatus and/or other apparatuses/systems. Such issues and information may include apparatus disconnect information, system disconnect information, call disconnect information, network error information, packet loss information, error codes, crash logs, alternative route information, primary route lost information, schedule changes, availability changes, free/busy status changes, changes to address book, changes to scheduling, changes to phone numbers, changes to directory information.

A discovery apparatus may identify information about services provided by apparatuses, systems by communicating with apparatuses, systems it may have information about or it may be communicating directly with or it may be communicating through another apparatus such as controlling apparatus. Such information may include directory services, e-mail services, calendaring services, name resolution services, WINS services, DNS services, file sharing services, print services, office automation services, home automations services, lighting control services, security services, alarm services.

A discovery apparatus may identify information about pooled apparatuses, systems by communicating with apparatuses, systems it may be communicating with. Such information may include finding apparatuses that are in the same system, network, department, organization, town, city, country, geographical location.

A discovery apparatus may identify information about network apparatuses, systems by communicating with apparatuses, systems it may have information about or it may be communicating directly with or it may be communicating through another apparatus such as controlling apparatus. Such information may include IP addresses, network masks, gateways, access lists, permit lists, deny lists, firewalls, routers, switches, operating system versions, virtual private networks, redundancy information, failover information, cost, latency, jitter, round trip delay, delay, bandwidth, channels, line protocols, department, organization, town, city, country, geographical location.

A discovery apparatus may identify information about controlling apparatuses, systems by communicating with apparatuses, systems it may have information about or it may be communicating directly with or it may be communicating through another apparatus such as controlling apparatus. Such information may include IP addresses, network masks, gateways, number of ports, port types, devices connected to ports, signal levels, signal types, environmental information, interaction devices controlling system is connected to, other apparatuses controlling apparatus is connected to, other systems controlling apparatus is connected to. Such information from controlling apparatuses may also include access lists, permit lists, deny lists, firewalls, routers, switches, operating system versions, virtual private networks, redundancy information, failover information, cost, latency, jitter, round trip delay, delay, bandwidth, channels, line protocols, department, organization, town, city, country, geographical location.

A discovery apparatus may identify information about interaction apparatuses, systems by communicating with apparatuses, systems it may have information about or it may be communicating directly with or it may be communicating through another apparatus such as controlling apparatus. Such information may include IP addresses, network masks, gateways, type of interaction apparatus, software version, number of touches supported, signal levels, signal types, environmental information, information about the controlling apparatus interaction apparatus is connected to, other apparatuses interaction apparatus is connected to or communicating with, other systems interaction apparatus is connected to or communicating with.

A discovery apparatus may identify information about intention detection and action apparatuses, systems by communicating with apparatuses, systems it may have information about or it may be communicating directly with or it may be communicating through another apparatus such as controlling apparatus. Such information may include IP addresses, network masks, gateways, connection methods, communication protocols, request types.

A discovery apparatus may communicate with all apparatuses and systems it may be connected to.

A discovery apparatus may communicate with discovery apparatuses, policy apparatuses, communications mapping apparatuses, lookup apparatuses, publishing apparatuses, root server connector apparatuses, root server apparatuses, root server policy apparatuses, pooling apparatuses.

Behavior of a discovery apparatus may be modified by one or more policy apparatuses, such as to turn certain network segments off, ports off and not discover anymore if those are not used anymore.

Inputs of a discovery apparatus may pass through a policy apparatus, such as data being read from certain networks, for example certain communication devices that organizational policy does not allow to be known by other people in the organization, are filtered out by policy apparatus using networks may exemption policy and not categorized by discovery apparatus.

Outputs of a discovery apparatus may pass through a policy apparatus, such as removing some detected apparatuses by allowed device type policy if they will not be used in the system.

A discovery apparatus may communicate with a policy apparatus and may feed data to policy apparatus for policy apparatus to inspect. Discovery apparatus may decide to accept/deny a request and/or send/don't send a response based on the approval/denial message received from the policy apparatus, such as a request for CEO's video conferencing access information may not be available to every requestor.

A discovery apparatus may use queries to identify the apparatus and systems to be discovered, such as sending commands asking model, firmware version and reading responses.

A discovery apparatus may classify the information that may be stored in the discovery apparatus or by using information that is obtained from communications with other apparatus and systems, such as discovering location A locally, and receiving information about location B from discovery apparatus at location B.

A discovery apparatus may provide reference information by using information that may be stored in the discovery apparatus or by using information that is obtained from communications with other apparatus and systems, such as providing a full organizational apparatus reference database, which is collected from all discovery apparatuses in the organization.

A discovery apparatus may provide reporting information by using information that may be stored in the communications mapping apparatus or by using information that is obtained from communications with other apparatus and systems, such as providing information acting as a proxy and provide usage reports from a video conferencing apparatus, provide access methods to certain networks from communications apparatus.

A discovery apparatus may synchronize with public discovery apparatuses. An example may be providing publicly available discovery information. What may be synchronized may be dictated by company policy which may be enforced by a policy apparatus which may be working in conjunction with discovery apparatus.

A discovery apparatus may synchronize with communications mapping apparatuses in other organizations. An example may be providing publicly available discovery information. What may be synchronized may be dictated by company policy which may be enforced by a policy apparatus which may be working in conjunction with discovery apparatus.

A discovery apparatus may synchronize with other apparatuses in real time, at scheduled times, at scheduled intervals or at other time schedules or time patterns, such as synchronizing information off hours so the network traffic is reduced during business hours.

A discovery apparatus may synchronize with other apparatuses in push, pull, push/pull replication, or using other synchronization methods, such as using push/pull for more real time synchronization.

A discovery apparatus may fully or partially synchronize with one or more discovery apparatuses, such as synchronizing in full to have complete reference information.

A discovery apparatus may fully or partially synchronize with one or more communication mapping apparatuses, such as send full reference information to communications mapping apparatuses to make access maps for the communication devices in the system.

A discovery apparatus may fully or partially synchronize with one or more lookup apparatuses, such as in the case of lookup apparatus needs additional reference information or real time status update from discovery apparatus.

A discovery apparatus may fully or partially synchronize with one or more publishing apparatuses, such as in the case of publishing apparatus needs additional reference information or real time status update from discovery apparatus.

A discovery apparatus may fully or partially synchronize with one or more root server connector apparatuses, such as in the case of root server apparatus needs additional reference information or real time status of systems from discovery apparatus.

A discovery apparatus may utilize at least one or more of decision trees, data structures, statistical analysis methods, data analysis, analytics, pairwise comparison, n-tree structures, other structures and/or analysis methods that may help performing the functions of the discovery apparatus, such as finding device types at shortest time using the decision tree with device identifying queries to have a log n detect time rather than n.

A discovery apparatus may provide information to discovery apparatuses, policy apparatuses, communications mapping apparatuses, lookup apparatuses, publishing apparatuses, root server connector apparatuses, root server apparatuses, root server policy apparatuses, pooling apparatuses, such as status information of the apparatuses discovery apparatus has direct connection to.

A discovery apparatus may generate configuration and software code, such as to fix communication problems, discovery apparatus may create commands to program network access router go through another Internet connection.

A discovery apparatus may configure or program discovery apparatuses, policy apparatuses, communications mapping apparatuses, lookup apparatuses, publishing apparatuses, root server connector apparatuses, root server apparatuses, root server policy apparatuses, pooling apparatuses and other apparatuses and systems it is connected to, which may improve communicating, discovering, categorizing and building reference information functions and other functions discovery apparatus may have, such as programming the network routers to prioritize the video conferencing traffic if there is packet loss reported from the video conferencing apparatus.

A discovery apparatus may configure and program the apparatuses and systems directly or through another apparatus such as controlling apparatus, terminal server, terminal server client, console server. This may improve the function of discovery apparatus or other apparatus and systems that may be related and/or part of the system, such as using the controlling apparatus to reduce the speed of video conference call to match the video conferencing unit of the other parties.

Other apparatus or systems may request discovery apparatus to perform certain tasks it is capable of, such as collecting certain information or sending certain commands where discovery apparatus may have direct connection to apparatus but other apparatuses don't.

A discovery apparatus may store the information it may receive or send and may access that information if it is needed, such as device make and models.

A discovery apparatus may store the information it may generate and may access that information if it is needed, such as reference database.

A discovery apparatus may transfer the information it has to other apparatuses and may keep them synchronized, such as sending reference database to communications mapping apparatus or other discovery apparatuses.

A discovery apparatus may be in a redundant configuration with two or more discovery apparatuses which may help for recovery in case one of the discovery apparatuses may not perform its functions, such as two discovery apparatuses querying the same network for devices and providing reference information, in case one fails, other will continue covering the same network, increasing up time.

A discovery apparatus may be in a load balance and/or redundant configuration with two or more discovery apparatuses, which may improve the speed of discovery and providing reference information, which may help for recovery in case one of the discovery apparatuses may not perform its functions, such as having n discovery apparatuses querying the network for devices in equal segments and synchronizing with each other after the query, which would cut off discovery time by n plus overhead.

A discovery apparatus may synchronize with other apparatuses over a dedicated connection just for synchronization or a shared connection that may be used for other purposes in addition to synchronization, such as using a dedicated high speed network connection between two discovery apparatuses which might have bid reference databases that might cause network congestion and/or interfere with query ports if synchronization is done over query ports.

Information received from the discovery apparatus may be used, discarded, allowed, denied and altered by operators, apparatuses, systems and environments that may receive such information, which may be determined by limitations, operator preferences, policies, environment, situations and other factors that may affect the determination, such as a reference database sent to an apparatus may be discarded due to policy or network errors, or altered to match the database format of the receiving system.

Information received from the discovery apparatus by operators, apparatuses, systems and environments may cause the recipient or recipients to take action or actions or not to take an action, which may be determined by limitations, operator preferences, policies, environment, situations and other factors that may affect the determination, such as reference database that may be received by communications mapping apparatus may be discarded if it is not signed with correct digital signature and a digital signature is required for such information.

Figure 2:
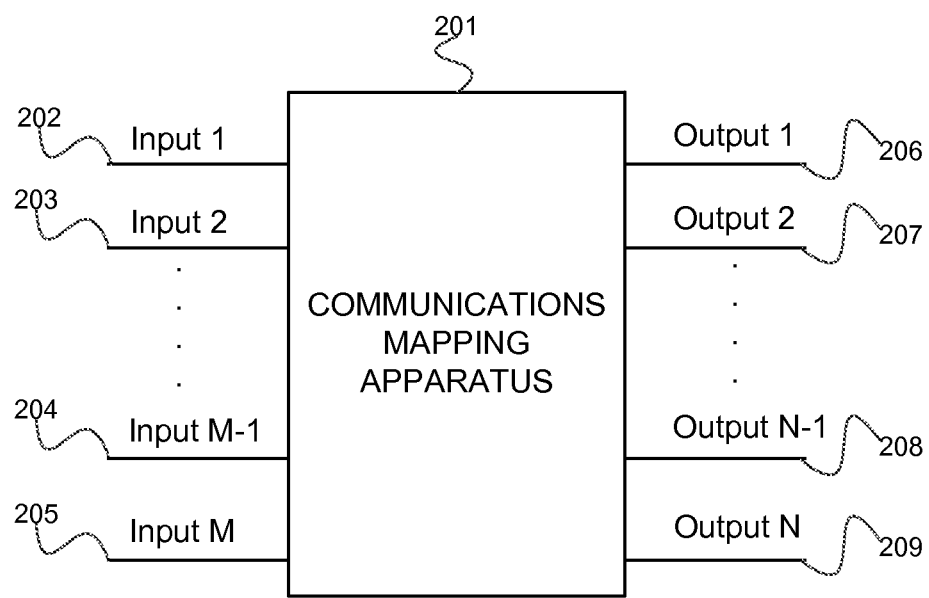
FIG. 2 illustrates a block diagram of communications mapping apparatus.

FIG. 2 illustrates a block diagram of communications mapping apparatus.

A communications mapping apparatus 201 may include at least one data connection, which may be labeled as input 1 202, input 2 203, numbered through input M−1 204, input M 205.

A communications mapping apparatus 201 may include at least one action communication connection, which may be labeled as output 1 206, output 2 207, numbered through output N−1 208, output N 209.

A communications mapping apparatus may include one or more of CPU, GPU, RAM, ROM, BIOS, firmware, storage, bus, bus controllers, switch, switch controllers, memory controller, CPU cache, memory cache, storage cache, storage, wired network I/O, wireless network I/O, I/O controller, audio I/O, storage I/O, expansion ports, local I/O, general purpose controllers, power supplies, multipurpose I/O ports, RS422 ports, RS232 ports, parallel ports, Bluetooth interfaces, infrared interfaces, relays, analog I/O ports, digital I/O ports, chassis, keyboard, mouse, display monitors, LCD displays and other hardware and software components that will make the system functional, such as PC based systems, or other industrial or commercial grade systems with common operating systems such as Linux, Windows or special real time operating systems.

A communications mapping apparatus collects various data from its data connections, data connections may be in the form of wet contact switch, dry contact switch, data communication, analog circuit state, digital circuit state, serial communication, RS422, RS232, parallel communication, wireless communication, Bluetooth, Infrared, wired communication, interfaces with other apparatuses, interfaces with other systems, TCP/IP communications, and form of communications that allows communications mapping apparatus to receive data from operator, environment, systems, apparatuses and other communications mapping apparatuses, such as a redundant connection to apparatuses discovery apparatus may be connecting to for extended capabilities queries.

Figure 50:
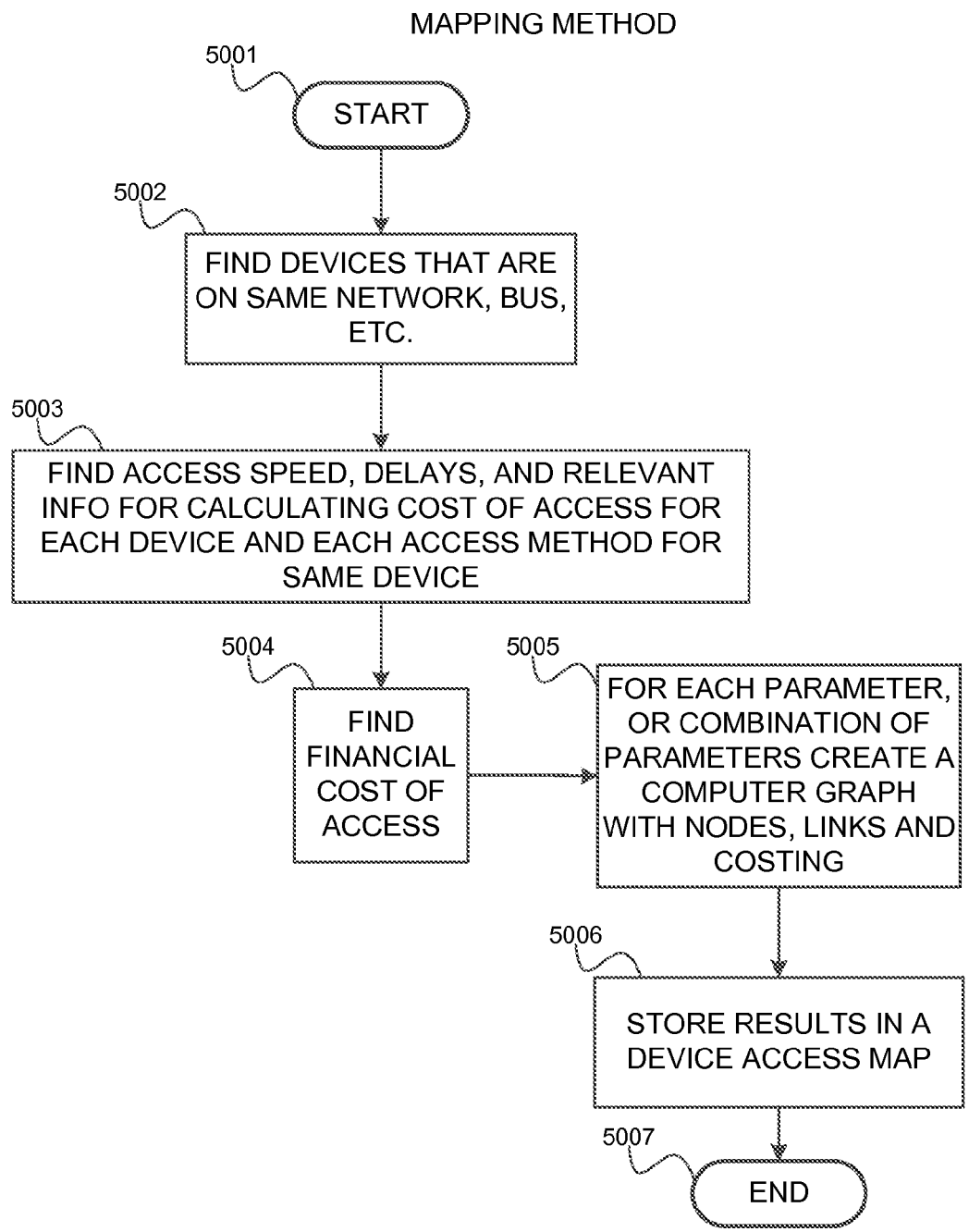
FIG. 50 illustrates mapping method

A communications mapping apparatus may use communications mapping methods, such as the mapping method described in FIG. 50.

A communications mapping apparatus may detect the presence of apparatuses, systems it may have information about or it may be communicating directly with or it may be communicating through another apparatus such as discovery apparatus. Such information may include whether device is connected or disconnected, whether it responds to commands, and may be used as a redundant connection in addition to connection through discovery apparatus and/or for running extended queries directly out of communications mapping apparatus rather than going through discovery apparatus.

A communications mapping apparatus may identify, if available, the manufacturer, model, version, firmware version of apparatuses, systems it may have information about or it may be communicating with. It may communicate with those apparatuses directly or through discovery apparatus.

A communications mapping apparatus may identify capabilities of apparatuses, systems it may have information about or it may be communicating directly with or it may be communicating through another apparatus such as discovery apparatus. Such information may include speeds of communication supported, number of communications channels supported, resolutions supported, connection types supported, environmental operating range.

A communications mapping apparatus may identify the control commands supported by apparatuses, systems it may have information about or it may be communicating directly with or it may be communicating through another apparatus such as discovery apparatus. Such information may include full command set, or partial command set, alternative command set, compatible command set, multiple command sets.

A communications mapping apparatus may identify information about people, resources by communicating with calendaring apparatuses, systems it may have information about or it may be communicating directly with or it may be communicating through another apparatus such as discovery apparatus. Such information may include information in calendar entries, attendee lists in calendar entries, attachments in calendar entries, scheduling, availability usage information, auditing information.

A communications mapping apparatus may identify information about people, resources by communicating with web conferencing apparatuses, systems it may have information about or it may be communicating directly with or it may be communicating through another apparatus such as discovery apparatus. Such information may include availability, scheduling, URLs, IP addresses, port numbers, usernames, passwords usage information, auditing information.

A communications mapping apparatus may identify information about people, resources by communicating with video conferencing apparatuses, systems it may have information about or it may be communicating directly with or it may be communicating through another apparatus such as discovery apparatus. Such information may include free/busy status, address book, scheduling, URLs, IP addresses, port numbers, usernames, passwords usage information, auditing information.

A communications mapping apparatus may identify information about people, resources by communicating with audio conferencing apparatuses, systems it may have information about or it may be communicating directly with or it may be communicating through another apparatus such as discovery apparatus. Such information may include free/busy status, address book, scheduling, phone numbers, URLs, IP addresses, port numbers, usernames, passwords, certificates, SIP addresses, gateway addresses, call manager addresses, multipoint conference unit addresses, DSP resource information, DSP utilization information usage information, auditing information.

A communications mapping apparatus may identify information about people, resources by communicating with multi point conferencing apparatuses, systems it may have information about or it may be communicating directly with or it may be communicating through another apparatus such as discovery apparatus. Such information may include free/busy status, address book, scheduling, phone numbers, URLs, IP addresses, port numbers, usernames, passwords, certificates, SIP addresses, gateway addresses, call manager addresses, multipoint conference unit addresses, DSP resource information, DSP utilization information usage information, auditing information.

A communications mapping apparatus may identify information about people, resources by communicating with e-mail apparatuses, systems it may have information about or it may be communicating directly with or it may be communicating through another apparatus such as discovery apparatus. Such information may include e-mails, contacts, availability, free/busy status, address book, scheduling, e-mail configuration, server side rules, client side rules, usage information, auditing information.

A communications mapping apparatus may identify information about people, resources by communicating with apparatuses, systems it may have information about or it may be communicating directly with or it may be communicating through another apparatus such as discovery apparatus, where apparatuses, systems allows one or more parties to communicate e.g. with each other. Such information may include availability, free/busy status, address book, scheduling.

A communications mapping apparatus may identify information about people, resources by communicating with phone or telephone apparatuses, systems it may have information about or it may be communicating directly with or it may be communicating through another apparatus such as discovery apparatus. Such information may include availability, free/busy status, address book, scheduling, phone numbers, directory information.

A communications mapping apparatus may identify issues about people, resources by communicating with apparatuses, systems it may have information about or it may be communicating directly with or it may be communicating through another apparatus such as discovery apparatus. A communications mapping apparatus may be in a communication about the issues with apparatuses, systems that may be involved. A communications mapping apparatus may take corrective action, may update its records, may inform other apparatuses about the information received, may inform other systems about the information received, may cause other apparatuses, systems to take actions that may be determined by communications mapping apparatus and/or other apparatuses/systems. Such issues and information may include apparatus disconnect information, system disconnect information, call disconnect information, network error information, packet loss information, error codes, crash logs, alternative route information, primary route lost information, schedule changes, availability changes, free/busy status changes, changes to address book, changes to scheduling, changes to phone numbers, changes to directory information.

A communications mapping apparatus may identify information about services provided by apparatuses, systems by communicating with apparatuses, systems it may have information about or it may be communicating directly with or it may be communicating through another apparatus such as discovery apparatus. Such information may include directory services, e-mail services, calendaring services, name resolution services, WINS services, DNS services, file sharing services, print services, office automation services, home automations services, lighting control services, security services, alarm services.

A communications mapping apparatus may identify information about pooled apparatuses, systems by communicating with apparatuses, systems it may have information about or it may be communicating directly with or it may be communicating through another apparatus such as discovery apparatus. Such information may include finding apparatuses that are in the same system, network, department, organization, town, city, country, geographical location.

A communications mapping apparatus may identify information about network apparatuses, systems by communicating with apparatuses, systems it may have information about or it may be communicating directly with or it may be communicating through another apparatus such as discovery apparatus. Such information may include IP addresses, network masks, gateways, access lists, permit lists, deny lists, firewalls, routers, switches, operating system versions, virtual private networks, redundancy information, failover information, cost, latency, jitter, round trip delay, delay, bandwidth, channels, line protocols, department, organization, town, city, country, geographical location.

A communications mapping apparatus may identify information about controlling apparatuses, systems by communicating with apparatuses, systems it may have information about or it may be communicating directly with or it may be communicating through another apparatus such as discovery apparatus. Such information may include IP addresses, network masks, gateways, number of ports, port types, devices connected to ports, signal levels, signal types, environmental information, interaction devices controlling system is connected to, other apparatuses controlling apparatus is connected to, other systems controlling apparatus is connected to. Such information from controlling apparatuses may also include access lists, permit lists, deny lists, firewalls, routers, switches, operating system versions, virtual private networks, redundancy information, failover information, cost, latency, jitter, round trip delay, delay, bandwidth, channels, line protocols, department, organization, town, city, country, geographical location.

A communications mapping apparatus may identify information about interaction apparatuses, systems by communicating with apparatuses, systems it may have information about or it may be communicating directly with or it may be communicating through another apparatus such as discovery apparatus. Such information may include IP addresses, network masks, gateways, type of interaction apparatus, software version, number of touches supported, signal levels, signal types, environmental information, information about the controlling apparatus interaction apparatus is connected to, other apparatuses interaction apparatus is connected to or communicating with, other systems interaction apparatus is connected to or communicating with.

A communications mapping apparatus may identify information about intention detection and action apparatuses, systems by communicating with apparatuses, systems it may have information about or it may be communicating directly with or it may be communicating through another apparatus such as discovery apparatus. Such information may include IP addresses, network masks, gateways, connection methods, communication protocols, request types.

A communications mapping apparatus may communicate to all apparatuses and systems it may be connected to.

A communications mapping apparatus may communicate with discovery apparatuses, policy apparatuses, communications mapping apparatuses, lookup apparatuses, publishing apparatuses, root server connector apparatuses, root server apparatuses, root server policy apparatuses, pooling apparatuses.

A communications mapping apparatus may classify the information that may be stored in the communications mapping apparatus or by using information that may be obtained from communications with other apparatus and systems.

Behavior of a communications mapping apparatus may be modified by one or more policy apparatuses.

Inputs of a communications mapping apparatus may pass through policy apparatus.

Outputs of a communications mapping apparatus may pass through policy apparatus.

A communications mapping apparatus may communicate with a policy apparatus and may feed data to policy apparatus for policy apparatus to inspect. Communications mapping apparatus may decide to accept/deny a request and/or send/don't send a response based on the information received from the policy apparatus.

A communications mapping apparatus may create computer graphics that may include at least one or more of nodes, vertexes, values, weights and other computer graphics related elements and components, which may be using the information that may be stored in the communications mapping apparatus or by using information that is obtained from communications with other apparatus and systems. This may be used for finding best cost route or fastest route or to find an optimal path in the graphics which may be used in a situation or application that may need that information.

A communications mapping apparatus may run conflict resolution methods which may resolve conflicts in the computer graphics and may remove ambiguities, which may be using the information that may be stored in the communications mapping apparatus or by using information that is obtained from communications with other apparatus and systems.

A communications mapping apparatus may provide reporting information by using information that may be stored in the communications mapping apparatus or by using information that is obtained from communications with other apparatus and systems.

A communications mapping apparatus may synchronize with public communications mapping apparatuses. An example may be providing publicly available communications maps. What may be synchronized may be dictated by company policy which may be enforced by a policy apparatus which may be working in conjunction with communications mapping apparatus.

A communications mapping apparatus may synchronize with communications mapping apparatuses in other organizations. An example may be providing publicly available communications maps. What may be synchronized may be dictated by company policy which may be enforced by a policy apparatus which may be working in conjunction with communications mapping apparatus.

A communications mapping apparatus may synchronize with other apparatuses in real time, at scheduled times, at scheduled intervals or at other time schedules or time patterns.

A communications mapping apparatus may synchronize with other apparatuses in push, pull, push/pull replication, or using other synchronization methods.

A communications mapping apparatus may fully or partially synchronize with one or more discovery apparatuses.

A communications mapping apparatus may fully or partially synchronize with one or more communication mapping apparatuses.

A communications mapping apparatus may fully or partially synchronize with one or more lookup apparatuses.

A communications mapping apparatus may fully or partially synchronize with one or more publishing apparatuses.

A communications mapping apparatus may fully or partially synchronize with one or more root server connector apparatuses.

A communications mapping apparatus may utilize at least one or more of decision trees, data structures, statistical analysis methods, data analysis, analytics, pairwise comparison, n-tree structures, other structures and/or analysis methods that may help performing the functions of the communications mapping apparatus.

A communications mapping apparatus may provide information to discovery apparatuses, policy apparatuses, communications mapping apparatuses, lookup apparatuses, publishing apparatuses, root server connector apparatuses, root server apparatuses, root server policy apparatuses, pooling apparatuses.

A communications mapping apparatus may generate configuration and software code.

A communications mapping apparatus may configure or program discovery apparatuses, policy apparatuses, communications mapping apparatuses, lookup apparatuses, publishing apparatuses, root server connector apparatuses, root server apparatuses, root server policy apparatuses, pooling apparatuses and other apparatuses and systems it is connected to, which may improve communicating, discovering, categorizing and building reference information functions and other functions communications mapping apparatus may have.

A communications mapping apparatus may configure and program the apparatuses and systems directly or through another apparatus such as controlling apparatus, terminal server, terminal server client, console server. This may improve the function of communications mapping apparatus or other apparatus and systems that may be related and/or part of the system.

Other apparatus or systems may request communications mapping apparatus to perform certain tasks it is capable of.

A communications mapping apparatus may store the information it may receive or send and may access that information if it is needed.

A communications mapping apparatus may store the information it may generate and may access that information if it is needed.

A communications mapping apparatus may transfer the information it has to other apparatuses and may keep them synchronized.

A communications mapping apparatus may be in a redundant configuration with two or more communications mapping apparatuses which may help for recovery in case one of the communications mapping apparatuses may not perform its functions.

A communications mapping apparatus may be in a load balance and/or redundant configuration with two or more communications mapping apparatuses, which may improve the speed of communications mapping and providing reference information, which may help for recovery in case one of the communications mapping apparatuses may not perform its functions.

A communications mapping apparatus may synchronize with other apparatuses over a dedicated connection just for synchronization or a shared connection that may be used for other purposes in addition to synchronization.

Information received from the communications mapping apparatus may be used, discarded, allowed, denied and altered by operators, apparatuses, systems and environments that may receive such information, which may be determined by limitations, operator preferences, policies, environment, situations and other factors that may affect the determination.

Information received from the communications mapping apparatus by operators, apparatuses, systems and environments may cause the recipient or recipients to take action or actions or not to take an action, which may be determined by limitations, operator preferences, policies, environment, situations and other factors that may affect the determination.

Figure 3:
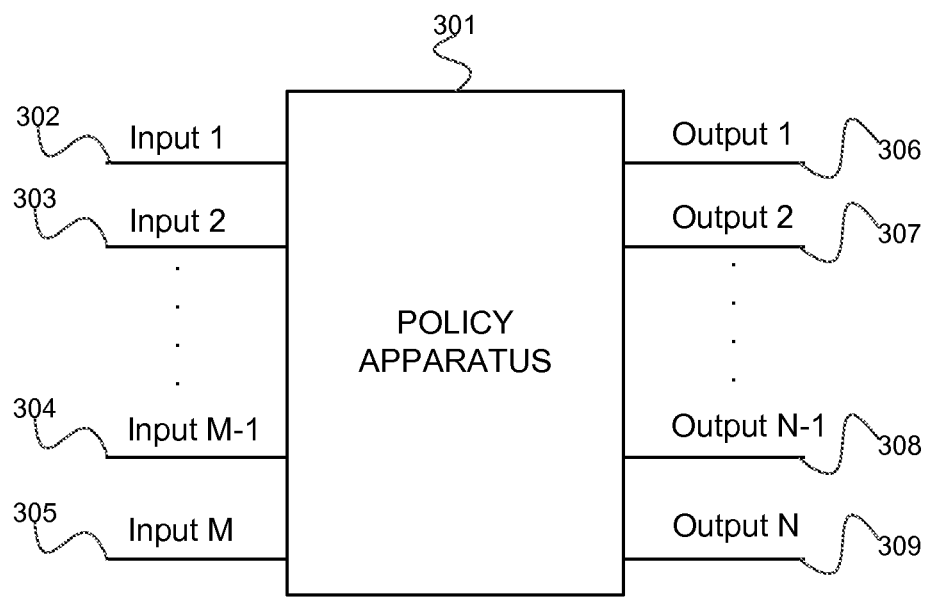
FIG. 3 illustrates a block diagram of policy apparatus.

FIG. 3 illustrates a block diagram of policy apparatus.

A policy apparatus 301 may include at least one input connection, which may be labeled as input 1 302, input 2 303, numbered through input M−1 304, input M 305.

A policy apparatus 301 may include at least one output connection, which may be labeled as output 1 306, output 2 307, numbered through output N−1 308, output N 309.

A policy apparatus may include one or more of CPU, GPU, RAM, ROM, BIOS, firmware, storage, bus, bus controllers, switch, switch controllers, memory controller, CPU cache, memory cache, storage cache, storage, wired network I/O, wireless network I/O, I/O controller, audio I/O, storage I/O, expansion ports, local I/O, general purpose controllers, power supplies, multipurpose I/O ports, RS422 ports, RS232 ports, parallel ports, Bluetooth interfaces, infrared interfaces, relays, analog I/O ports, digital I/O ports, chassis, keyboard, mouse, display monitors, LCD displays and other hardware and software components that will make the system functional.

A policy apparatus collects various data from its data connections, data connections may be in the form of wet contact switch, dry contact switch, data communication, analog circuit state, digital circuit state, serial communication, RS422, RS232, parallel communication, wireless communication, Bluetooth, Infrared, wired communication, interfaces with other apparatuses, interfaces with other systems, TCP/IP communications, and form of communications that allows policy apparatus to receive data from operator, environment, systems, apparatuses and other policy apparatuses.

A policy apparatus may use policy methods.

A policy apparatus may detect the presence of apparatuses, systems it may have information about or it may be communicating directly with or it may be communicating through another apparatus such as discovery apparatus. Such information may include whether device is connected or disconnected, whether it responds to commands.

A policy apparatus may identify, if available, the manufacturer, model, version, firmware version of apparatuses, systems it may have information about or it may be communicating with.

A policy apparatus may identify capabilities of apparatuses, systems it may have information about or it may be communicating directly with or it may be communicating through another apparatus such as discovery apparatus. Such information may include speeds of communication supported, number of communications channels supported, resolutions supported, connection types supported, environmental operating range.

A policy apparatus may identify the control commands supported by apparatuses, systems it may have information about or it may be communicating directly with or it may be communicating through another apparatus such as discovery apparatus. Such information may include full command set, or partial command set, alternative command set, compatible command set, multiple command sets.

A policy apparatus may identify information about people, resources by communicating with calendaring apparatuses, systems it may have information about or it may be communicating directly with or it may be communicating through another apparatus such as discovery apparatus. Such information may include information in calendar entries, attendee lists in calendar entries, attachments in calendar entries, scheduling, availability usage information, auditing information.

A policy apparatus may identify information about people, resources by communicating with web conferencing apparatuses, systems it may have information about or it may be communicating directly with or it may be communicating through another apparatus such as discovery apparatus. Such information may include availability, scheduling, URLs, IP addresses, port numbers, usernames, passwords usage information, auditing information.

A policy apparatus may identify information about people, resources by communicating with video conferencing apparatuses, systems it may have information about or it may be communicating directly with or it may be communicating through another apparatus such as discovery apparatus. Such information may include free/busy status, address book, scheduling, URLs, IP addresses, port numbers, usernames, passwords usage information, auditing information.

A policy apparatus may identify information about people, resources by communicating with audio conferencing apparatuses, systems it may have information about or it may be communicating directly with or it may be communicating through another apparatus such as discovery apparatus. Such information may include free/busy status, address book, scheduling, phone numbers, URLs, IP addresses, port numbers, usernames, passwords, certificates, SIP addresses, gateway addresses, call manager addresses, multipoint conference unit addresses, DSP resource information, DSP utilization information usage information, auditing information.

A policy apparatus may identify information about people, resources by communicating with multi point conferencing apparatuses, systems it may have information about or it may be communicating directly with or it may be communicating through another apparatus such as discovery apparatus. Such information may include free/busy status, address book, scheduling, phone numbers, URLs, IP addresses, port numbers, usernames, passwords, certificates, SIP addresses, gateway addresses, call manager addresses, multipoint conference unit addresses, DSP resource information, DSP utilization information usage information, auditing information.

A policy apparatus may identify information about people, resources by communicating with e-mail apparatuses, systems it may have information about or it may be communicating directly with or it may be communicating through another apparatus such as discovery apparatus. Such information may include e-mails, contacts, availability, free/busy status, address book, scheduling, e-mail configuration, server side rules, client side rules, usage information, auditing information.

A policy apparatus may identify information about people, resources by communicating with apparatuses, systems it may have information about or it may be communicating directly with or it may be communicating through another apparatus such as discovery apparatus, where apparatuses, systems allows one or more parties to communicate e.g. with each other. Such information may include availability, free/busy status, address book, scheduling.

A policy apparatus may identify information about people, resources by communicating with phone or telephone apparatuses, systems it may have information about or it may be communicating directly with or it may be communicating through another apparatus such as discovery apparatus. Such information may include availability, free/busy status, address book, scheduling, phone numbers, directory information.

A policy apparatus may identify issues about people, resources by communicating with apparatuses, systems it may have information about or it may be communicating directly with or it may be communicating through another apparatus such as discovery apparatus. A policy apparatus may be in a communication about the issues with apparatuses, systems that may be involved. A policy apparatus may take corrective action, may update its records, may inform other apparatuses about the information received, may inform other systems about the information received, may cause other apparatuses, systems to take actions that may be determined by policy apparatus and/or other apparatuses/systems. Such issues and information may include apparatus disconnect information, system disconnect information, call disconnect information, network error information, packet loss information, error codes, crash logs, alternative route information, primary route lost information, schedule changes, availability changes, free/busy status changes, changes to address book, changes to scheduling, changes to phone numbers, changes to directory information.

A policy apparatus may identify information about services provided by apparatuses, systems by communicating with apparatuses, systems it may have information about or it may be communicating directly with or it may be communicating through another apparatus such as discovery apparatus. Such information may include directory services, e-mail services, calendaring services, name resolution services, WINS services, DNS services, file sharing services, print services, office automation services, home automations services, lighting control services, security services, alarm services.

A policy apparatus may identify information about pooled apparatuses, systems by communicating with apparatuses, systems it may have information about or it may be communicating directly with or it may be communicating through another apparatus such as discovery apparatus. Such information may include finding apparatuses that are in the same system, network, department, organization, town, city, country, geographical location.

A policy apparatus may identify information about network apparatuses, systems by communicating with apparatuses, systems it may have information about or it may be communicating directly with or it may be communicating through another apparatus such as discovery apparatus. Such information may include IP addresses, network masks, gateways, access lists, permit lists, deny lists, firewalls, routers, switches, operating system versions, virtual private networks, redundancy information, failover information, cost, latency, jitter, round trip delay, delay, bandwidth, channels, line protocols, department, organization, town, city, country, geographical location.

A policy apparatus may identify information about controlling apparatuses, systems by communicating with apparatuses, systems it may have information about or it may be communicating directly with or it may be communicating through another apparatus such as discovery apparatus. Such information may include IP addresses, network masks, gateways, number of ports, port types, devices connected to ports, signal levels, signal types, environmental information, interaction devices controlling system is connected to, other apparatuses controlling apparatus is connected to, other systems controlling apparatus is connected to. Such information from controlling apparatuses may also include access lists, permit lists, deny lists, firewalls, routers, switches, operating system versions, virtual private networks, redundancy information, failover information, cost, latency, jitter, round trip delay, delay, bandwidth, channels, line protocols, department, organization, town, city, country, geographical location.

A policy apparatus may identify information about interaction apparatuses, systems by communicating with apparatuses, systems it may have information about or it may be communicating directly with or it may be communicating through another apparatus such as discovery apparatus. Such information may include IP addresses, network masks, gateways, type of interaction apparatus, software version, number of touches supported, signal levels, signal types, environmental information, information about the controlling apparatus interaction apparatus is connected to, other apparatuses interaction apparatus is connected to or communicating with, other systems interaction apparatus is connected to or communicating with.

A policy apparatus may identify information about intention detection and action apparatuses, systems by communicating with apparatuses, systems it may have information about or it may be communicating directly with or it may be communicating through another apparatus such as discovery apparatus. Such information may include IP addresses, network masks, gateways, connection methods, communication protocols, request types.

A policy apparatus may communicate to all apparatuses and systems it may be connected to.

Behavior of a policy apparatus may be modified by one or more policy apparatuses.

Inputs of a policy apparatus may pass through a policy apparatus.

Outputs of a policy apparatus may pass through a policy apparatus.

A policy apparatus may communicate with a policy apparatus and may feed data to policy apparatus for policy apparatus to inspect. Policy apparatus may decide to accept/deny a request and/or send/don't send a response based on the information received from the policy apparatus.

A policy apparatus may communicate with discovery apparatuses, policy apparatuses, communications mapping apparatuses, lookup apparatuses, publishing apparatuses, root server connector apparatuses, root server apparatuses, root server policy apparatuses, pooling apparatuses.

A policy apparatus may classify the information that may be stored in the policy apparatus or by using information that may be obtained from communications with other apparatus and systems.

A policy apparatus may have an input buffer to queue incoming requests.

A policy apparatus may have an output buffer to queue outbound responses.

A policy apparatus may have a decision logic to which may use decision criteria which may be defined by user, apparatus, system, administrator, department, organization, city, state, federal government and government.

Decision criteria may include policies of the user, apparatus, system, administrator, department, organization, city, state, federal government and government.

Decision criteria may include singularity or plurality of policies.

Policies may include one or more of rules, conditional rules, complex rules, rules that are combination of other rules, rules that are combined with AND logic operators, OR logic operators, XOR logic operators, NOT logic operators and other logic operators.

Rules may include parameters such as financial cost, billability, time of day, day of week, month, year, electric consumption, efficiency, temperature, area, department, room, city, state, country, continent, other parameters that may be required by user, apparatus, system, administrator, department, organization, city, state, federal government and government.

Rules may include operators such as greater than, less than, equal, greater than and equal, less than and equal, range, match, wildcard match, list match and other operators that may be required by user, apparatus, system, administrator, department, organization, city, state, federal government and government.

Rules may include recursive rules.

Decision logic may include a preconfigured default rule set.

Decision criteria may include a preconfigured policy and rule set.

Policy apparatus may inspect the data through the policy apparatus by receiving the data on input, inspect data, filter out the data that is not allowed by the policy or policies, pass the allowed data to output.

Policy apparatus may inspect the data through the policy apparatus by receiving the data on input from originating apparatus, inspect data, filter out the data that is not allowed by the policy or policies, pass the allowed data to output to destination apparatus.

Policy apparatus may inspect the data through the policy apparatus by receiving the data on input from originating apparatus, inspect data, filter out the data that is not allowed by the policy or policies, pass the allowed data to output back to origination apparatus.

Policy apparatus may inspect the data presented by originating apparatus and may provide an output meaning "allow" or "do not allow" to the presenting apparatus or other apparatuses.

Policy apparatus may inspect the data presented by another apparatus and may provide an output which may contain a message listing what fields are allowed to the presenting apparatus or other apparatuses.

Policy apparatus may inspect the data presented by another apparatus and may provide a message specifying rules for filtering the data to the presenting apparatus or other apparatuses.

Policy apparatus may track the state of data contents and context which may result in applying policies more effectively. Tracking may be all data, partial data, summarized data, time window data, all context, partial context, summarized context, time window context, and any other data or context state tracking that may be required by user, apparatus, system, administrator, department, organization, city, state, federal government and government.

A policy apparatus may synchronize with public policy apparatuses. An example may be providing public policies. What may be synchronized may be dictated by company policy which may be enforced by policy apparatus which may be working in conjunction with policy apparatus.

A policy apparatus may synchronize with policy apparatuses in other organizations. An example may be providing public policies. What may be synchronized may be dictated by company policy which may be enforced by a policy apparatus which may be working in conjunction with policy apparatus.

A policy apparatus may synchronize with other apparatuses in real time, at scheduled times, at scheduled intervals or at other time schedules or time patterns.

A policy apparatus may synchronize with other apparatuses in push, pull, push/pull replication, or using other synchronization methods.

A policy apparatus may fully or partially synchronize with one or more discovery apparatuses.

A policy apparatus may fully or partially synchronize with one or more communication mapping apparatuses.

A policy apparatus may fully or partially synchronize with one or more lookup apparatuses.

A policy apparatus may fully or partially synchronize with one or more publishing apparatuses.

A policy apparatus may fully or partially synchronize with one or more root server connector apparatuses.

A policy apparatus may provide reporting information by using information that may be stored in the policy apparatus or by using information that is obtained from communications with other apparatus and systems.

A policy apparatus may utilize at least one or more of decision trees, data structures, statistical analysis methods, data analysis, analytics, pairwise comparison, n-tree structures, other structures and/or analysis methods that may help performing the functions of the policy apparatus.

A policy apparatus may provide information to discovery apparatuses, policy apparatuses, communications mapping apparatuses, lookup apparatuses, publishing apparatuses, root server connector apparatuses, root server apparatuses, root server policy apparatuses, pooling apparatuses.

A policy apparatus may generate configuration and software code.

A policy apparatus may configure or program discovery apparatuses, policy apparatuses, communications mapping apparatuses, lookup apparatuses, publishing apparatuses, root server connector apparatuses, root server apparatuses, root server policy apparatuses, pooling apparatuses and other apparatuses and systems it is connected to, which may improve communicating, discovering, categorizing and building reference information functions and other functions policy apparatus may have.

A policy apparatus may configure and program the apparatuses and systems directly or through another apparatus such as controlling apparatus, terminal server, terminal server client, console server. This may improve the function of policy apparatus or other apparatus and systems that may be related and/or part of the system.

Other apparatus or systems may request policy apparatus to perform certain tasks it is capable of.

A policy apparatus may store the information it may receive or send and may access that information if it is needed.

A policy apparatus may store the information it may generate and may access that information if it is needed.

A policy apparatus may transfer the information it has to other apparatuses and may keep them synchronized.

A policy apparatus may be in a redundant configuration with two or more policy apparatuses which may help for recovery in case one of the policy apparatuses may not perform its functions.

A policy apparatus may be in a load balance and/or redundant configuration with two or more policy apparatuses, which may improve the speed of policy and providing reference information, which may help for recovery in case one of the policy apparatuses may not perform its functions.

A policy apparatus may synchronize with other apparatuses over a dedicated connection just for synchronization or a shared connection that may be used for other purposes in addition to synchronization.

Information received from the policy apparatus may be used, discarded, allowed, denied and altered by operators, apparatuses, systems and environments that may receive such information, which may be determined by limitations, operator preferences, policies, environment, situations and other factors that may affect the determination.

Information received from the policy apparatus by operators, apparatuses, systems and environments may cause the recipient or recipients to take action or actions or not to take an action, which may be determined by limitations, operator preferences, policies, environment, situations and other factors that may affect the determination.

Figure 4:
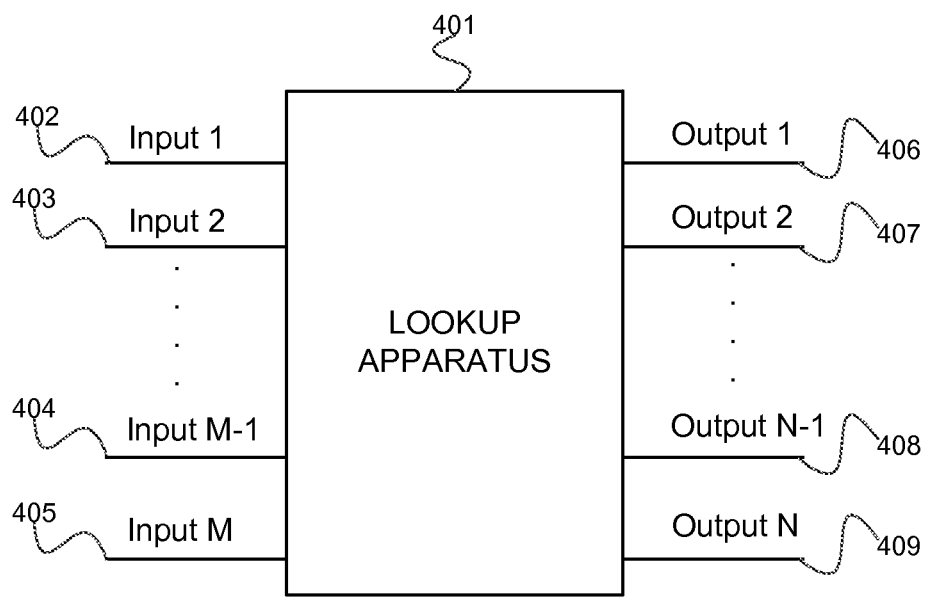
FIG. 4 illustrates a block diagram of lookup apparatus.

FIG. 4 illustrates a block diagram of lookup apparatus.

A lookup apparatus 401 may include at least one input connection, which may be labeled as input 1 402, input 2 403, numbered through input M−1 404, input M 405.

A lookup apparatus 401 may include at least one output connection, which may be labeled as output 1 406, output 2 407, numbered through output N−1 408, output N 409.

A lookup apparatus may include one or more of CPU, GPU, RAM, ROM, BIOS, firmware, storage, bus, bus controllers, switch, switch controllers, memory controller, CPU cache, memory cache, storage cache, storage, wired network I/O, wireless network I/O, I/O controller, audio I/O, storage I/O, expansion ports, local I/O, general purpose controllers, power supplies, multipurpose I/O ports, RS422 ports, RS232 ports, parallel ports, Bluetooth interfaces, infrared interfaces, relays, analog I/O ports, digital I/O ports, chassis, keyboard, mouse, display monitors, LCD displays and other hardware and software components that will make the system functional.

A lookup apparatus collects various data from its data connections, data connections may be in the form of wet contact switch, dry contact switch, data communication, analog circuit state, digital circuit state, serial communication, RS422, RS232, parallel communication, wireless communication, Bluetooth, Infrared, wired communication, interfaces with other apparatuses, interfaces with other systems, TCP/IP communications, and form of communications that allows lookup apparatus to receive data from operator, environment, systems, apparatuses and other lookup apparatuses.

A lookup apparatus may use lookup methods.

A lookup apparatus may detect the presence of apparatuses, systems it may have information about or it may be communicating directly with or it may be communicating through another apparatus such as discovery apparatus. Such information may include whether device is connected or disconnected, whether it responds to commands.

A lookup apparatus may identify, if available, the manufacturer, model, version, firmware version of apparatuses, systems it may have information about or it may be communicating with.

A lookup apparatus may identify capabilities of apparatuses, systems it may have information about or it may be communicating directly with or it may be communicating through another apparatus such as discovery apparatus. Such information may include speeds of communication supported, number of communications channels supported, resolutions supported, connection types supported, environmental operating range.

A lookup apparatus may identify the control commands supported by apparatuses, systems it may have information about or it may be communicating directly with or it may be communicating through another apparatus such as discovery apparatus. Such information may include full command set, or partial command set, alternative command set, compatible command set, multiple command sets.

A lookup apparatus may identify information about people, resources by communicating with calendaring apparatuses, systems it may have information about or it may be communicating directly with or it may be communicating through another apparatus such as discovery apparatus. Such information may include information in calendar entries, attendee lists in calendar entries, attachments in calendar entries, scheduling, availability usage information, auditing information.

A lookup apparatus may identify information about people, resources by communicating with web conferencing apparatuses, systems it may have information about or it may be communicating directly with or it may be communicating through another apparatus such as discovery apparatus. Such information may include availability, scheduling, URLs, IP addresses, port numbers, usernames, passwords usage information, auditing information.

A lookup apparatus may identify information about people, resources by communicating with video conferencing apparatuses, systems it may have information about or it may be communicating directly with or it may be communicating through another apparatus such as discovery apparatus. Such information may include free/busy status, address book, scheduling, URLs, IP addresses, port numbers, usernames, passwords usage information, auditing information.

A lookup apparatus may identify information about people, resources by communicating with audio conferencing apparatuses, systems it may have information about or it may be communicating directly with or it may be communicating through another apparatus such as discovery apparatus. Such information may include free/busy status, address book, scheduling, phone numbers, URLs, IP addresses, port numbers, usernames, passwords, certificates, SIP addresses, gateway addresses, call manager addresses, multipoint conference unit addresses, DSP resource information, DSP utilization information usage information, auditing information.

A lookup apparatus may identify information about people, resources by communicating with multi point conferencing apparatuses, systems it may have information about or it may be communicating directly with or it may be communicating through another apparatus such as discovery apparatus. Such information may include free/busy status, address book, scheduling, phone numbers, URLs, IP addresses, port numbers, usernames, passwords, certificates, SIP addresses, gateway addresses, call manager addresses, multipoint conference unit addresses, DSP resource information, DSP utilization information usage information, auditing information.

A lookup apparatus may identify information about people, resources by communicating with e-mail apparatuses, systems it may have information about or it may be communicating directly with or it may be communicating through another apparatus such as discovery apparatus. Such information may include e-mails, contacts, availability, free/busy status, address book, scheduling, e-mail configuration, server side rules, client side rules, usage information, auditing information.

A lookup apparatus may identify information about people, resources by communicating with apparatuses, systems it may have information about or it may be communicating directly with or it may be communicating through another apparatus such as discovery apparatus, where apparatuses, systems allows one or more parties to communicate e.g. with each other. Such information may include availability, free/busy status, address book, scheduling.

A lookup apparatus may identify information about people, resources by communicating with phone or telephone apparatuses, systems it may have information about or it may be communicating directly with or it may be communicating through another apparatus such as discovery apparatus. Such information may include availability, free/busy status, address book, scheduling, phone numbers, directory information.

A lookup apparatus may identify issues about people, resources by communicating with apparatuses, systems it may have information about or it may be communicating directly with or it may be communicating through another apparatus such as discovery apparatus. A lookup apparatus may be in a communication about the issues with apparatuses, systems that may be involved. A lookup apparatus may take corrective action, may update its records, may inform other apparatuses about the information received, may inform other systems about the information received, may cause other apparatuses, systems to take actions that may be determined by lookup apparatus and/or other apparatuses/systems. Such issues and information may include apparatus disconnect information, system disconnect information, call disconnect information, network error information, packet loss information, error codes, crash logs, alternative route information, primary route lost information, schedule changes, availability changes, free/busy status changes, changes to address book, changes to scheduling, changes to phone numbers, changes to directory information.

A lookup apparatus may identify information about services provided by apparatuses, systems by communicating with apparatuses, systems it may have information about or it may be communicating directly with or it may be communicating through another apparatus such as discovery apparatus. Such information may include directory services, e-mail services, calendaring services, name resolution services, WINS services, DNS services, file sharing services, print services, office automation services, home automations services, lighting control services, security services, alarm services.

A lookup apparatus may identify information about pooled apparatuses, systems by communicating with apparatuses, systems it may have information about or it may be communicating directly with or it may be communicating through another apparatus such as discovery apparatus. Such information may include finding apparatuses that are in the same system, network, department, organization, town, city, country, geographical location.

A lookup apparatus may identify information about network apparatuses, systems by communicating with apparatuses, systems it may have information about or it may be communicating directly with or it may be communicating through another apparatus such as discovery apparatus. Such information may include IP addresses, network masks, gateways, access lists, permit lists, deny lists, firewalls, routers, switches, operating system versions, virtual private networks, redundancy information, failover information, cost, latency, jitter, round trip delay, delay, bandwidth, channels, line protocols, department, organization, town, city, country, geographical location.

A lookup apparatus may identify information about controlling apparatuses, systems by communicating with apparatuses, systems it may have information about or it may be communicating directly with or it may be communicating through another apparatus such as discovery apparatus. Such information may include IP addresses, network masks, gateways, number of ports, port types, devices connected to ports, signal levels, signal types, environmental information, interaction devices controlling system is connected to, other apparatuses controlling apparatus is connected to, other systems controlling apparatus is connected to. Such information from controlling apparatuses may also include access lists, permit lists, deny lists, firewalls, routers, switches, operating system versions, virtual private networks, redundancy information, failover information, cost, latency, jitter, round trip delay, delay, bandwidth, channels, line protocols, department, organization, town, city, country, geographical location.

A lookup apparatus may identify information about interaction apparatuses, systems by communicating with apparatuses, systems it may have information about or it may be communicating directly with or it may be communicating through another apparatus such as discovery apparatus. Such information may include IP addresses, network masks, gateways, type of interaction apparatus, software version, number of touches supported, signal levels, signal types, environmental information, information about the controlling apparatus interaction apparatus is connected to, other apparatuses interaction apparatus is connected to or communicating with, other systems interaction apparatus is connected to or communicating with.

A lookup apparatus may identify information about intention detection and action apparatuses, systems by communicating with apparatuses, systems it may have information about or it may be communicating directly with or it may be communicating through another apparatus such as discovery apparatus. Such information may include IP addresses, network masks, gateways, connection methods, communication protocols, request types.

A lookup apparatus may communicate to all apparatuses and systems it may be connected to.

A lookup apparatus may communicate with discovery apparatuses, policy apparatuses, communications mapping apparatuses, lookup apparatuses, publishing apparatuses, root server connector apparatuses, root server apparatuses, root server policy apparatuses, pooling apparatuses.

A lookup apparatus may classify the information that may be stored in the lookup apparatus or by using information that may be obtained from communications with other apparatus and systems.

Behavior of a lookup apparatus may be modified by one or more policy apparatuses.

Inputs of a lookup apparatus may pass through policy apparatus.

Outputs of a lookup apparatus may pass through policy apparatus.

A lookup apparatus may communicate with a policy apparatus and may feed data to policy apparatus for policy apparatus to inspect. Lookup apparatus may decide to accept/deny a request and/or send/don't send a response based on the information received from the policy apparatus.

A lookup apparatus may provide information requested by other people, apparatuses, systems. Such information may include calendar entries, free/busy information, availability, connection information, access information, phone numbers, IP addresses, usernames, passwords, certificates, connection speeds, number of simultaneous connections available, usage information, and other information that is being made accessible by other people, apparatuses, systems.

Access information may include but not limited to fully qualified domain name (FQDN)s, IP addresses, domain names, sub domain names, usernames, passwords, certificates and any other information needed to access a certain apparatus or system.

A lookup apparatus may locate and fetch the information being requested.

A lookup apparatus may include a storage. Storage may store requests, responses, and any other information that may be needed for the function of lookup apparatus.

A lookup apparatus may include a cache. Cache may store the information that may be frequently accessed. Cache may be a storage that may be accessed faster than storage used in the apparatus. Cache may cache requests and responses. Cache may cache information stored in the storage for faster access by the lookup method and lookup apparatus. Cache may be read only, write through, adaptive, or may use other caching algorithms.

A lookup apparatus may synchronize with public lookup apparatuses. An example may be providing availability of conference rooms. What may be synchronized may be dictated by company policy which may be enforced by a policy apparatus which may be working in conjunction with lookup apparatus.

A lookup apparatus may synchronize with lookup apparatuses in other organizations. An example may be providing availability of conference rooms. What may be synchronized may be dictated by company policy which may be enforced by a policy apparatus which may be working in conjunction with lookup apparatus.

A lookup apparatus may synchronize with other apparatuses in real time, at scheduled times, at scheduled intervals or at other time schedules or time patterns.

A lookup apparatus may synchronize with other apparatuses in push, pull, push/pull replication, or using other synchronization methods.

A lookup apparatus may fully or partially synchronize with one or more discovery apparatuses.

A lookup apparatus may fully or partially synchronize with one or more communication mapping apparatuses.

A lookup apparatus may fully or partially synchronize with one or more lookup apparatuses.

A lookup apparatus may fully or partially synchronize with one or more publishing apparatuses.

A lookup apparatus may fully or partially synchronize with one or more root server connector apparatuses.

A lookup apparatus may provide reporting information by using information that may be stored in the lookup apparatus or by using information that is obtained from communications with other apparatus and systems.

A lookup apparatus may utilize at least one or more of decision trees, data structures, statistical analysis methods, data analysis, analytics, pairwise comparison, n-tree structures, other structures and/or analysis methods that may help performing the functions of the lookup apparatus.

A lookup apparatus may provide information to discovery apparatuses, policy apparatuses, communications mapping apparatuses, lookup apparatuses, publishing apparatuses, root server connector apparatuses, root server apparatuses, root server policy apparatuses, pooling apparatuses.

A lookup apparatus may generate configuration and software code.

A lookup apparatus may configure or program discovery apparatuses, policy apparatuses, communications mapping apparatuses, lookup apparatuses, publishing apparatuses, root server connector apparatuses, root server apparatuses, root server policy apparatuses, pooling apparatuses and other apparatuses and systems it is connected to, which may improve communicating, discovering, categorizing and building reference information functions and other functions lookup apparatus may have.

A lookup apparatus may configure and program the apparatuses and systems directly or through another apparatus such as controlling apparatus, terminal server, terminal server client, console server. This may improve the function of lookup apparatus or other apparatus and systems that may be related and/or part of the system.

Other apparatus or systems may request lookup apparatus to perform certain tasks it is capable of.

A lookup apparatus may store the information it may receive or send and may access that information if it is needed.

A lookup apparatus may store the information it may generate and may access that information if it is needed.

A lookup apparatus may transfer the information it has to other apparatuses and may keep them synchronized.

A lookup apparatus may be in a redundant configuration with two or more lookup apparatuses which may help for recovery in case one of the lookup apparatuses may not perform its functions.

A lookup apparatus may be in a load balance and/or redundant configuration with two or more lookup apparatuses, which may improve the speed of lookup and providing reference information, which may help for recovery in case one of the lookup apparatuses may not perform its functions.

A lookup apparatus may synchronize with other apparatuses over a dedicated connection just for synchronization or a shared connection that may be used for other purposes in addition to synchronization.

Information received from the lookup apparatus may be used, discarded, allowed, denied and altered by operators, apparatuses, systems and environments that may receive such information, which may be determined by limitations, operator preferences, policies, environment, situations and other factors that may affect the determination.

Information received from the lookup apparatus by operators, apparatuses, systems and environments may cause the recipient or recipients to take action or actions or not to take an action, which may be determined by limitations, operator preferences, policies, environment, situations and other factors that may affect the determination.

Figure 5:
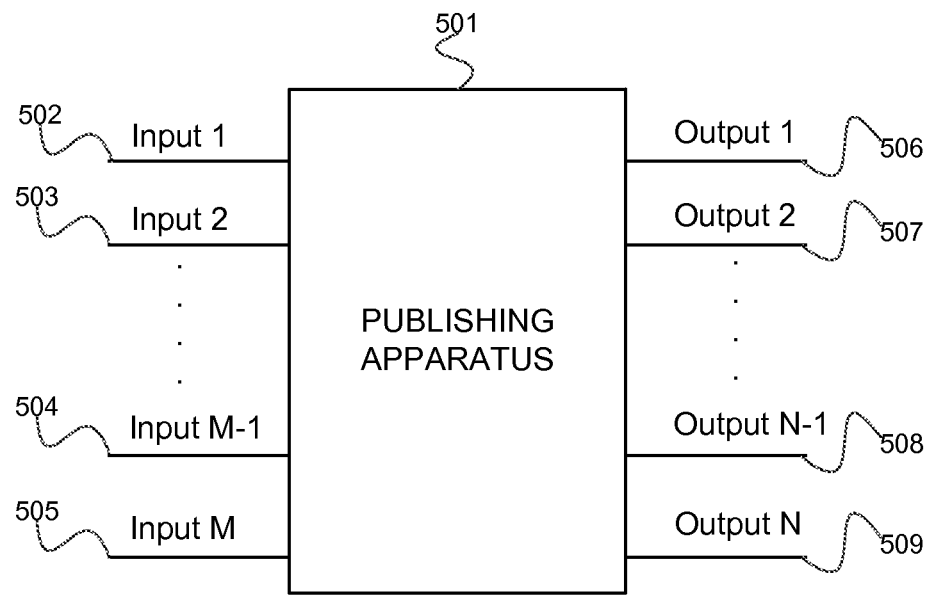
FIG. 5 illustrates a block diagram of publishing apparatus.

FIG. 5 illustrates a block diagram of publishing apparatus.

A publishing apparatus 501 may include at least one input connection, which may be labeled as input 1 502, input 2 503, numbered through input M-1 504, input M 505.

A publishing apparatus 501 may include at least one output connection, which may be labeled as output 1 506, output 2 507, numbered through output N-1 508, output N 509.

A publishing apparatus may include one or more of CPU, GPU, RAM, ROM, BIOS, firmware, storage, bus, bus controllers, switch, switch controllers, memory controller, CPU cache, memory cache, storage cache, storage, wired network I/O, wireless network I/O, I/O controller, audio I/O, storage I/O, expansion ports, local I/O, general purpose controllers, power supplies, multipurpose I/O ports, RS422 ports, RS232 ports, parallel ports, Bluetooth interfaces, infrared interfaces, relays, analog I/O ports, digital I/O ports, chassis, keyboard, mouse, display monitors, LCD displays and other hardware and software components that will make the system functional.

A publishing apparatus collects various data from its data connections, data connections may be in the form of wet contact switch, dry contact switch, data communication, analog circuit state, digital circuit state, serial communication, RS422, RS232, parallel communication, wireless communication, Bluetooth, Infrared, wired communication, interfaces with other apparatuses, interfaces with other systems, TCP/IP communications, and form of communications that allows publishing apparatus to receive data from operator, environment, systems, apparatuses and other publishing apparatuses.

A publishing apparatus may use publishing methods.

A publishing apparatus may detect the presence of apparatuses, systems it may have information about or it may be communicating directly with or it may be communicating through another apparatus such as discovery apparatus. Such information may include whether device is connected or disconnected, whether it responds to commands.

A publishing apparatus may identify, if available, the manufacturer, model, version, firmware version of apparatuses, systems it may have information about or it may be communicating with.

A publishing apparatus may identify capabilities of apparatuses, systems it may have information about or it may be communicating directly with or it may be communicating through another apparatus such as discovery apparatus. Such information may include speeds of communication supported, number of communications channels supported, resolutions supported, connection types supported, environmental operating range.

A publishing apparatus may identify the control commands supported by apparatuses, systems it may have information about or it may be communicating directly with or it may be communicating through another apparatus such as discovery apparatus. Such information may include full command set, or partial command set, alternative command set, compatible command set, multiple command sets.

A publishing apparatus may identify information about people, resources by communicating with calendaring apparatuses, systems it may have information about or it may be communicating directly with or it may be communicating through another apparatus such as discovery apparatus. Such information may include information in calendar entries, attendee lists in calendar entries, attachments in calendar entries, scheduling, availability usage information, auditing information.

A publishing apparatus may identify information about people, resources by communicating with web conferencing apparatuses, systems it may have information about or it may be communicating directly with or it may be communicating through another apparatus such as discovery apparatus. Such information may include availability, scheduling, URLs, IP addresses, port numbers, usernames, passwords usage information, auditing information.

A publishing apparatus may identify information about people, resources by communicating with video conferencing apparatuses, systems it may have information about or it may be communicating directly with or it may be communicating through another apparatus such as discovery apparatus. Such information may include free/busy status, address book, scheduling, URLs, IP addresses, port numbers, usernames, passwords usage information, auditing information.

A publishing apparatus may identify information about people, resources by communicating with audio conferencing apparatuses, systems it may have information about or it may be communicating directly with or it may be communicating through another apparatus such as discovery apparatus. Such information may include free/busy status, address book, scheduling, phone numbers, URLs, IP addresses, port numbers, usernames, passwords, certificates, SIP addresses, gateway addresses, call manager addresses, multipoint conference unit addresses, DSP resource information, DSP utilization information usage information, auditing information.

A publishing apparatus may identify information about people, resources by communicating with multi point conferencing apparatuses, systems it may have information about or it may be communicating directly with or it may be communicating through another apparatus such as discovery apparatus. Such information may include free/busy status, address book, scheduling, phone numbers, URLs, IP addresses, port numbers, usernames, passwords, certificates, SIP addresses, gateway addresses, call manager addresses, multipoint conference unit addresses, DSP resource information, DSP utilization information usage information, auditing information.

A publishing apparatus may identify information about people, resources by communicating with e-mail apparatuses, systems it may have information about or it may be communicating directly with or it may be communicating through another apparatus such as discovery apparatus. Such information may include e-mails, contacts, availability, free/busy status, address book, scheduling, e-mail configuration, server side rules, client side rules, usage information, auditing information.

A publishing apparatus may identify information about people, resources by communicating with apparatuses, systems it may have information about or it may be communicating directly with or it may be communicating through another apparatus such as discovery apparatus, where apparatuses, systems allows one or more parties to communicate e.g. with each other. Such information may include availability, free/busy status, address book, scheduling.

A publishing apparatus may identify information about people, resources by communicating with phone or telephone apparatuses, systems it may have information about or it may be communicating directly with or it may be communicating through another apparatus such as discovery apparatus. Such information may include availability, free/busy status, address book, scheduling, phone numbers, directory information.

A publishing apparatus may identify issues about people, resources by communicating with apparatuses, systems it may have information about or it may be communicating directly with or it may be communicating through another apparatus such as discovery apparatus. A publishing apparatus may be in a communication about the issues with apparatuses, systems that may be involved. A publishing apparatus may take corrective action, may update its records, may inform other apparatuses about the information received, may inform other systems about the information received, may cause other apparatuses, systems to take actions that may be determined by publishing apparatus and/or other apparatuses/systems. Such issues and information may include apparatus disconnect information, system disconnect information, call disconnect information, network error information, packet loss information, error codes, crash logs, alternative route information, primary route lost information, schedule changes, availability changes, free/busy status changes, changes to address book, changes to scheduling, changes to phone numbers, changes to directory information.

A publishing apparatus may identify information about services provided by apparatuses, systems by communicating with apparatuses, systems it may have information about or it may be communicating directly with or it may be communicating through another apparatus such as discovery apparatus. Such information may include directory services, e-mail services, calendaring services, name resolution services, WINS services, DNS services, file sharing services, print services, office automation services, home automations services, lighting control services, security services, alarm services.

A publishing apparatus may identify information about pooled apparatuses, systems by communicating with apparatuses, systems it may have information about or it may be communicating directly with or it may be communicating through another apparatus such as discovery apparatus. Such information may include finding apparatuses that are in the same system, network, department, organization, town, city, country, geographical location.

A publishing apparatus may identify information about network apparatuses, systems by communicating with apparatuses, systems it may have information about or it may be communicating directly with or it may be communicating through another apparatus such as discovery apparatus. Such information may include IP addresses, network masks, gateways, access lists, permit lists, deny lists, firewalls, routers, switches, operating system versions, virtual private networks, redundancy information, failover information, cost, latency, jitter, round trip delay, delay, bandwidth, channels, line protocols, department, organization, town, city, country, geographical location.

A publishing apparatus may identify information about controlling apparatuses, systems by communicating with apparatuses, systems it may have information about or it may be communicating directly with or it may be communicating through another apparatus such as discovery apparatus. Such information may include IP addresses, network masks, gateways, number of ports, port types, devices connected to ports, signal levels, signal types, environmental information, interaction devices controlling system is connected to, other apparatuses controlling apparatus is connected to, other systems controlling apparatus is connected to. Such information from controlling apparatuses may also include access lists, permit lists, deny lists, firewalls, routers, switches, operating system versions, virtual private networks, redundancy information, failover information, cost, latency, jitter, round trip delay, delay, bandwidth, channels, line protocols, department, organization, town, city, country, geographical location.

A publishing apparatus may identify information about interaction apparatuses, systems by communicating with apparatuses, systems it may have information about or it may be communicating directly with or it may be communicating through another apparatus such as discovery apparatus. Such information may include IP addresses, network masks, gateways, type of interaction apparatus, software version, number of touches supported, signal levels, signal types, environmental information, information about the controlling apparatus interaction apparatus is connected to, other apparatuses interaction apparatus is connected to or communicating with, other systems interaction apparatus is connected to or communicating with.

A publishing apparatus may identify information about intention detection and action apparatuses, systems by communicating with apparatuses, systems it may have information about or it may be communicating directly with or it may be communicating through another apparatus such as discovery apparatus. Such information may include IP addresses, network masks, gateways, connection methods, communication protocols, request types.

A publishing apparatus may communicate to all apparatuses and systems it may be connected to.

A publishing apparatus may communicate with discovery apparatuses, policy apparatuses, communications mapping apparatuses, lookup apparatuses, publishing apparatuses, root server connector apparatuses, root server apparatuses, root server policy apparatuses, pooling apparatuses.

A publishing apparatus may classify the information that may be stored in the publishing apparatus or by using information that may be obtained from communications with other apparatus and systems.

Behavior of a publishing apparatus may be modified by one or more policy apparatuses.

Inputs of a publishing apparatus may pass through policy apparatus.

Outputs of a publishing apparatus may pass through policy apparatus.

A publishing apparatus may communicate with a policy apparatus and may feed data to policy apparatus for policy apparatus to inspect. Publishing apparatus may decide to accept/deny a request and/or send/don't send a response based on the information received from the policy apparatus.

A publishing apparatus may provide information requested by other people, apparatuses, systems. Such information may include calendar entries, free/busy information, availability, connection information, access information, phone numbers, IP addresses, usernames, passwords, certificates, connection speeds, number of simultaneous connections available, usage information, and other information that is being made accessible by other people, apparatuses, systems.

Access information may include but not limited to fully qualified domain name (FQDN)s, IP addresses, domain names, sub domain names, usernames, passwords, certificates and any other information needed to access a certain apparatus or system.

A publishing apparatus may locate and fetch the information being requested.

A publishing apparatus may include a storage. Storage may store requests, responses, and any other information that may be needed for the function of publishing apparatus.

A publishing apparatus may include a cache. Cache may store the information that may be frequently accessed. Cache may be a storage that may be accessed faster than storage used in the apparatus. Cache may cache requests and responses. Cache may cache information stored in the storage for faster access by the publishing method and publishing apparatus. Cache may be read only, write through, adaptive, or may use other caching algorithms.

Publishing apparatus may be available for public access.

Publishing apparatus may be available for private network access between organizations.

Publishing apparatus may be available for the organization it belongs to only.

A publishing apparatus may synchronize with public publishing apparatuses. An example may be publishing availability of conference rooms. What may be published may be dictated by company policy which may be enforced by a policy apparatus which may be working in conjunction with publishing apparatus.

A publishing apparatus may synchronize with publishing apparatuses in other organizations. An example may be publishing availability of conference rooms. What may be published may be dictated by company policy which may be enforced by a policy apparatus which may be working in conjunction with publishing apparatus.

A publishing apparatus may synchronize with other apparatuses in real time, at scheduled times, at scheduled intervals or at other time schedules or time patterns.

A publishing apparatus may synchronize with other apparatuses in push, pull, push/pull replication, or using other synchronization methods.

A publishing apparatus may fully or partially synchronize with one or more discovery apparatuses.

A publishing apparatus may fully or partially synchronize with one or more communication mapping apparatuses.

A publishing apparatus may fully or partially synchronize with one or more lookup apparatuses.

A publishing apparatus may fully or partially synchronize with one or more publishing apparatuses.

A publishing apparatus may fully or partially synchronize with one or more root server connector apparatuses.

A publishing apparatus may provide reporting information by using information that may be stored in the publishing apparatus or by using information that is obtained from communications with other apparatus and systems.

A publishing apparatus may utilize at least one or more of decision trees, data structures, statistical analysis methods, data analysis, analytics, pairwise comparison, n-tree structures, other structures and/or analysis methods that may help performing the functions of the publishing apparatus.

A publishing apparatus may provide information to discovery apparatuses, policy apparatuses, communications mapping apparatuses, lookup apparatuses, publishing apparatuses, root server connector apparatuses, root server apparatuses, root server policy apparatuses, pooling apparatuses.

A publishing apparatus may generate configuration and software code.

A publishing apparatus may configure or program discovery apparatuses, policy apparatuses, communications mapping apparatuses, lookup apparatuses, publishing apparatuses, root server connector apparatuses, root server apparatuses, root server policy apparatuses, pooling apparatuses and other apparatuses and systems it is connected to, which may improve communicating, discovering, categorizing and building reference information functions and other functions publishing apparatus may have.

A publishing apparatus may configure and program the apparatuses and systems directly or through another apparatus such as controlling apparatus, terminal server, terminal server client, console server. This may improve the function of publishing apparatus or other apparatus and systems that may be related and/or part of the system.

Other apparatus or systems may request publishing apparatus to perform certain tasks it is capable of.

A publishing apparatus may store the information it may receive or send and may access that information if it is needed.

A publishing apparatus may store the information it may generate and may access that information if it is needed.

A publishing apparatus may transfer the information it has to other apparatuses and may keep them synchronized.

A publishing apparatus may be in a redundant configuration with two or more publishing apparatuses which may help for recovery in case one of the publishing apparatuses may not perform its functions.

A publishing apparatus may be in a load balance and/or redundant configuration with two or more publishing apparatuses, which may improve the speed of publishing and providing reference information, which may help for recovery in case one of the publishing apparatuses may not perform its functions.

A publishing apparatus may synchronize with other apparatuses over a dedicated connection just for synchronization or a shared connection that may be used for other purposes in addition to synchronization.

Information received from the publishing apparatus may be used, discarded, allowed, denied and altered by operators, apparatuses, systems and environments that may receive such information, which may be determined by limitations, operator preferences, policies, environment, situations and other factors that may affect the determination.

Information received from the publishing apparatus by operators, apparatuses, systems and environments may cause the recipient or recipients to take action or actions or not to take an action, which may be determined by limitations, operator preferences, policies, environment, situations and other factors that may affect the determination.

Figure 6:
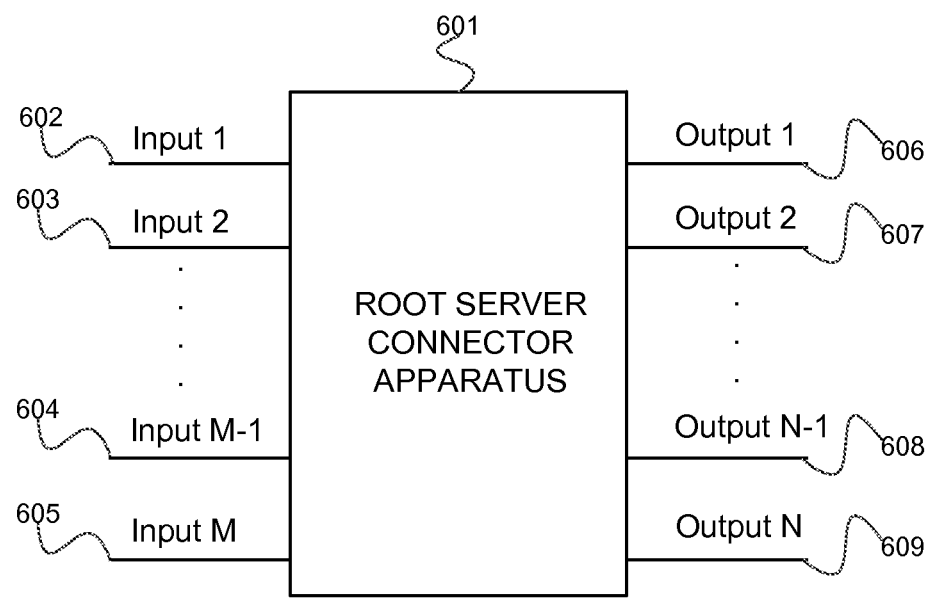
FIG. 6 illustrates a block diagram of a root server connector apparatus.

FIG. 6 illustrates a block diagram of a root server connector apparatus.

A root server connector apparatus 601 may include at least one input connection, which may be labeled as input 1 602, input 2 603, numbered through input M−1 604, input M 605.

A root server connector apparatus 601 may include at least one output connection, which may be labeled as output 1 606, output 2 607, numbered through output N−1 608, output N 609.

A root server connector apparatus may include one or more of CPU, GPU, RAM, ROM, BIOS, firmware, storage, bus, bus controllers, switch, switch controllers, memory controller, CPU cache, memory cache, storage cache, storage, wired network I/O, wireless network I/O, I/O controller, audio I/O, storage I/O, expansion ports, local I/O, general purpose controllers, power supplies, multipurpose I/O ports, RS422 ports, RS232 ports, parallel ports, Bluetooth interfaces, infrared interfaces, relays, analog I/O ports, digital I/O ports, chassis, keyboard, mouse, display monitors, LCD displays and other hardware and software components that will make the system functional.

A root server connector apparatus collects various data from its data connections, data connections may be in the form of wet contact switch, dry contact switch, data communication, analog circuit state, digital circuit state, serial communication, RS422, RS232, parallel communication, wireless communication, Bluetooth, Infrared, wired communication, interfaces with other apparatuses, interlaces with other systems, TCP/IP communications, and form of communications that allows root server connector apparatus to receive data from operator, environment, systems, apparatuses and other root server connector apparatuses.

A root server connector apparatus may use root server connector methods.

A root server connector apparatus may detect the presence of apparatuses, systems it may have information about or it may be communicating directly with or it may be communicating through another apparatus such as discovery apparatus. Such information may include whether device is connected or disconnected, whether it responds to commands.

A root server connector apparatus may identify, if available, the manufacturer, model, version, firmware version of apparatuses, systems it may have information about or it may be communicating with.

A root server connector apparatus may identify capabilities of apparatuses, systems it may have information about or it may be communicating directly with or it may be communicating through another apparatus such as discovery apparatus. Such information may include speeds of communication supported, number of communications channels supported, resolutions supported, connection types supported, environmental operating range.

A root server connector apparatus may identify the control commands supported by apparatuses, systems it may have information about or it may be communicating directly with or it may be communicating through another apparatus such as discovery apparatus. Such information may include full command set, or partial command set, alternative command set, compatible command set, multiple command sets.

A root server connector apparatus may identify information about people, resources by communicating with calendaring apparatuses, systems it may have information about or it may be communicating directly with or it may be communicating through another apparatus such as discovery apparatus. Such information may include information in calendar entries, attendee lists in calendar entries, attachments in calendar entries, scheduling, availability usage information, auditing information.

A root server connector apparatus may identify information about people, resources by communicating with web conferencing apparatuses, systems it may have information about or it may be communicating directly with or it may be communicating through another apparatus such as discovery apparatus. Such information may include availability, scheduling, URLs, IP addresses, port numbers, usernames, passwords usage information, auditing information.

A root server connector apparatus may identify information about people, resources by communicating with video conferencing apparatuses, systems it may have information about or it may be communicating directly with or it may be communicating through another apparatus such as discovery apparatus. Such information may include free/busy status, address book, scheduling, URLs, IP addresses, port numbers, usernames, passwords usage information, auditing information.

A root server connector apparatus may identify information about people, resources by communicating with audio conferencing apparatuses, systems it may have information about or it may be communicating directly with or it may be communicating through another apparatus such as discovery apparatus. Such information may include free/busy status, address book, scheduling, phone numbers, URLs, IP addresses, port numbers, usernames, passwords, certificates, SIP addresses, gateway addresses, call manager addresses, multipoint conference unit addresses, DSP resource information, DSP utilization information usage information, auditing information.

A root server connector apparatus may identify information about people, resources by communicating with multi point conferencing apparatuses, systems it may have information about or it may be communicating directly with or it may be communicating through another apparatus such as discovery apparatus. Such information may include free/busy status, address book, scheduling, phone numbers, URLs, IP addresses, port numbers, usernames, passwords, certificates, SIP addresses, gateway addresses, call manager addresses, multipoint conference unit addresses, DSP resource information, DSP utilization information usage information, auditing information.

A root server connector apparatus may identify information about people, resources by communicating with e-mail apparatuses, systems it may have information about or it may be communicating directly with or it may be communicating through another apparatus such as discovery apparatus. Such information may include e-mails, contacts, availability, free/busy status, address book, scheduling, e-mail configuration, server side rules, client side rules, usage information, auditing information.

A root server connector apparatus may identify information about people, resources by communicating with apparatuses, systems it may have information about or it may be communicating directly with or it may be communicating through another apparatus such as discovery apparatus, where apparatuses, systems allows one or more parties to communicate e.g. with each other. Such information may include availability, free/busy status, address book, scheduling.

A root server connector apparatus may identify information about people, resources by communicating with phone or telephone apparatuses, systems it may have information about or it may be communicating directly with or it may be communicating through another apparatus such as discovery apparatus. Such information may include availability, free/busy status, address book, scheduling, phone numbers, directory information.

A root server connector apparatus may identify issues about people, resources by communicating with apparatuses, systems it may have information about or it may be communicating directly with or it may be communicating through another apparatus such as discovery apparatus. A root server connector apparatus may be in a communication about the issues with apparatuses, systems that may be involved. A root server connector apparatus may take corrective action, may update its records, may inform other apparatuses about the information received, may inform other systems about the information received, may cause other apparatuses, systems to take actions that may be determined by root server connector apparatus and/or other apparatuses/systems. Such issues and information may include apparatus disconnect information, system disconnect information, call disconnect information, network error information, packet loss information, error codes, crash logs, alternative route information, primary route lost information, schedule changes, availability changes, free/busy status changes, changes to address book, changes to scheduling, changes to phone numbers, changes to directory information.

A root server connector apparatus may identify information about services provided by apparatuses, systems by communicating with apparatuses, systems it may have information about or it may be communicating directly with or it may be communicating through another apparatus such as discovery apparatus. Such information may include directory services, e-mail services, calendaring services, name resolution services, WINS services, DNS services, file sharing services, print services, office automation services, home automations services, lighting control services, security services, alarm services.

A root server connector apparatus may identify information about pooled apparatuses, systems by communicating with apparatuses, systems it may have information about or it may be communicating directly with or it may be communicating through another apparatus such as discovery apparatus. Such information may include finding apparatuses that are in the same system, network, department, organization, town, city, country, geographical location.

A root server connector apparatus may identify information about network apparatuses, systems by communicating with apparatuses, systems it may have information about or it may be communicating directly with or it may be communicating through another apparatus such as discovery apparatus. Such information may include IP addresses, network masks, gateways, access lists, permit lists, deny lists, firewalls, routers, switches, operating system versions, virtual private networks, redundancy information, failover information, cost, latency, jitter, round trip delay, delay, bandwidth, channels, line protocols, department, organization, town, city, country, geographical location.

A root server connector apparatus may identify information about controlling apparatuses, systems by communicating with apparatuses, systems it may have information about or it may be communicating directly with or it may be communicating through another apparatus such as discovery apparatus. Such information may include IP addresses, network masks, gateways, number of ports, port types, devices connected to ports, signal levels, signal types, environmental information, interaction devices controlling system is connected to, other apparatuses controlling apparatus is connected to, other systems controlling apparatus is connected to. Such information from controlling apparatuses may also include access lists, permit lists, deny lists, firewalls, routers, switches, operating system versions, virtual private networks, redundancy information, failover information, cost, latency, jitter, round trip delay, delay, bandwidth, channels, line protocols, department, organization, town, city, country, geographical location.

A root server connector apparatus may identify information about interaction apparatuses, systems by communicating with apparatuses, systems it may have information about or it may be communicating directly with or it may be communicating through another apparatus such as discovery apparatus. Such information may include IP addresses, network masks, gateways, type of interaction apparatus, software version, number of touches supported, signal levels, signal types, environmental information, information about the controlling apparatus interaction apparatus is connected to, other apparatuses interaction apparatus is connected to or communicating with, other systems interaction apparatus is connected to or communicating with.

A root server connector apparatus may identify information about intention detection and action apparatuses, systems by communicating with apparatuses, systems it may have information about or it may be communicating directly with or it may be communicating through another apparatus such as discovery apparatus. Such information may include IP addresses, network masks, gateways, connection methods, communication protocols, request types.

A root server connector apparatus may communicate to all apparatuses and systems it may be connected to.

A root server connector apparatus may communicate with discovery apparatuses, policy apparatuses, communications mapping apparatuses, lookup apparatuses, publishing apparatuses, root server connector apparatuses, root server apparatuses, root server policy apparatuses, pooling apparatuses.

A root server connector apparatus may classify the information that may be stored in the root server connector apparatus or by using information that may be obtained from communications with other apparatus and systems.

Behavior of a root server connector apparatus may be modified by one or more policy apparatuses.

Inputs of a root server connector apparatus may pass through policy apparatus.

Outputs of a root server connector apparatus may pass through policy apparatus.

A root server connector apparatus may communicate with a policy apparatus and may feed data to policy apparatus for policy apparatus to inspect. Root server connector apparatus may decide to accept/deny a request and/or send/don't send a response based on the information received from the policy apparatus.

A root server connector apparatus may provide information requested by other people, apparatuses, systems. Such information may include one or more of access information for lookup apparatus, access information for publishing apparatus, access information for communications mapping apparatus, access information for discovery apparatus, calendar entries, free/busy information, availability, connection information, access information, phone numbers, IP addresses, usernames, passwords, certificates, connection speeds, number of simultaneous connections available, usage information, and other information that is being made accessible by other people, apparatuses, systems.

Access information may include but not limited to fully qualified domain name (FQDN)s, IP addresses, domain names, sub domain names, usernames, passwords, certificates and any other information needed to access a certain apparatus or system.

A root server connector apparatus may locate and fetch the information being requested.

A root server connector apparatus may register access information for apparatuses in an organization it may represent with the root server apparatus. Registration may include one or more of access information for lookup apparatus, access information for publishing apparatus, access information for communications mapping apparatus, access information for discovery apparatus, calendar entries, free/busy information, availability, connection information, access information, phone numbers, IP addresses, usernames, passwords, certificates, connection speeds, number of simultaneous connections available, usage information, and other information that is being made accessible by other people, apparatuses, systems.

A root server connector apparatus may include a storage. Storage may store requests, responses, and any other information that may be needed for the function of root server connector apparatus.

A root server connector apparatus may include a cache. Cache may store the information that may be frequently accessed. Cache may be a storage that may be accessed faster than storage used in the apparatus. Cache may cache requests and responses. Cache may cache information stored in the storage for faster access by the root server connector method and root server connector apparatus. Cache may be read only, write through, adaptive, or may use other caching algorithms.

A root server connector apparatus may fully or partially synchronize with one or more discovery apparatuses.

A root server connector apparatus may fully or partially synchronize with one or more communication mapping apparatuses.

A root server connector apparatus may fully or partially synchronize with one or more lookup apparatuses.

A root server connector apparatus may fully or partially synchronize with one or more publishing apparatuses.

A root server connector apparatus may fully or partially synchronize with one or more root server connector apparatuses.

A root server connector apparatus may provide reporting information by using information that may be stored in the root server connector apparatus or by using information that is obtained from communications with other apparatus and systems.

A root server connector apparatus may utilize at least one or more of decision trees, data structures, statistical analysis methods, data analysis, analytics, pairwise comparison, n-tree structures, other structures and/or analysis methods that may help performing the functions of the root server connector apparatus.

A root server connector apparatus may provide information to discovery apparatuses, policy apparatuses, communications mapping apparatuses, lookup apparatuses, publishing apparatuses, root server connector apparatuses, root server apparatuses, root server policy apparatuses, pooling apparatuses.

A root server connector apparatus may generate configuration and software code.

A root server connector apparatus may configure or program discovery apparatuses, policy apparatuses, communications mapping apparatuses, lookup apparatuses, publishing apparatuses, root server connector apparatuses, root server apparatuses, root server policy apparatuses, pooling apparatuses and other apparatuses and systems it is connected to, which may improve communicating, discovering, categorizing and building reference information functions and other functions root server connector apparatus may have.

A root server connector apparatus may configure and program the apparatuses and systems directly or through another apparatus such as controlling apparatus, terminal server, terminal server client, console server. This may improve the function of root server connector apparatus or other apparatus and systems that may be related and/or part of the system.

Other apparatus or systems may request root server connector apparatus to perform certain tasks it is capable of.

A root server connector apparatus may store the information it may receive or send and may access that information if it is needed.

A root server connector apparatus may store the information it may generate and may access that information if it is needed.

A root server connector apparatus may transfer the information it has to other apparatuses and may keep them synchronized.

A root server connector apparatus may be in a redundant configuration with two or more root server connector apparatuses which may help for recovery in case one of the root server connector apparatuses may not perform its functions.

A root server connector apparatus may be in a load balance and/or redundant configuration with two or more root server connector apparatuses, which may improve the speed of root server connector and providing reference information, which may help for recovery in case one of the root server connector apparatuses may not perform its functions.

A root server connector apparatus may synchronize with other apparatuses over a dedicated connection just for synchronization or a shared connection that may be used for other purposes in addition to synchronization.

Information received from the root server connector apparatus may be used, discarded, allowed, denied and altered by operators, apparatuses, systems and environments that may receive such information, which may be determined by limitations, operator preferences, policies, environment, situations and other factors that may affect the determination.

Information received from the root server connector apparatus by operators, apparatuses, systems and environments may cause the recipient or recipients to take action or actions or not to take an action, which may be determined by limitations, operator preferences, policies, environment, situations and other factors that may affect the determination.

Figure 7:
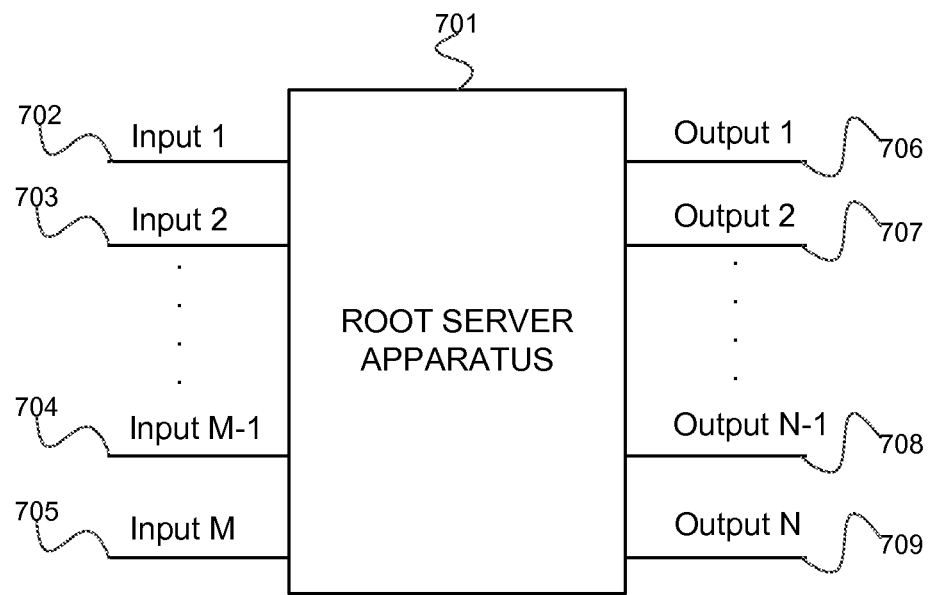
FIG. 7 illustrates a block diagram of a root server apparatus.

FIG. 7 illustrates a block diagram of a root server apparatus.

A root server apparatus 701 may include at least one input connection, which may be labeled as input 1 702, input 2 703, numbered through input M−1 704, input M 705.

A root server apparatus 701 may include at least one output connection, which may be labeled as output 1 706, output 2 707, numbered through output N−1 708, output N 709.

A root server apparatus may include one or more of CPU, GPU, RAM, ROM, BIOS, firmware, storage, bus, bus controllers, switch, switch controllers, memory controller, CPU cache, memory cache, storage cache, storage, wired network I/O, wireless network I/O, I/O controller, audio I/O, storage I/O, expansion ports, local I/O, general purpose controllers, power supplies, multipurpose I/O ports, RS422 ports, RS232 ports, parallel ports, Bluetooth interfaces, infrared interfaces, relays, analog I/O ports, digital I/O ports, chassis, keyboard, mouse, display monitors, LCD displays and other hardware and software components that will make the system functional.

A root server apparatus collects various data from its data connections, data connections may be in the form of wet contact switch, dry contact switch, data communication, analog circuit state, digital circuit state, serial communication, RS422, RS232, parallel communication, wireless communication, Bluetooth, Infrared, wired communication, interfaces with other apparatuses, interfaces with other systems, TCP/IP communications, and form of communications that allows root server apparatus to receive data from operator, environment, systems, apparatuses and other root server apparatuses.

A root server apparatus may use root server methods.

A root server apparatus may detect the presence of apparatuses, systems it may have information about or it may be communicating directly with or it may be communicating through another apparatus such as discovery apparatus. Such information may include whether device is connected or disconnected, whether it responds to commands.

A root server apparatus may identify, if available, the manufacturer, model, version, firmware version of apparatuses, systems it may have information about or it may be communicating with.

A root server apparatus may identify capabilities of apparatuses, systems it may have information about or it may be communicating directly with or it may be communicating through another apparatus such as discovery apparatus. Such information may include speeds of communication supported, number of communications channels supported, resolutions supported, connection types supported, environmental operating range.

A root server apparatus may identify the control commands supported by apparatuses, systems it may have information about or it may be communicating directly with or it may be communicating through another apparatus such as discovery apparatus. Such information may include full command set, or partial command set, alternative command set, compatible command set, multiple command sets.

A root server apparatus may identify information about people, resources by communicating with calendaring apparatuses, systems it may have information about or it may be communicating directly with or it may be communicating through another apparatus such as discovery apparatus. Such information may include information in calendar entries, attendee lists in calendar entries, attachments in calendar entries, scheduling, availability usage information, auditing information.

A root server apparatus may identify information about people, resources by communicating with web conferencing apparatuses, systems it may have information about or it may be communicating directly with or it may be communicating through another apparatus such as discovery apparatus. Such information may include availability, scheduling, URLs, IP addresses, port numbers, usernames, passwords usage information, auditing information.

A root server apparatus may identify information about people, resources by communicating with video conferencing apparatuses, systems it may have information about or it may be communicating directly with or it may be communicating through another apparatus such as discovery apparatus. Such information may include free/busy status, address book, scheduling, URLs, IP addresses, port numbers, usernames, passwords usage information, auditing information.

A root server apparatus may identify information about people, resources by communicating with audio conferencing apparatuses, systems it may have information about or it may be communicating directly with or it may be communicating through another apparatus such as discovery apparatus. Such information may include free/busy status, address book, scheduling, phone numbers, URLs, IP addresses, port numbers, usernames, passwords, certificates, SIP addresses, gateway addresses, call manager addresses, multipoint conference unit addresses, DSP resource information, DSP utilization information usage information, auditing information.

A root server apparatus may identify information about people, resources by communicating with multi point conferencing apparatuses, systems it may have information about or it may be communicating directly with or it may be communicating through another apparatus such as discovery apparatus. Such information may include free/busy status, address book, scheduling, phone numbers, URLs, IP addresses, port numbers, usernames, passwords, certificates, SIP addresses, gateway addresses, call manager addresses, multipoint conference unit addresses, DSP resource information, DSP utilization information usage information, auditing information.

A root server apparatus may identify information about people, resources by communicating with e-mail apparatuses, systems it may have information about or it may be communicating directly with or it may be communicating through another apparatus such as discovery apparatus. Such information may include e-mails, contacts, availability, free/busy status, address book, scheduling, e-mail configuration, server side rules, client side rules, usage information, auditing information.

A root server apparatus may identify information about people, resources by communicating with apparatuses, systems it may have information about or it may be communicating directly with or it may be communicating through another apparatus such as discovery apparatus, where apparatuses, systems allows one or more parties to communicate e.g. with each other. Such information may include availability, free/busy status, address book, scheduling.

A root server apparatus may identify information about people, resources by communicating with phone or telephone apparatuses, systems it may have information about or it may be communicating directly with or it may be communicating through another apparatus such as discovery apparatus. Such information may include availability, free/busy status, address book, scheduling, phone numbers, directory information.

A root server apparatus may identify issues about people, resources by communicating with apparatuses, systems it may have information about or it may be communicating directly with or it may be communicating through another apparatus such as discovery apparatus. A root server apparatus may be in a communication about the issues with apparatuses, systems that may be involved. A root server apparatus may take corrective action, may update its records, may inform other apparatuses about the information received, may inform other systems about the information received, may cause other apparatuses, systems to take actions that may be determined by root server apparatus and/or other apparatuses/systems. Such issues and information may include apparatus disconnect information, system disconnect information, call disconnect information, network error information, packet loss information, error codes, crash logs, alternative route information, primary route lost information, schedule changes, availability changes, free/busy status changes, changes to address book, changes to scheduling, changes to phone numbers, changes to directory information.

A root server apparatus may identify information about services provided by apparatuses, systems by communicating with apparatuses, systems it may have information about or it may be communicating directly with or it may be communicating through another apparatus such as discovery apparatus. Such information may include directory services, e-mail services, calendaring services, name resolution services, WINS services, DNS services, file sharing services, print services, office automation services, home automations services, lighting control services, security services, alarm services.

A root server apparatus may identify information about pooled apparatuses, systems by communicating with apparatuses, systems it may have information about or it may be communicating directly with or it may be communicating through another apparatus such as discovery apparatus. Such information may include finding apparatuses that are in the same system, network, department, organization, town, city, country, geographical location.

A root server apparatus may identify information about network apparatuses, systems by communicating with apparatuses, systems it may have information about or it may be communicating directly with or it may be communicating through another apparatus such as discovery apparatus. Such information may include IP addresses, network masks, gateways, access lists, permit lists, deny lists, firewalls, routers, switches, operating system versions, virtual private networks, redundancy information, failover information, cost, latency, jitter, round trip delay, delay, bandwidth, channels, line protocols, department, organization, town, city, country, geographical location.

A root server apparatus may identify information about controlling apparatuses, systems by communicating with apparatuses, systems it may have information about or it may be communicating directly with or it may be communicating through another apparatus such as discovery apparatus. Such information may include IP addresses, network masks, gateways, number of ports, port types, devices connected to ports, signal levels, signal types, environmental information, interaction devices controlling system is connected to, other apparatuses controlling apparatus is connected to, other systems controlling apparatus is connected to. Such information from controlling apparatuses may also include access lists, permit lists, deny lists, firewalls, routers, switches, operating system versions, virtual private networks, redundancy information, failover information, cost, latency, jitter, round trip delay, delay, bandwidth, channels, line protocols, department, organization, town, city, country, geographical location.

A root server apparatus may identify information about interaction apparatuses, systems by communicating with apparatuses, systems it may have information about or it may be communicating directly with or it may be communicating through another apparatus such as discovery apparatus. Such information may include IP addresses, network masks, gateways, type of interaction apparatus, software version, number of touches supported, signal levels, signal types, environmental information, information about the controlling apparatus interaction apparatus is connected to, other apparatuses interaction apparatus is connected to or communicating with, other systems interaction apparatus is connected to or communicating with.

A root server apparatus may identify information about intention detection and action apparatuses, systems by communicating with apparatuses, systems it may have information about or it may be communicating directly with or it may be communicating through another apparatus such as discovery apparatus. Such information may include IP addresses, network masks, gateways, connection methods, communication protocols, request types.

A root server apparatus may communicate to all apparatuses and systems it may be connected to.

A root server apparatus may communicate with discovery apparatuses, policy apparatuses, communications mapping apparatuses, lookup apparatuses, publishing apparatuses, root server apparatuses, root server apparatuses, root server policy apparatuses, pooling apparatuses.

A root server apparatus may classify the information that may be stored in the root server apparatus or by using information that may be obtained from communications with other apparatus and systems.

Behavior of a root server apparatus may be modified by one or more policy apparatuses.

Inputs of a root server apparatus may pass through policy apparatus.

Outputs of a root server apparatus may pass through policy apparatus.

A root server apparatus may communicate with a policy apparatus and may feed data to policy apparatus for policy apparatus to inspect. Root server apparatus may decide to accept/deny a request and/or send/don't send a response based on the information received from the policy apparatus.

A root server apparatus may provide information requested by other root server apparatuses, root server connector apparatuses, people, apparatuses, systems. Such information may include one or more of access information for root server connector apparatuses, access information for root server apparatuses, access information for lookup apparatus, access information for publishing apparatus, access information for communications mapping apparatus, access information for discovery apparatus, calendar entries, free/busy information, availability, connection information, access information, phone numbers, IP addresses, usernames, passwords, certificates, connection speeds, number of simultaneous connections available, usage information, and other information that is being made accessible by other people, apparatuses, systems.

Access information may include but not limited to fully qualified domain name (FQDN)s, IP addresses, domain names, sub domain names, usernames, passwords, certificates and any other information needed to access a certain apparatus or system.

A root server apparatus may have a registration method which registers other root server apparatuses, root server connector apparatuses, publishing apparatuses, lookup apparatuses, communications mapping apparatuses, discovery apparatuses and other apparatuses that are requested to be registered. Registration may require the registrant to be authenticated by root server apparatus by one or more of username, password, certificates.

A root server apparatus may have an internal certificate authority that may be used to authenticate the connections.

A root server apparatus may communicate with internal certificate authorities that may be located in other organizations, which may be used to authenticate the connections.

A root server apparatus may communicate with public certificate authorities, which may be used to authenticate the connections.

A root server apparatus may have a resolver engine method that may resolve requests for information from other root server apparatuses, root server connector apparatuses, publishing apparatuses, lookup apparatuses, communications mapping apparatuses, discovery apparatuses and other apparatuses that may request information. Requestors may require to be authenticated by root server apparatus by one or more of username, password, certificates.

A root server apparatus may locate and fetch the information being requested.

A root server apparatus may register access information for apparatuses in an organization it may represent with the root server apparatus. Registration may include one or more of access information for lookup apparatus, access information for publishing apparatus, access information for communications mapping apparatus, access information for discovery apparatus, calendar entries, free/busy information, availability, connection information, access information, phone numbers, IP addresses, usernames, passwords, certificates, connection speeds, number of simultaneous connections available, usage information, and other information that is being made accessible by other people, apparatuses, systems.

A root server apparatus may include a storage. Storage may store requests, responses, and any other information that may be needed for the function of root server apparatus.

A root server apparatus may include a cache. Cache may store the information that may be frequently accessed. Cache may be a storage that may be accessed faster than storage used in the apparatus. Cache may cache requests and responses. Cache may cache information stored in the storage for faster access by the root server method and root server apparatus. Cache may be read only, write through, adaptive, or may use other caching algorithms. Cache may be used for internal database. Cache may be used by resolver method. Cache may be used by registration method. There may be singularity or plurality of caches in a root server apparatus. There may be dedicated caches or shared caches.

A root server apparatus may fully or partially synchronize with one or more discovery apparatuses.

A root server apparatus may fully or partially synchronize with one or more communication mapping apparatuses.

A root server apparatus may fully or partially synchronize with one or more lookup apparatuses.

A root server apparatus may fully or partially synchronize with one or more publishing apparatuses.

A root server apparatus may fully or partially synchronize with one or more root server apparatuses.

A root server apparatus may provide reporting information by using information that may be stored in the root server apparatus or by using information that is obtained from communications with other apparatus and systems.

A root server apparatus may utilize at least one or more of decision trees, data structures, statistical analysis methods, data analysis, analytics, pairwise comparison, n-tree structures, other structures and/or analysis methods that may help performing the functions of the root server apparatus.

A root server apparatus may provide information to discovery apparatuses, policy apparatuses, communications mapping apparatuses, lookup apparatuses, publishing apparatuses, root server apparatuses, root server apparatuses, root server policy apparatuses, pooling apparatuses.

A root server apparatus may generate configuration and software code.

A root server apparatus may configure or program discovery apparatuses, policy apparatuses, communications mapping apparatuses, lookup apparatuses, publishing apparatuses, root server apparatuses, root server apparatuses, root server policy apparatuses, pooling apparatuses and other apparatuses and systems it is connected to, which may improve communicating, discovering, categorizing and building reference information functions and other functions root server apparatus may have.

A root server apparatus may configure and program the apparatuses and systems directly or through another apparatus such as controlling apparatus, terminal server, terminal server client, console server. This may improve the function of root server apparatus or other apparatus and systems that may be related and/or part of the system.

Other apparatus or systems may request root server apparatus to perform certain tasks it is capable of.

A root server apparatus may store the information it may receive or send and may access that information if it is needed.

A root server apparatus may store the information it may generate and may access that information if it is needed.

A root server apparatus may transfer the information it has to other apparatuses and may keep them synchronized.

A root server apparatus may be in a redundant configuration with two or more root server apparatuses which may help for recovery in case one of the root server apparatuses may not perform its functions.

A root server apparatus may be in a load balance and/or redundant configuration with two or more root server apparatuses, which may improve the speed of root server and providing reference information, which may help for recovery in case one of the root server apparatuses may not perform its functions.

A root server apparatus may synchronize with other apparatuses over a dedicated connection just for synchronization or a shared connection that may be used for other purposes in addition to synchronization.

Information received from the root server apparatus may be used, discarded, allowed, denied and altered by operators, apparatuses, systems and environments that may receive such information, which may be determined by limitations, operator preferences, policies, environment, situations and other factors that may affect the determination.

Information received from the root server apparatus by operators, apparatuses, systems and environments may cause the recipient or recipients to take action or actions or not to take an action, which may be determined by limitations, operator preferences, policies, environment, situations and other factors that may affect the determination.

Figure 8:
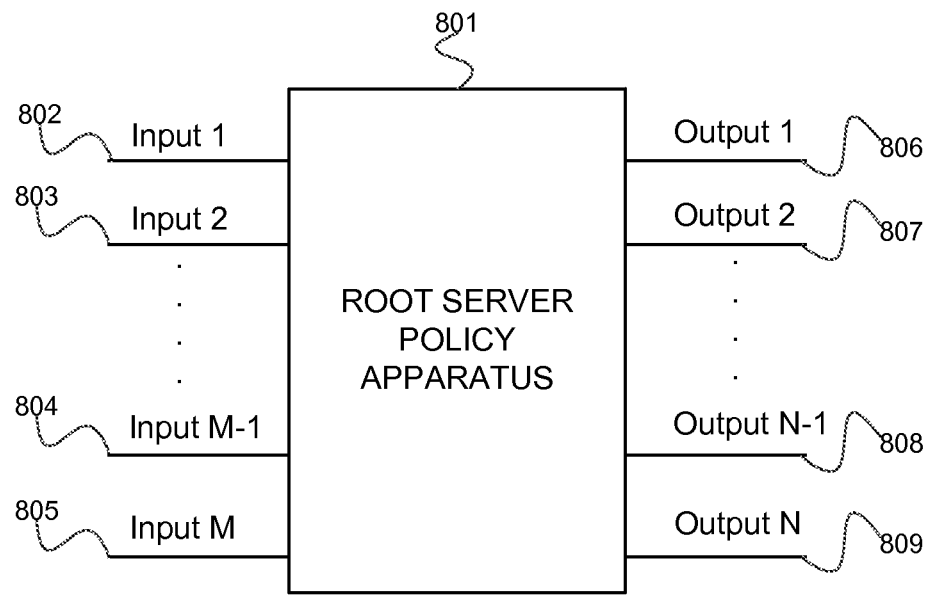
FIG. 8 illustrates a block diagram of root server policy apparatus.

FIG. 8 illustrates a block diagram of root server policy apparatus.

A root server policy apparatus 801 may include at least one input connection, which may be labeled as input 1 802, input 2 803, numbered through input M−1 804, input M 805.

A root server policy apparatus 801 may include at least one output connection, which may be labeled as output 1 806, output 2 807, numbered through output N−1 808, output N 809.

A root server policy apparatus may include one or more of CPU, GPU, RAM, ROM, BIOS, firmware, storage, bus, bus controllers, switch, switch controllers, memory controller, CPU cache, memory cache, storage cache, storage, wired network I/O, wireless network I/O, I/O controller, audio I/O, storage I/O, expansion ports, local I/O, general purpose controllers, power supplies, multipurpose I/O ports, RS422 ports, RS232 ports, parallel ports, Bluetooth interfaces, infrared interfaces, relays, analog I/O ports, digital I/O ports, chassis, keyboard, mouse, display monitors, LCD displays and other hardware and software components that will make the system functional.

A root server policy apparatus collects various data from its data connections, data connections may be in the form of wet contact switch, dry contact switch, data communication, analog circuit state, digital circuit state, serial communication, RS422, RS232, parallel communication, wireless communication, Bluetooth, Infrared, wired communication, interfaces with other apparatuses, interfaces with other systems, TCP/IP communications, and form of communications that allows root server policy apparatus to receive data from operator, environment, systems, apparatuses and other root server policy apparatuses.

A root server policy apparatus may use policy methods.

A root server policy apparatus may detect the presence of apparatuses, systems it may have information about or it may be communicating directly with or it may be communicating through another apparatus such as discovery apparatus. Such information may include whether device is connected or disconnected, whether it responds to commands.

A root server policy apparatus may identify, if available, the manufacturer, model, version, firmware version of apparatuses, systems it may have information about or it may be communicating with.

A root server policy apparatus may identify capabilities of apparatuses, systems it may have information about or it may be communicating directly with or it may be communicating through another apparatus such as discovery apparatus. Such information may include speeds of communication supported, number of communications channels supported, resolutions supported, connection types supported, environmental operating range.

A root server policy apparatus may identify the control commands supported by apparatuses, systems it may have information about or it may be communicating directly with or it may be communicating through another apparatus such as discovery apparatus. Such information may include full command set, or partial command set, alternative command set, compatible command set, multiple command sets.

A root server policy apparatus may identify information about people, resources by communicating with calendaring apparatuses, systems it may have information about or it may be communicating directly with or it may be communicating through another apparatus such as discovery apparatus. Such information may include information in calendar entries, attendee lists in calendar entries, attachments in calendar entries, scheduling, availability usage information, auditing information.

A root server policy apparatus may identify information about people, resources by communicating with web conferencing apparatuses, systems it may have information about or it may be communicating directly with or it may be communicating through another apparatus such as discovery apparatus. Such information may include availability, scheduling, URLs, IP addresses, port numbers, usernames, passwords usage information, auditing information.

A root server policy apparatus may identify information about people, resources by communicating with video conferencing apparatuses, systems it may have information about or it may be communicating directly with or it may be communicating through another apparatus such as discovery apparatus. Such information may include free/busy status, address book, scheduling, URLs, IP addresses, port numbers, usernames, passwords usage information, auditing information.

A root server policy apparatus may identify information about people, resources by communicating with audio conferencing apparatuses, systems it may have information about or it may be communicating directly with or it may be communicating through another apparatus such as discovery apparatus. Such information may include free/busy status, address book, scheduling, phone numbers, URLs, IP addresses, port numbers, usernames, passwords, certificates, SIP addresses, gateway addresses, call manager addresses, multipoint conference unit addresses, DSP resource information, DSP utilization information usage information, auditing information.

A root server policy apparatus may identify information about people, resources by communicating with multi point conferencing apparatuses, systems it may have information about or it may be communicating directly with or it may be communicating through another apparatus such as discovery apparatus. Such information may include free/busy status, address book, scheduling, phone numbers, URLs, IP addresses, port numbers, usernames, passwords, certificates, SIP addresses, gateway addresses, call manager addresses, multipoint conference unit addresses, DSP resource information, DSP utilization information usage information, auditing information.

A root server policy apparatus may identify information about people, resources by communicating with e-mail apparatuses, systems it may have information about or it may be communicating directly with or it may be communicating through another apparatus such as discovery apparatus. Such information may include e-mails, contacts, availability, free/busy status, address book, scheduling, e-mail configuration, server side rules, client side rules, usage information, auditing information.

A root server policy apparatus may identify information about people, resources by communicating with apparatuses, systems it may have information about or it may be communicating directly with or it may be communicating through another apparatus such as discovery apparatus, where apparatuses, systems allows one or more parties to communicate e.g. with each other. Such information may include availability, free/busy status, address book, scheduling.

A root server policy apparatus may identify information about people, resources by communicating with phone or telephone apparatuses, systems it may have information about or it may be communicating directly with or it may be communicating through another apparatus such as discovery apparatus. Such information may include availability, free/busy status, address book, scheduling, phone numbers, directory information.

A root server policy apparatus may identify issues about people, resources by communicating with apparatuses, systems it may have information about or it may be communicating directly with or it may be communicating through another apparatus such as discovery apparatus. A root server policy apparatus may be in a communication about the issues with apparatuses, systems that may be involved. A root server policy apparatus may take corrective action, may update its records, may inform other apparatuses about the information received, may inform other systems about the information received, may cause other apparatuses, systems to take actions that may be determined by root server policy apparatus and/or other apparatuses/systems. Such issues and information may include apparatus disconnect information, system disconnect information, call disconnect information, network error information, packet loss information, error codes, crash logs, alternative route information, primary route lost information, schedule changes, availability changes, free/busy status changes, changes to address book, changes to scheduling, changes to phone numbers, changes to directory information.

A root server policy apparatus may identify information about services provided by apparatuses, systems by communicating with apparatuses, systems it may have information about or it may be communicating directly with or it may be communicating through another apparatus such as discovery apparatus. Such information may include directory services, e-mail services, calendaring services, name resolution services, WINS services, DNS services, file sharing services, print services, office automation services, home automations services, lighting control services, security services, alarm services.

A root server policy apparatus may identify information about pooled apparatuses, systems by communicating with apparatuses, systems it may have information about or it may be communicating directly with or it may be communicating through another apparatus such as discovery apparatus. Such information may include finding apparatuses that are in the same system, network, department, organization, town, city, country, geographical location.

A root server policy apparatus may identify information about network apparatuses, systems by communicating with apparatuses, systems it may have information about or it may be communicating directly with or it may be communicating through another apparatus such as discovery apparatus. Such information may include IP addresses, network masks, gateways, access lists, permit lists, deny lists, firewalls, routers, switches, operating system versions, virtual private networks, redundancy information, failover information, cost, latency, jitter, round trip delay, delay, bandwidth, channels, line protocols, department, organization, town, city, country, geographical location.

A root server policy apparatus may identify information about controlling apparatuses, systems by communicating with apparatuses, systems it may have information about or it may be communicating directly with or it may be communicating through another apparatus such as discovery apparatus. Such information may include IP addresses, network masks, gateways, number of ports, port types, devices connected to ports, signal levels, signal types, environmental information, interaction devices controlling system is connected to, other apparatuses controlling apparatus is connected to, other systems controlling apparatus is connected to. Such information from controlling apparatuses may also include access lists, permit lists, deny lists, firewalls, routers, switches, operating system versions, virtual private networks, redundancy information, failover information, cost, latency, jitter, round trip delay, delay, bandwidth, channels, line protocols, department, organization, town, city, country, geographical location.

A root server policy apparatus may identify information about interaction apparatuses, systems by communicating with apparatuses, systems it may have information about or it may be communicating directly with or it may be communicating through another apparatus such as discovery apparatus. Such information may include IP addresses, network masks, gateways, type of interaction apparatus, software version, number of touches supported, signal levels, signal types, environmental information, information about the controlling apparatus interaction apparatus is connected to, other apparatuses interaction apparatus is connected to or communicating with, other systems interaction apparatus is connected to or communicating with.

A root server policy apparatus may identify information about intention detection and action apparatuses, systems by communicating with apparatuses, systems it may have information about or it may be communicating directly with or it may be communicating through another apparatus such as discovery apparatus. Such information may include IP addresses, network masks, gateways, connection methods, communication protocols, request types.

A root server policy apparatus may communicate to all apparatuses and systems it may be connected to.

Behavior of a root server policy apparatus may be modified by one or more root server policy apparatuses.

Inputs of a root server policy apparatus may pass through a root server policy apparatus.

Outputs of a root server policy apparatus may pass through a root server policy apparatus.

A root server policy apparatus may communicate with a root server policy apparatus and may feed data to root server policy apparatus for root server policy apparatus to inspect. Root server policy apparatus may decide to accept/deny a request and/or send/don't send a response based on the information received from the root server policy apparatus.

A root server policy apparatus may communicate with discovery apparatuses, policy apparatuses, communications mapping apparatuses, lookup apparatuses, publishing apparatuses, root server connector apparatuses, root server apparatuses, root server root server policy apparatuses, pooling apparatuses.

A root server policy apparatus may classify the information that may be stored in the root server policy apparatus or by using information that may be obtained from communications with other apparatus and systems.

A root server policy apparatus may have an input buffer to queue incoming requests.

A root server policy apparatus may have an output buffer to queue outbound responses.

A root server policy apparatus may have a decision logic to which may use decision criteria which may be defined by user, apparatus, system, administrator, department, organization, city, state, federal government and government.

Decision criteria may include policies of the user, apparatus, system, administrator, department, organization, city, state, federal government and government.

Decision criteria may include singularity or plurality of policies.

Policies may include one or more of rules, conditional rules, complex rules, rules that are combination of other rules, rules that are combined with AND logic operators, OR logic operators, XOR logic operators, NOT logic operators and other logic operators.

Rules may include parameters such as financial cost, billability, time of day, day of week, month, year, electric consumption, efficiency, temperature, area, department, room, city, state, country, continent, other parameters that may be required by user, apparatus, system, administrator, department, organization, city, state, federal government and government.

Rules may include operators such as greater than, less than, equal, greater than and equal, less than and equal, range, match, wildcard match, list match and other operators that may be required by user, apparatus, system, administrator, department, organization, city, state, federal government and government.

Rules may include recursive rules.

Decision logic may include a preconfigured default rule set.

Decision criteria may include a preconfigured policy and rule set.

Root server policy apparatus may inspect the data through the root server policy apparatus by receiving the data on input, inspect data, filter out the data that is not allowed by the policy or policies, pass the allowed data to output.

Root server policy apparatus may inspect the data through the root server policy apparatus by receiving the data on input from originating apparatus, inspect data, filter out the data that is not allowed by the policy or policies, pass the allowed data to output to destination apparatus.

Root server policy apparatus may inspect the data through the root server policy apparatus by receiving the data on input from originating apparatus, inspect data, filter out the data that is not allowed by the policy or policies, pass the allowed data to output back to origination apparatus.

Root server policy apparatus may inspect the data presented by originating apparatus and may provide an output meaning "allow" or "do not allow" to the presenting apparatus or other apparatuses.

Root server policy apparatus may inspect the data presented by another apparatus and may provide an output which may contain a message listing what fields are allowed to the presenting apparatus or other apparatuses.

Root server policy apparatus may inspect the data presented by another apparatus and may provide a message specifying rules for filtering the data to the presenting apparatus or other apparatuses.

Root server policy apparatus may track the state of data contents and context which may result in applying policies more effectively. Tracking may be all data, partial data, summarized data, time window data, all context, partial context, summarized context, time window context, and any other data or context state tracking that may be required by user, apparatus, system, administrator, department, organization, city, state, federal government and government.

A root server policy apparatus may synchronize with public root server policy apparatuses. An example may be providing public policies. What may be synchronized may be dictated by company policy which may be enforced by root server policy apparatus which may be working in conjunction with root server policy apparatus.

A root server policy apparatus may synchronize with root server policy apparatuses in other organizations. An example may be providing public policies. What may be synchronized may be dictated by company policy which may be enforced by a root server policy apparatus which may be working in conjunction with root server policy apparatus.

A root server policy apparatus may synchronize with other apparatuses in real time, at scheduled times, at scheduled intervals or at other time schedules or time patterns.

A root server policy apparatus may synchronize with other apparatuses in push, pull, push/pull replication, or using other synchronization methods.

A root server policy apparatus may fully or partially synchronize with one or more discovery apparatuses.

A root server policy apparatus may fully or partially synchronize with one or more communication mapping apparatuses.

A root server policy apparatus may fully or partially synchronize with one or more lookup apparatuses.

A root server policy apparatus may fully or partially synchronize with one or more publishing apparatuses.

A root server policy apparatus may fully or partially synchronize with one or more root server connector apparatuses.

A root server policy apparatus may provide reporting information by using information that may be stored in the root server policy apparatus or by using information that is obtained from communications with other apparatus and systems.

A root server policy apparatus may utilize at least one or more of decision trees, data structures, statistical analysis methods, data analysis, analytics, pairwise comparison, n-tree structures, other structures and/or analysis methods that may help performing the functions of the root server policy apparatus.

A root server policy apparatus may provide information to discovery apparatuses, policy apparatuses, communications mapping apparatuses, lookup apparatuses, publishing apparatuses, root server connector apparatuses, root server apparatuses, root server root server policy apparatuses, pooling apparatuses.

A root server policy apparatus may generate configuration and software code.

A root server policy apparatus may configure or program discovery apparatuses, policy apparatuses, communications mapping apparatuses, lookup apparatuses, publishing apparatuses, root server connector apparatuses, root server apparatuses, root server root server policy apparatuses, pooling apparatuses and other apparatuses and systems it is connected to, which may improve communicating, discovering, categorizing and building reference information functions and other functions root server policy apparatus may have.

A root server policy apparatus may configure and program the apparatuses and systems directly or through another apparatus such as controlling apparatus, terminal server, terminal server client, console server. This may improve the function of root server policy apparatus or other apparatus and systems that may be related and/or part of the system.

Other apparatus or systems may request root server policy apparatus to perform certain tasks it is capable of.

A root server policy apparatus may store the information it may receive or send and may access that information if it is needed.

A root server policy apparatus may store the information it may generate and may access that information if it is needed.

A root server policy apparatus may transfer the information it has to other apparatuses and may keep them synchronized.

A root server policy apparatus may be in a redundant configuration with two or more root server policy apparatuses which may help for recovery in case one of the root server policy apparatuses may not perform its functions.

A root server policy apparatus may be in a load balance and/or redundant configuration with two or more root server policy apparatuses, which may improve the speed of policy and providing reference information, which may help for recovery in case one of the root server policy apparatuses may not perform its functions.

A root server policy apparatus may synchronize with other apparatuses over a dedicated connection just for synchronization or a shared connection that may be used for other purposes in addition to synchronization.

Information received from the root server policy apparatus may be used, discarded, allowed, denied and altered by operators, apparatuses, systems and environments that may receive such information, which may be determined by limitations, operator preferences, policies, environment, situations and other factors that may affect the determination.

Information received from the root server policy apparatus by operators, apparatuses, systems and environments may cause the recipient or recipients to take action or actions or not to take an action, which may be determined by limitations, operator preferences, policies, environment, situations and other factors that may affect the determination.

Figure 9:
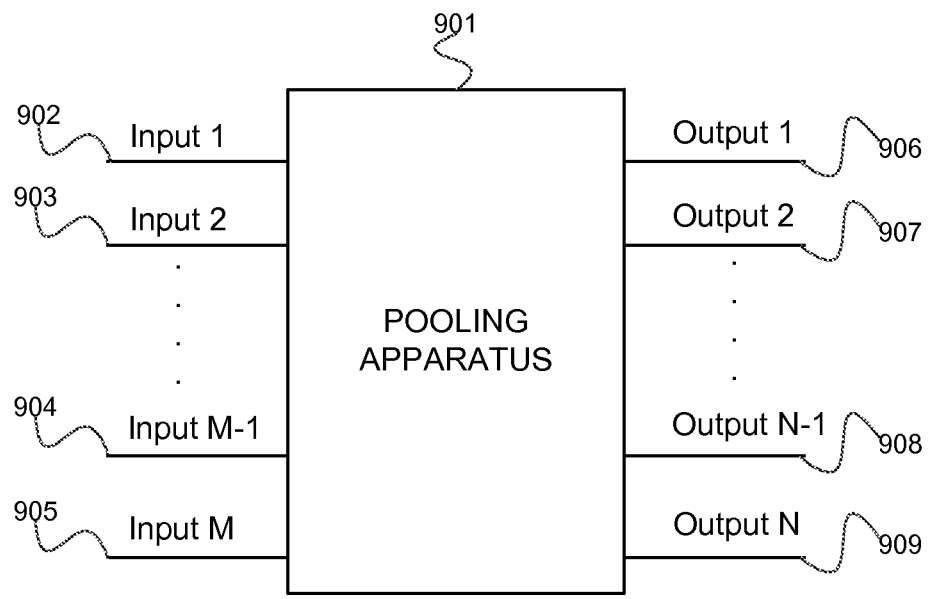
FIG. 9 illustrates a block diagram of pooling apparatus.

FIG. 9 illustrates a block diagram of pooling apparatus.

A pooling apparatus 901 may include at least one input connection, which may be labeled as input 1 902, input 2 903, numbered through input M−1 904, input M 905.

A pooling apparatus 901 may include at least one output connection, which may be labeled as output 1 906, output 2 907, numbered through output N−1 908, output N 909.

A pooling apparatus may include one or more of CPU, GPU, RAM, ROM, BIOS, firmware, storage, bus, bus controllers, switch, switch controllers, memory controller, CPU cache, memory cache, storage cache, storage, wired network I/O, wireless network I/O, I/O controller, audio I/O, storage I/O, expansion ports, local I/O, general purpose controllers, power supplies, multipurpose I/O ports, RS422 ports, RS232 ports, parallel ports, Bluetooth interfaces, infrared interfaces, relays, analog I/O ports, digital I/O ports, chassis, keyboard, mouse, display monitors, LCD displays and other hardware and software components that will make the system functional.

A pooling apparatus collects various data from its data connections, data connections may be in the form of wet contact switch, dry contact switch, data communication, analog circuit state, digital circuit state, serial communication, RS422, RS232, parallel communication, wireless communication, Bluetooth, Infrared, wired communication, interfaces with other apparatuses, interfaces with other systems, TCP/IP communications, and form of communications that allows pooling apparatus to receive data from operator, environment, systems, apparatuses and other pooling apparatuses.

A pooling apparatus may use pooling methods.

A pooling apparatus may detect the presence of apparatuses, systems it may have information about or it may be communicating directly with or it may be communicating through another apparatus such as discovery apparatus. Such information may include whether device is connected or disconnected, whether it responds to commands.

A pooling apparatus may identify, if available, the manufacturer, model, version, firmware version of apparatuses, systems it may have information about or it may be communicating with.

A pooling apparatus may identify capabilities of apparatuses, systems it may have information about or it may be communicating directly with or it may be communicating through another apparatus such as discovery apparatus. Such information may include speeds of communication supported, number of communications channels supported, resolutions supported, connection types supported, environmental operating range.

A pooling apparatus may identify the control commands supported by apparatuses, systems it may have information about or it may be communicating directly with or it may be communicating through another apparatus such as discovery apparatus. Such information may include full command set, or partial command set, alternative command set, compatible command set, multiple command sets.

A pooling apparatus may identify information about people, resources by communicating with calendaring apparatuses, systems it may have information about or it may be communicating directly with or it may be communicating through another apparatus such as discovery apparatus. Such information may include information in calendar entries, attendee lists in calendar entries, attachments in calendar entries, scheduling, availability usage information, auditing information.

A pooling apparatus may identify information about people, resources by communicating with web conferencing apparatuses, systems it may have information about or it may be communicating directly with or it may be communicating through another apparatus such as discovery apparatus. Such information may include availability, scheduling, URLs, IP addresses, port numbers, usernames, passwords usage information, auditing information.

A pooling apparatus may identify information about people, resources by communicating with video conferencing apparatuses, systems it may have information about or it may be communicating directly with or it may be communicating through another apparatus such as discovery apparatus. Such information may include free/busy status, address book, scheduling, URLs, IP addresses, port numbers, usernames, passwords usage information, auditing information.

A pooling apparatus may identify information about people, resources by communicating with audio conferencing apparatuses, systems it may have information about or it may be communicating directly with or it may be communicating through another apparatus such as discovery apparatus. Such information may include free/busy status, address book, scheduling, phone numbers, URLs, IP addresses, port numbers, usernames, passwords, certificates, SIP addresses, gateway addresses, call manager addresses, multipoint conference unit addresses, DSP resource information, DSP utilization information usage information, auditing information.

A pooling apparatus may identify information about people, resources by communicating with multi point conferencing apparatuses, systems it may have information about or it may be communicating directly with or it may be communicating through another apparatus such as discovery apparatus. Such information may include free/busy status, address book, scheduling, phone numbers, URLs, IP addresses, port numbers, usernames, passwords, certificates, SIP addresses, gateway addresses, call manager addresses, multipoint conference unit addresses, DSP resource information, DSP utilization information usage information, auditing information.

A pooling apparatus may identify information about people, resources by communicating with e-mail apparatuses, systems it may have information about or it may be communicating directly with or it may be communicating through another apparatus such as discovery apparatus. Such information may include e-mails, contacts, availability, free/busy status, address book, scheduling, e-mail configuration, server side rules, client side rules, usage information, auditing information.

A pooling apparatus may identify information about people, resources by communicating with apparatuses, systems it may have information about or it may be communicating directly with or it may be communicating through another apparatus such as discovery apparatus, where apparatuses, systems allows one or more parties to communicate e.g. with each other. Such information may include availability, free/busy status, address book, scheduling.

A pooling apparatus may identify information about people, resources by communicating with phone or telephone apparatuses, systems it may have information about or it may be communicating directly with or it may be communicating through another apparatus such as discovery apparatus. Such information may include availability, free/busy status, address book, scheduling, phone numbers, directory information.

A pooling apparatus may identify issues about people, resources by communicating with apparatuses, systems it may have information about or it may be communicating directly with or it may be communicating through another apparatus such as discovery apparatus. A pooling apparatus may be in a communication about the issues with apparatuses, systems that may be involved. A pooling apparatus may take corrective action, may update its records, may inform other apparatuses about the information received, may inform other systems about the information received, may cause other apparatuses, systems to take actions that may be determined by pooling apparatus and/or other apparatuses/systems. Such issues and information may include apparatus disconnect information, system disconnect information, call disconnect information, network error information, packet loss information, error codes, crash logs, alternative route information, primary route lost information, schedule changes, availability changes, free/busy status changes, changes to address book, changes to scheduling, changes to phone numbers, changes to directory information.

A pooling apparatus may identify information about services provided by apparatuses, systems by communicating with apparatuses, systems it may have information about or it may be communicating directly with or it may be communicating through another apparatus such as discovery apparatus. Such information may include directory services, e-mail services, calendaring services, name resolution services, WINS services, DNS services, file sharing services, print services, office automation services, home automations services, lighting control services, security services, alarm services.

A pooling apparatus may identify information about pooled apparatuses, systems by communicating with apparatuses, systems it may have information about or it may be communicating directly with or it may be communicating through another apparatus such as discovery apparatus. Such information may include finding apparatuses that are in the same system, network, department, organization, town, city, country, geographical location.

A pooling apparatus may identify information about network apparatuses, systems by communicating with apparatuses, systems it may have information about or it may be communicating directly with or it may be communicating through another apparatus such as discovery apparatus. Such information may include IP addresses, network masks, gateways, access lists, permit lists, deny lists, firewalls, routers, switches, operating system versions, virtual private networks, redundancy information, failover information, cost, latency, jitter, round trip delay, delay, bandwidth, channels, line protocols, department, organization, town, city, country, geographical location.

A pooling apparatus may identify information about controlling apparatuses, systems by communicating with apparatuses, systems it may have information about or it may be communicating directly with or it may be communicating through another apparatus such as discovery apparatus. Such information may include IP addresses, network masks, gateways, number of ports, port types, devices connected to ports, signal levels, signal types, environmental information, interaction devices controlling system is connected to, other apparatuses controlling apparatus is connected to, other systems controlling apparatus is connected to. Such information from controlling apparatuses may also include access lists, permit lists, deny lists, firewalls, routers, switches, operating system versions, virtual private networks, redundancy information, failover information, cost, latency, jitter, round trip delay, delay, bandwidth, channels, line protocols, department, organization, town, city, country, geographical location.

A pooling apparatus may identify information about interaction apparatuses, systems by communicating with apparatuses, systems it may have information about or it may be communicating directly with or it may be communicating through another apparatus such as discovery apparatus. Such information may include IP addresses, network masks, gateways, type of interaction apparatus, software version, number of touches supported, signal levels, signal types, environmental information, information about the controlling apparatus interaction apparatus is connected to, other apparatuses interaction apparatus is connected to or communicating with, other systems interaction apparatus is connected to or communicating with.

A pooling apparatus may identify information about intention detection and action apparatuses, systems by communicating with apparatuses, systems it may have information about or it may be communicating directly with or it may be communicating through another apparatus such as discovery apparatus. Such information may include IP addresses, network masks, gateways, connection methods, communication protocols, request types.

A pooling apparatus may communicate to all apparatuses and systems it may be connected to.

A pooling apparatus may communicate with discovery apparatuses, policy apparatuses, communications mapping apparatuses, lookup apparatuses, publishing apparatuses, root server connector apparatuses, root server apparatuses, root server policy apparatuses, pooling apparatuses.

A pooling apparatus may classify the information that may be stored in the pooling apparatus or by using information that may be obtained from communications with other apparatus and systems.

Behavior of a pooling apparatus may be modified by one or more policy apparatuses.

Inputs of a pooling apparatus may pass through policy apparatus.

Outputs of a pooling apparatus may pass through policy apparatus.

A pooling apparatus may communicate with a policy apparatus and may feed data to policy apparatus for policy apparatus to inspect. Pooling apparatus may decide to accept/deny a request and/or send/don't send a response based on the information received from the policy apparatus.

A pooling apparatus may provide information requested by other people, apparatuses, systems. Such information may include calendar entries, free/busy information, availability, connection information, access information, phone numbers, IP addresses, usernames, passwords, certificates, connection speeds, number of simultaneous connections available, usage information, and other information that is being made accessible by other people, apparatuses, systems.

Access information may include but not limited to fully qualified domain name (FQDN)s, IP addresses, domain names, sub domain names, usernames, passwords, certificates and any other information needed to access a certain apparatus or system.

A pooling apparatus may locate and fetch the information being requested.

A pooling apparatus may assign one of the available pooled resources to requestor.

A pooling apparatus may assign a certain pooled resource to requestor if requestor requests the specific resource from the pool.

A pooling apparatus may deny resource requests if there is no resources available in the pool.

A pooling apparatus may deny resource requests if the specific resource requested from the pool is not available.

A pooling apparatus may deny or grant resource requests in coordination with one or more policy apparatuses.

A pooling apparatus may make the resources and/or availability accessible through lookup apparatus, publishing apparatus, public lookup apparatus, public publishing apparatus, and other apparatuses that may be used to make the information available. What may be published may be determined by one or more policy apparatuses.

A pooling apparatus may coordinate with calendaring systems or e-mail systems to book, read details or check availability of resources it may be pooling.

A pooling apparatus may include a storage. Storage may store requests, responses, and any other information that may be needed for the function of pooling apparatus.

A pooling apparatus may include a cache. Cache may store the information that may be frequently accessed. Cache may be a storage that may be accessed faster than storage used in the apparatus. Cache may cache requests and responses. Cache may cache information stored in the storage for faster access by the lookup method and pooling apparatus. Cache may be read only, write through, adaptive, or may use other caching algorithms.

A pooling apparatus may synchronize with public pooling apparatuses. An example may be providing availability of conference rooms. What may be synchronized may be dictated by company policy which may be enforced by a policy apparatus which may be working in conjunction with pooling apparatus.

A pooling apparatus may synchronize with pooling apparatuses in other organizations. An example may be providing availability of conference rooms. What may be synchronized may be dictated by company policy which may be enforced by a policy apparatus which may be working in conjunction with pooling apparatus.

A pooling apparatus may synchronize with other apparatuses in real time, at scheduled times, at scheduled intervals or at other time schedules or time patterns.

A pooling apparatus may synchronize with other apparatuses in push, pull, push/pull replication, or using other synchronization methods.

A pooling apparatus may require requestors to be authenticated by username, password, certificates. Certificates may be required to be from one or more of private certificate authorities that may be in organization, private certificate authorities that may be in another organization, public certificate authorities.

A pooling apparatus may fully or partially synchronize with one or more calendaring apparatuses.

A pooling apparatus may fully or partially synchronize with one or more e-mail apparatuses.

A pooling apparatus may fully or partially synchronize with one or more discovery apparatuses.

A pooling apparatus may fully or partially synchronize with one or more communication mapping apparatuses.

A pooling apparatus may fully or partially synchronize with one or more pooling apparatuses.

A pooling apparatus may fully or partially synchronize with one or more publishing apparatuses.

A pooling apparatus may fully or partially synchronize with one or more root server connector apparatuses.

A pooling apparatus may provide reporting information by using information that may be stored in the pooling apparatus or by using information that is obtained from communications with other apparatus and systems.

A pooling apparatus may utilize at least one or more of decision trees, data structures, statistical analysis methods, data analysis, analytics, pairwise comparison, n-tree structures, other structures and/or analysis methods that may help performing the functions of the pooling apparatus.

A pooling apparatus may provide information to discovery apparatuses, policy apparatuses, communications mapping apparatuses, lookup apparatuses, publishing apparatuses, root server connector apparatuses, root server apparatuses, root server policy apparatuses, pooling apparatuses.

A pooling apparatus may generate configuration and software code.

A pooling apparatus may configure or program discovery apparatuses, policy apparatuses, communications mapping apparatuses, lookup apparatuses, publishing apparatuses, root server connector apparatuses, root server apparatuses, root server policy apparatuses, pooling apparatuses and other apparatuses and systems it is connected to, which may improve communicating, discovering, categorizing and building reference information functions and other functions pooling apparatus may have.

A pooling apparatus may configure and program the apparatuses and systems directly or through another apparatus such as controlling apparatus, terminal server, terminal server client, console server. This may improve the function of pooling apparatus or other apparatus and systems that may be related and/or part of the system.

Other apparatus or systems may request pooling apparatus to perform certain tasks it is capable of.

A pooling apparatus may store the information it may receive or send and may access that information if it is needed.

A pooling apparatus may store the information it may generate and may access that information if it is needed.

A pooling apparatus may transfer the information it has to other apparatuses and may keep them synchronized.

A pooling apparatus may be in a redundant configuration with two or more pooling apparatuses which may help for recovery in case one of the pooling apparatuses may not perform its functions.

A pooling apparatus may be in a load balance and/or redundant configuration with two or more pooling apparatuses, which may improve the speed of lookup and providing reference information, which may help for recovery in case one of the pooling apparatuses may not perform its functions.

A pooling apparatus may synchronize with other apparatuses over a dedicated connection just for synchronization or a shared connection that may be used for other purposes in addition to synchronization.

Information received from the pooling apparatus may be used, discarded, allowed, denied and altered by operators, apparatuses, systems and environments that may receive such information, which may be determined by limitations, operator preferences, policies, environment, situations and other factors that may affect the determination.

Information received from the pooling apparatus by operators, apparatuses, systems and environments may cause the recipient or recipients to take action or actions or not to take an action, which may be determined by limitations, operator preferences, policies, environment, situations and other factors that may affect the determination.

Figure 10:
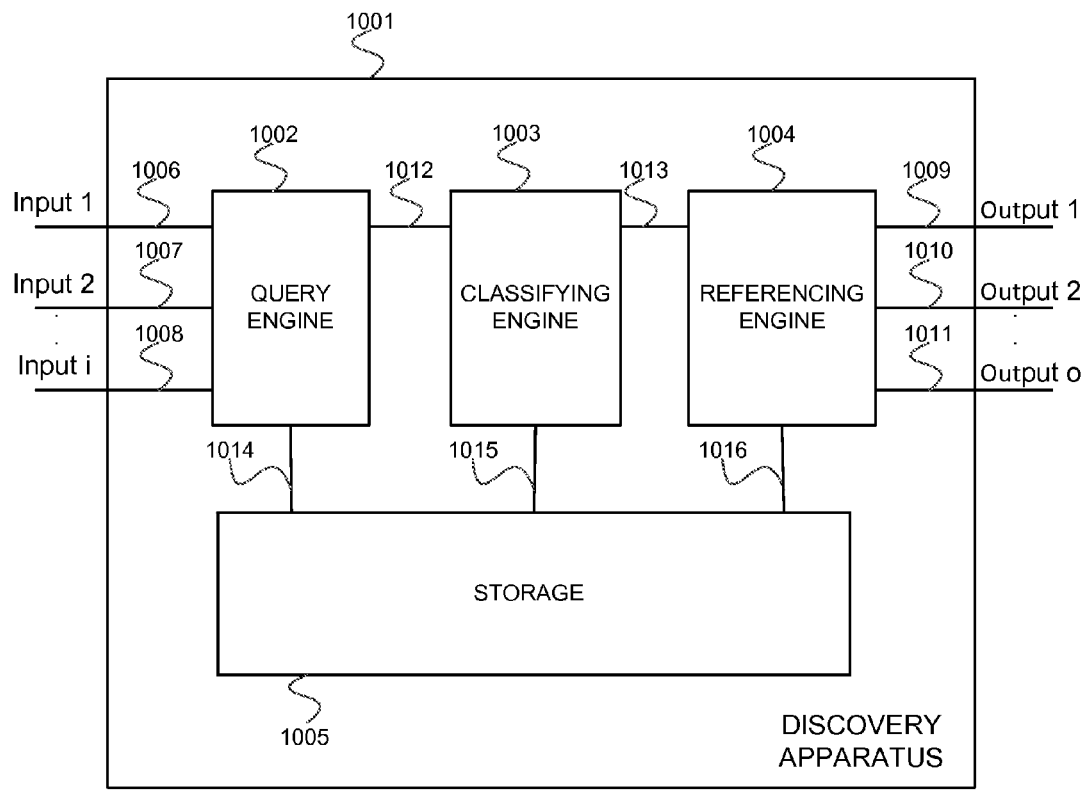
FIG. 10 illustrates an example of discovery apparatus such as discovery apparatus 101 of FIG. 1.

FIG. 10 illustrates an example of discovery apparatus such as discovery apparatus 101 of FIG. 1.

In this example discovery apparatus acts as information gathering apparatus.

It queries the information using input communication ports to communicate with apparatuses, systems, operators, administrators. It receives the information over input ports, classifies the information, and creates a reference database.

It receives queries for reference database over output connections and responds with reference information over output connections.

In a discovery apparatus 1001 there may be one or more connections 1006 1007 1008 which may communicate with a query engine 1002 that may exist in discovery apparatus 1001.

Query engine 1002 may query information from at least one or more of apparatuses, systems, operators, administrators.

Query engine 1002 may connect 1014 to storage 1005 and may store information in storage.

Query engine 1002 may connect 1012 to classifying engine 1003 and send information to classifying engine 1003. Information that may be sent may be full information or partial information or full updates or partial updates.

Query engine 1002 may connect 1012 to classifying engine 1003 and send information to classifying engine 1003 and may also connect 1014 to storage 1005 and may store information in storage.

Query engine 1002 may connect 1014 to storage 1005 and may store information in storage and may also connect 1012 to classifying engine 1003 and may notify classifying engine 1003. Classifying engine 1003 may connect 1015 to storage and may fetch the information from the storage 1005 with or without notification received from query engine 1002. Information that may be fetched may be full information or partial information or full updates or partial updates.

Classifying engine 1003 may process the information and may organize and/or classify the information based on the organization and/or classification parameters that may be set by apparatuses, systems operators, administrators.

Classifying engine 1003 may query information from at least one or more of apparatuses, systems, operators, administrators.

Classifying engine 1003 may connect 1015 to storage 1005 and may store information in storage.

Classifying engine 1003 may connect 1013 to referencing engine 1004 and send information to referencing engine 1004. Information that may be sent may be full information or partial information or full updates or partial updates.

Classifying engine 1003 may connect 1013 to referencing engine 1004 and send information to referencing engine 1004 and may also connect 1015 to storage 1005 and may store information in storage.

Classifying engine 1003 may connect 1015 to storage 1005 and may store information in storage and may also communicate with referencing engine 1004 and may notify referencing engine 1004. Classifying engine 1003 may connect 1015 to storage and may fetch the information from the storage 1005 with or without notification received from referencing engine 1004. Information that may be fetched may be full information or partial information or full updates or partial updates.

In a discovery apparatus 1001 there may be one or more connections 1009 1010 1011 which may communicate with a referencing engine 1004 that may exist in discovery apparatus 1001.

Referencing engine 1004 may receive queries for information from at least one or more of apparatuses, systems, using at least one or more connections 1009 1010 1011.

Referencing engine may provide information to other apparatuses, systems, operators, administrators, using at least one or more connections 1009 1010 1011.

Referencing engine 1004 may query information from at least one or more of apparatuses, systems, operators, administrators.

Referencing engine 1004 may connect 1016 to storage 1005 and may store information in storage.

Referencing engine 1004 may connect 1009 1010 1011 to apparatuses, systems, operators and administrators and send information to apparatuses, systems, operators and administrators. Information that may be sent may be full information or partial information or full updates or partial updates.

Referencing engine 1004 may connect 1009 1010 1011 to apparatuses, systems, operators and administrators and send information to apparatuses, systems, operators and administrators and may also connect 1016 to storage 1005 and may store information in storage.

Figure 11:
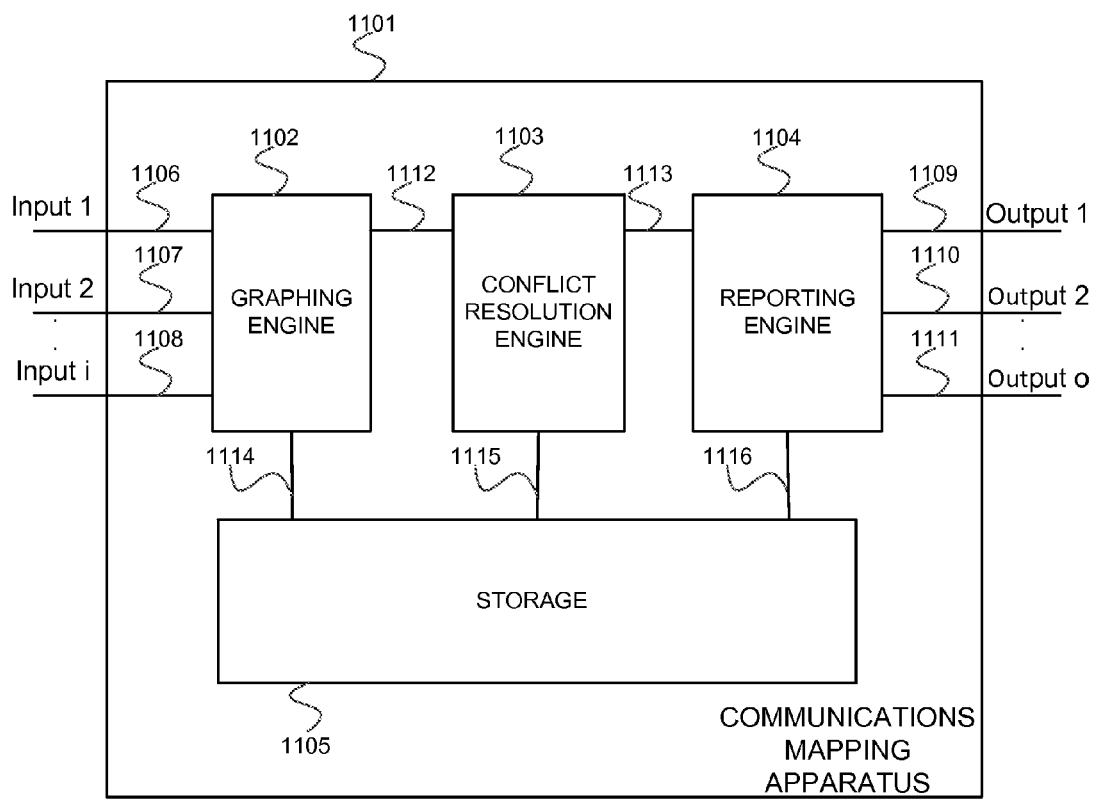
FIG. 11 illustrates an example of communications mapping apparatus such as communications mapping apparatus 201 of FIG. 2.

FIG. 11 illustrates an example of communications mapping apparatus such as communications mapping apparatus 201 of FIG. 2.

In this example communications mapping apparatus acts as information organizing, summarizing, aggregating, analyzing apparatus.

It receives reference information from discovery apparatus using input communication ports. It receives the information creates graphs, resolves conflicts, creates and reports communications maps.

It receives queries for reports on output connections and responds with reference information on output connections.

In the illustrated example the communications mapping apparatus has a graphing engine, a conflict resolution engine and a reporting engine.

The graphing engine receives data from one or more inputs from 1 to i 1106 1107 1108.

The graphing engine may output results to the conflicting resolution engine.

Alternatively or in addition thereto the graphic engine may store the results in the storage.

The reporting engine may output data to one or more outputs 1 to o 1108 1109 1110

In a communications mapping apparatus 1101 there may be one or more connections 1106 1107 1108 which may communicate with a graphing engine 1102 that may exist in communications mapping apparatus 1101.

Graphing engine 1102 may query information from at least one or more of apparatuses, systems, operators, administrators.

Graphing engine 1102 may create computer graphics with nodes, vertexes and other information in graph theory.

Graphing engine 1102 may represent graph information in different formats which may make information exchange possible.

Graphing engine 1102 may connect 1114 to storage 1105 and may store information in storage.

Graphing engine 1102 may connect 1112 to conflict resolution engine 1103 and send information to conflict resolution engine 1103. Information that may be sent may be full information or partial information or full updates or partial updates.

Graphing engine 1102 may connect 1112 to conflict resolution engine 1103 and send information to conflict resolution engine 1103 and may also connect 1114 to storage 1105 and may store information in storage.

Graphing engine 1102 may connect 1114 to storage 1105 and may store information in storage and may also connect 1112 to conflict resolution engine 1103 and may notify conflict resolution engine 1103. Conflict resolution engine 1103 may connect 1115 to storage and may fetch the information from the storage 1105 with or without notification received from graphing engine 1102. Information that may be fetched may be full information or partial information or full updates or partial updates.

Conflict resolution engine 1103 may process the information and may find conflicting information or missing information.

Conflict resolution engine 1103 may query information from at least one or more of apparatuses, systems, operators, administrators.

Conflict resolution engine 1103 may connect 1115 to storage 1105 and may store information in storage.

Conflict resolution engine 1103 may connect 1113 to reporting engine 1104 and send information to reporting engine 1104. Information that may be sent may be full information or partial information or full updates or partial updates.

Conflict resolution engine 1103 may connect 1113 to reporting engine 1104 and send information to reporting engine 1104 and may also connect 1115 to storage 1105 and may store information in storage.

Conflict resolution engine 1103 may connect 1115 to storage 1105 and may store information in storage and may also communicate with reporting engine 1104 and may notify reporting engine 1104. Conflict resolution engine 1103 may connect 1115 to storage and may fetch the information from the storage 1105 with or without notification received from reporting engine 1104. Information that may be fetched may be full information or partial information or full updates or partial updates.

In a communications mapping apparatus 1101 there may be one or more connections 1109 1110 1101 which may communicate with a reporting engine 1104 that may exist in communications mapping apparatus 1101.

Reporting engine 1104 may receive queries for information from at least one or more of apparatuses, systems, using at least one or more connections 1109 1110 1101.

Reporting engine may provide information to other apparatuses, systems, operators, administrators, using at least one or more connections 1109 1110 1101.

Reporting engine 1104 may query information from at least one or more of apparatuses, systems, operators, administrators.

Reporting engine 1104 may connect 1116 to storage 1105 and may store information in storage.

Reporting engine 1104 may connect 1109 1110 1101 to apparatuses, systems, operators and administrators and send information to apparatuses, systems, operators and administrators. Information that may be sent may be full information or partial information or full updates or partial updates.

Reporting engine 1104 may connect 1109 1110 1101 to apparatuses, systems, operators and administrators and send information to apparatuses, systems, operators and administrators and may also connect 1116 to storage 1105 and may store information in storage.

Figure 12:
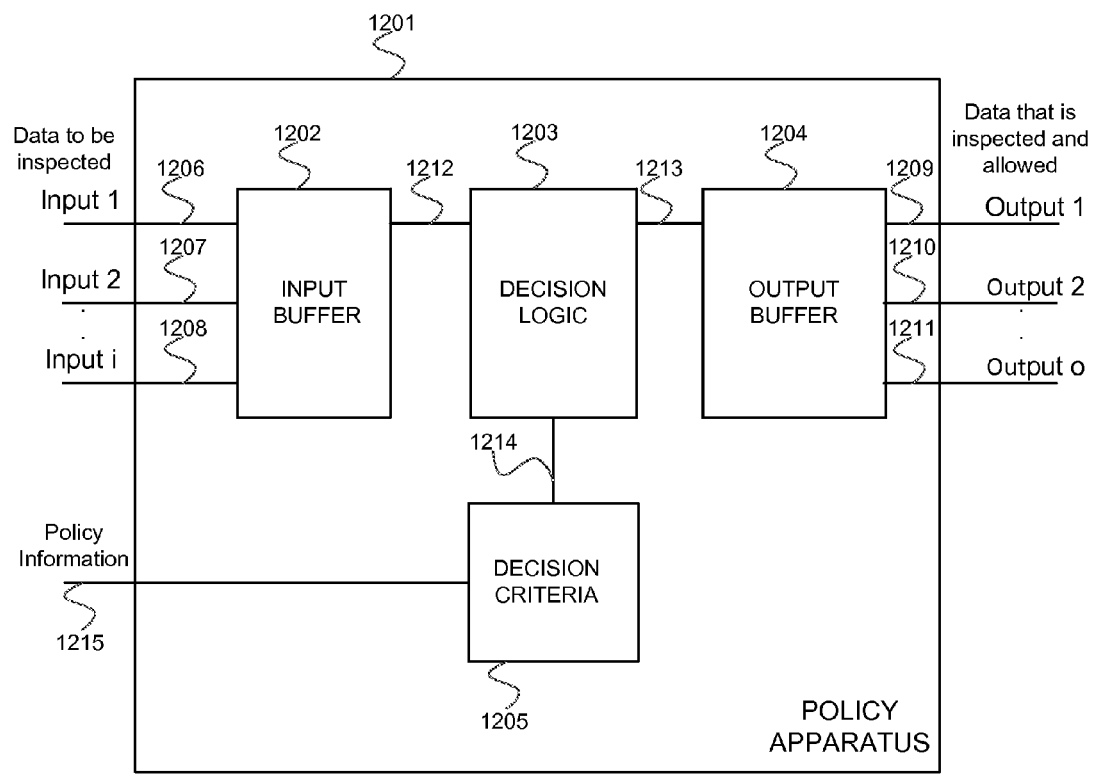
FIG. 12 illustrates an example of policy apparatus such as policy apparatus 301 of FIG. 3.

FIG. 12 illustrates an example of policy apparatus such as policy apparatus 301 of FIG. 3.

In this example policy apparatus acts as an inline policy enforcement apparatus.

It receives information from other apparatuses, buffers the information, inspects information and makes decisions on which part of the information is allowed to pass through the policy apparatus by referring to policies set by operators, administrators, apparatuses, systems. It then sends allowed information from outputs of the apparatus A policy apparatus 1201 may receive policy information 1215 and may store in decision criteria 1205 area.

Decision logic 1203 may have at least one or more inputs 1212 which may have been feed from at least one or more input buffers 1202.

Input buffer 1202 may buffer and prioritize information received from at least one or more policy apparatus inputs 1206 1207 1208.

Decision logic 1203 may have at least one or more outputs 1213 which may feed an output buffer 1204.

Output buffer 1204 may buffer information received from decision logic 1203 and send using at least one or more policy apparatus outputs 1209 1210 1211.

Figure 13:
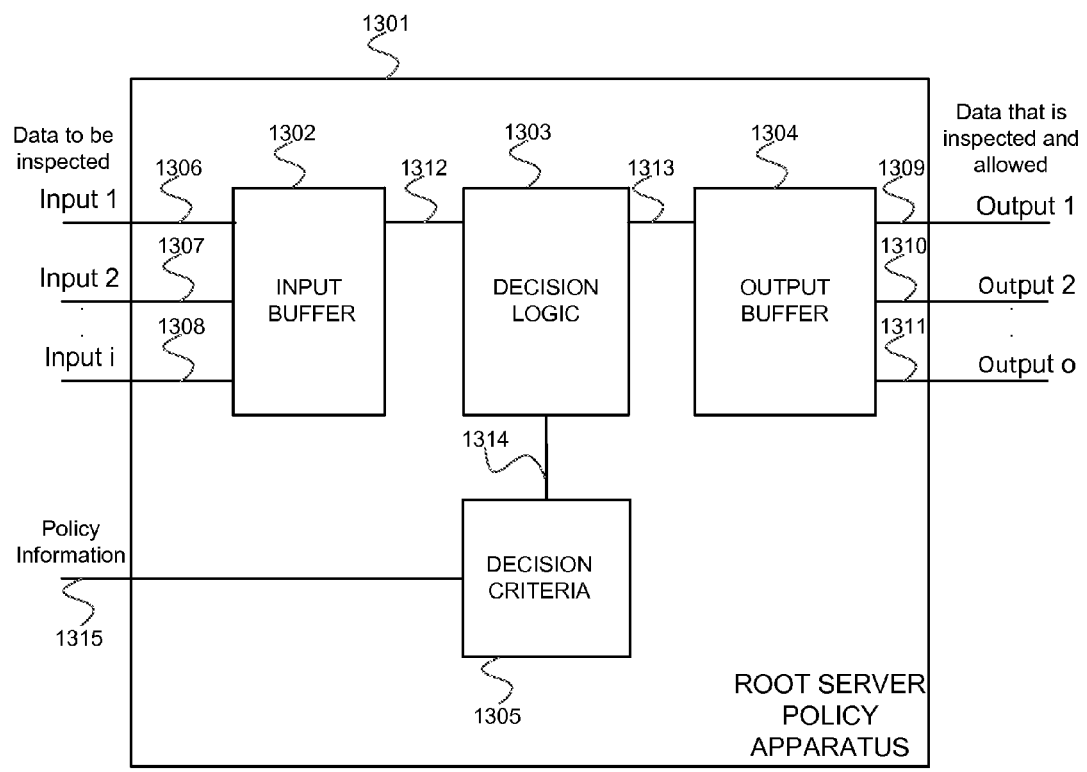
FIG. 13 illustrates an example of root server policy apparatus such as root server policy apparatus 601 of FIG. 6.

FIG. 13 illustrates an example of root server policy apparatus such as root server policy apparatus 601 of FIG. 6.

In this example root server policy apparatus acts as an inline root server policy enforcement apparatus.

It receives information from other apparatuses, buffers the information, inspects information and makes decisions on which part of the information is allowed to pass through the policy apparatus by referring to policies set by operators, administrators, apparatuses, systems. It then sends allowed information from outputs of the apparatus In this example root server policy apparatus acts as an in line filtering apparatus. It receives the information, finds information that is allowed to be transmitted by the policy, and send that information from the outputs. It does not hold state information such as historical data, session information.

A root server policy apparatus 1301 may receive root server policy information 1315 and may store in decision criteria 1305 area.

Decision logic 1303 may have at least one or more inputs 1313 which may have been feed from at least one or more input buffers 1302.

Input buffer 1302 may buffer and prioritize information received from at least one or more root server policy apparatus inputs 1306 1307 1308.

Decision logic 1303 may have at least one or more outputs 1313 which may feed an output buffer 1304.

Output buffer 1304 may buffer information received from decision logic 1303 and send using at least one or more root server policy apparatus outputs 1309 1310 1311.

Figure 14:
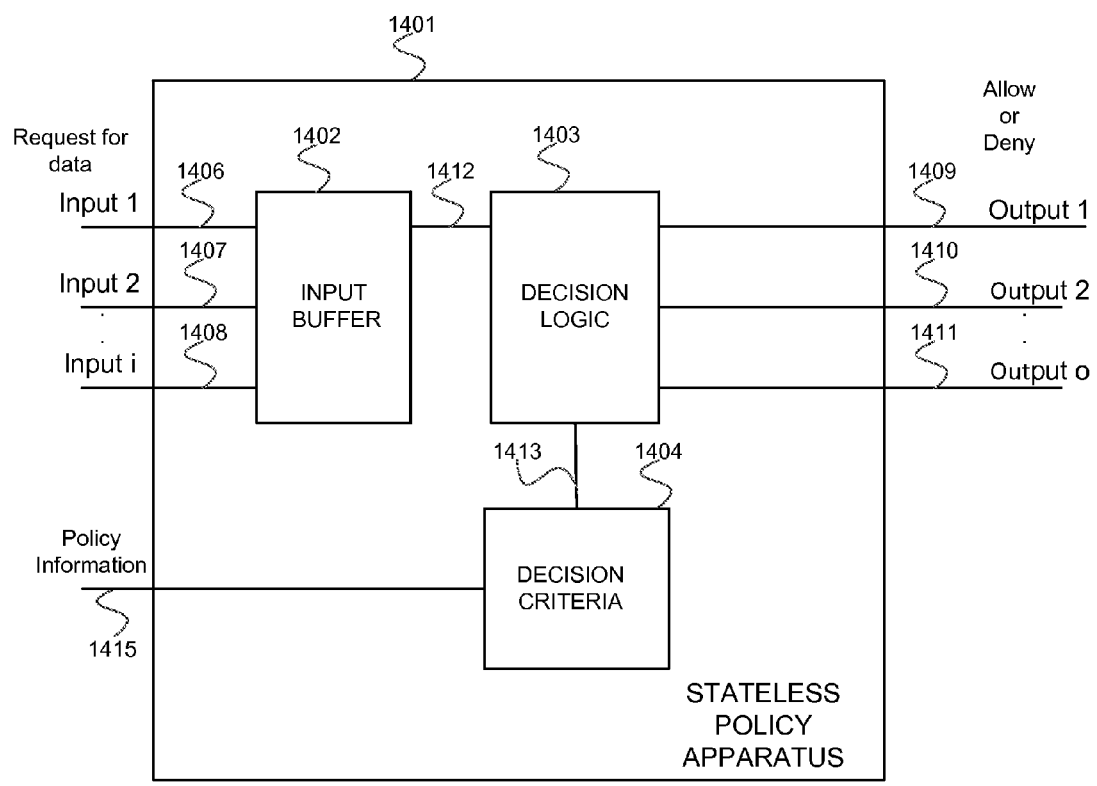
FIG. 14 illustrates an example of policy apparatus such as policy apparatus 301 of FIG. 3.

FIG. 14 illustrates an example of policy apparatus such as policy apparatus 301 of FIG. 3.

In this example policy apparatus acts as a stateless policy apparatus with allow/deny response.

Policy apparatus 1401 receives the information on its buffer 1402 inputs 1 to l 1406-1408, communicates 1412 to decision logic 1403. Decision logic 1403 uses decision criteria 1404, which is feeding from policy information communication 1415 and communicating 1413 with decision logic 1403 to find whether the information is allowed to be transmitted by the policy, and send an allow/deny decision from the outputs 1 to l 1409-1411 that matches the input for the information decision is based on. It does not hold state information such as historical data, session information. Policy apparatus 1401 inputs 1406-1408 may feed from discovery apparatus, communications mapping apparatus, lookup apparatus, publishing apparatus, root server connector apparatus and other apparatuses that may be part of the system. Policy apparatus 1401 output 1409-1411 may feed to discovery apparatus, communications mapping apparatus, lookup apparatus, publishing apparatus, root server connector apparatus and other apparatuses that may be part of the system.

Figure 15:
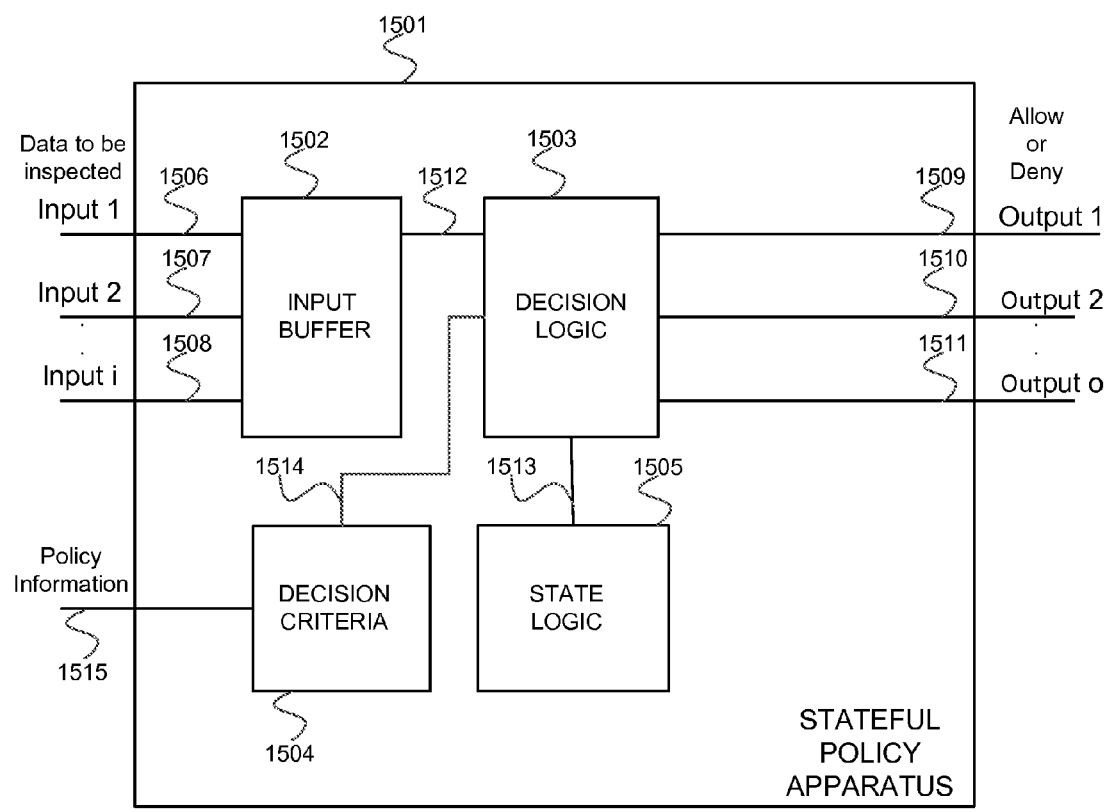
FIG. 15 illustrates an example policy apparatus such as policy apparatus 301 of FIG. 3.

FIG. 15 illustrates an example policy apparatus such as policy apparatus 301 of FIG. 3.

In this example policy apparatus acts as a stateful policy apparatus with allow/deny response.

Policy apparatus 1501 receives the information on its buffer 1502 inputs 1 to 1 1506-1508, communicates 1512 to decision logic 1503. Decision logic 1503 uses decision criteria 1504, which is feeding from policy information communication 1515 and communicating 1514 with decision logic 1503 to find whether the information is allowed to be transmitted by the policy, and send an allow/deny decision from the outputs 1 to 1 1509-1511 that matches the input for the information decision is based on. Decision logic 1503 communicates with 1513 state logic 1505 which holds state information such as historical data, session information which may affect the decisions of decision logic 1503. Policy apparatus 1501 inputs 1506-1508 may feed from discovery apparatus, communications mapping apparatus, lookup apparatus, publishing apparatus, root server connector apparatus and other apparatuses that may be part of the system. Policy apparatus 1501 output 1509-1511 may feed to discovery apparatus, communications mapping apparatus, lookup apparatus, publishing apparatus, root server connector apparatus and other apparatuses that may be part of the system.

Figure 16:
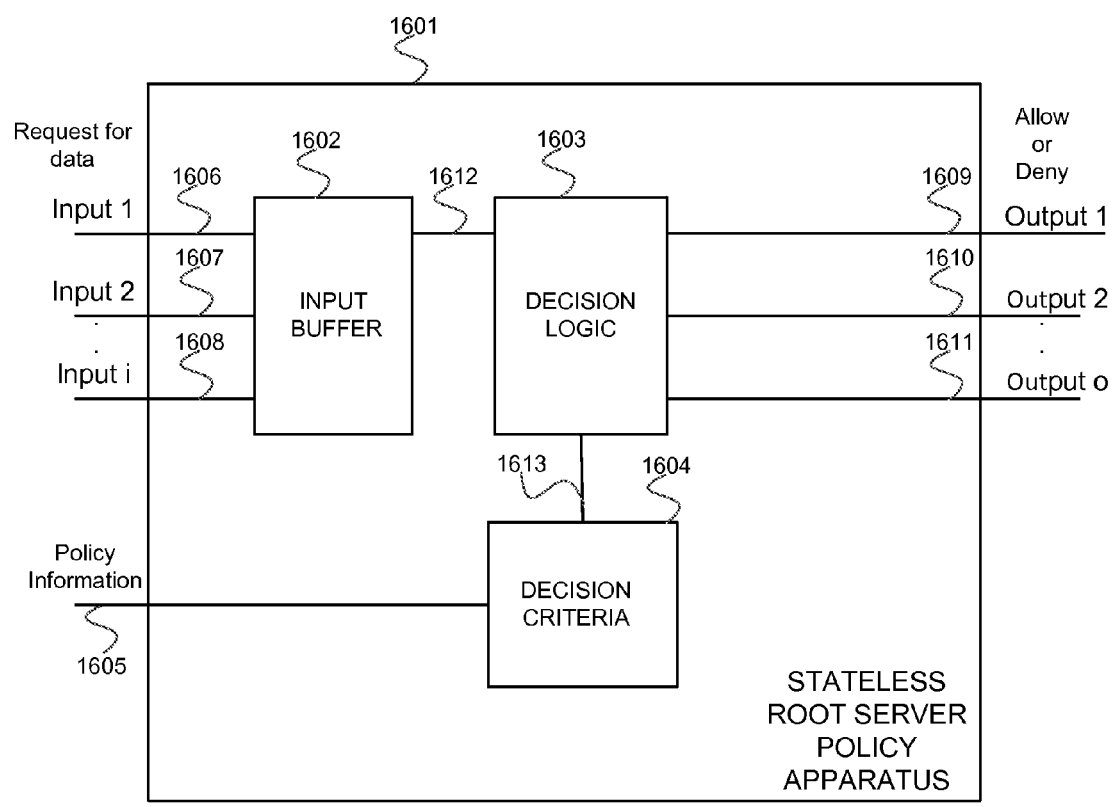
FIG. 16 illustrates an example root server policy apparatus such as root server policy apparatus 801 of FIG. 8.

FIG. 16 illustrates an example root server policy apparatus such as root server policy apparatus 801 of FIG. 8.

In this example root server policy apparatus acts as a stateless root server policy apparatus with allow/deny response.

Root server policy apparatus 1601 receives the information on its buffer 1602 inputs 1 to 1 1606-1608, communicates 1612 to decision logic 1603. Decision logic 1403 uses decision criteria 1604, which is feeding from policy information communication 1615 and communicating 1613 with decision logic 1603 to find whether the information is allowed to be transmitted by the root server policy, and send an allow/deny decision from the outputs 1 to 1 1609-1611 that matches the input for the information decision is based on. It does not hold state information such as historical data, session information.

Root server policy apparatus 1601 inputs 1606-1608 may feed from root server apparatus and for inbound requests fit may feed rom discovery apparatus, communications mapping apparatus, lookup apparatus, publishing apparatus, root server connector apparatus and other apparatuses that may be part of the system. Root server policy apparatus 1601 output 1609-1611 may feed to root server apparatus, and for outbound requests it may feed to discovery apparatus, communications mapping apparatus, lookup apparatus, publishing apparatus, root server connector apparatus and other apparatuses that may be part of the system.

Root server policy apparatus 1601 decision logic 1603 may consult a certificate server to authenticate the requestors, requests and sign responses sent from outputs 1609-1611.

Figure 17:
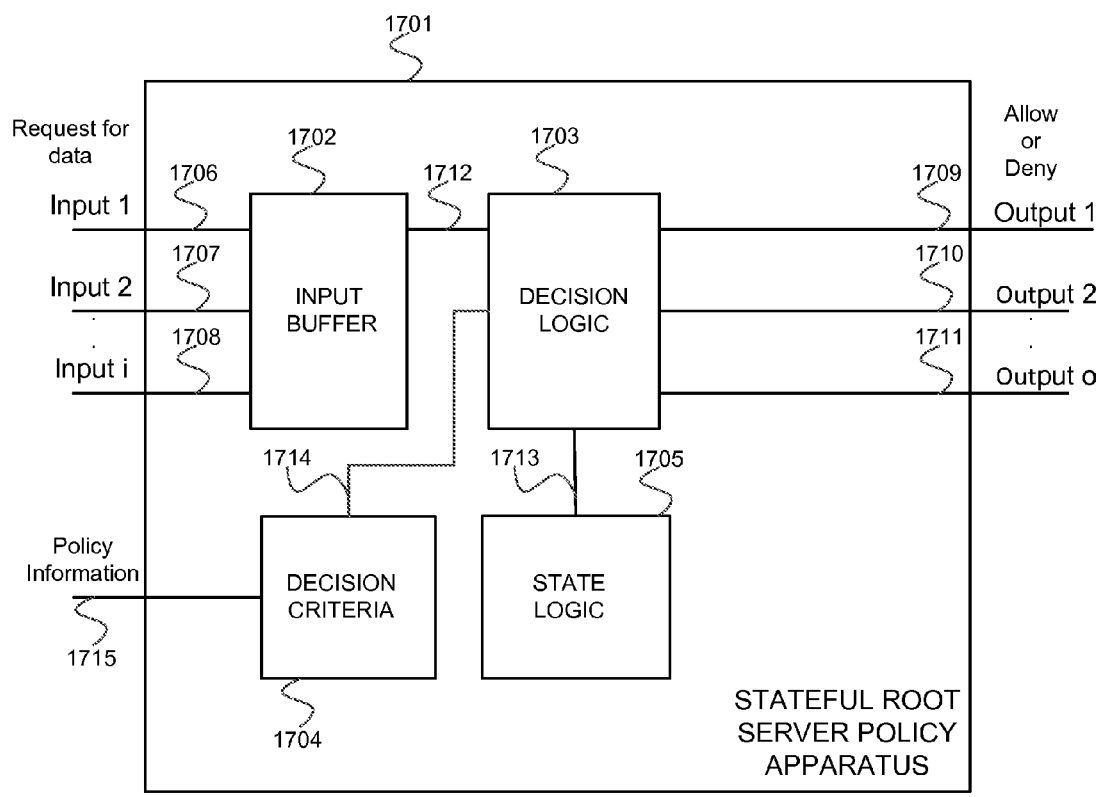
FIG. 17 illustrates an example of root server policy apparatus such as root server policy apparatus 801 of FIG. 8.

FIG. 17 illustrates an example of root server policy apparatus such as root server policy apparatus 801 of FIG. 8.

In this example root server policy apparatus acts as a stateful root server policy apparatus with allow/deny response.

Root server policy apparatus 1701 receives the information on its buffer 1702 inputs 1 to 1 1706-1708, communicates 1712 to decision logic 1703. Decision logic 1703 uses decision criteria 1704, which is feeding from policy information communication 1715 and communicating 1714 with decision logic 1703 to find whether the information is allowed to be transmitted by the root server policy, and send an allow/deny decision from the outputs 1 to 1 1709-1711 that matches the input for the information decision is based on. Decision logic 1703 communicates with 1713 state logic 1705 which holds state information such as historical data, session information which may affect the decisions of decision logic 1703.

Root server policy apparatus 1701 inputs 1706-1708 may feed from root server apparatus and for inbound requests fit may feed rom discovery apparatus, communications mapping apparatus, lookup apparatus, publishing apparatus, root server connector apparatus and other apparatuses that may be part of the system. Root server policy apparatus 1701 output 1709-1711 may feed to root server apparatus, and for outbound requests it may feed to discovery apparatus, communications mapping apparatus, lookup apparatus, publishing apparatus, root server connector apparatus and other apparatuses that may be part of the system.

Root server policy apparatus 1701 decision logic 1703 may consult a certificate server to authenticate the requestors, requests and sign responses sent from outputs 1709-1711.

Figure 18:
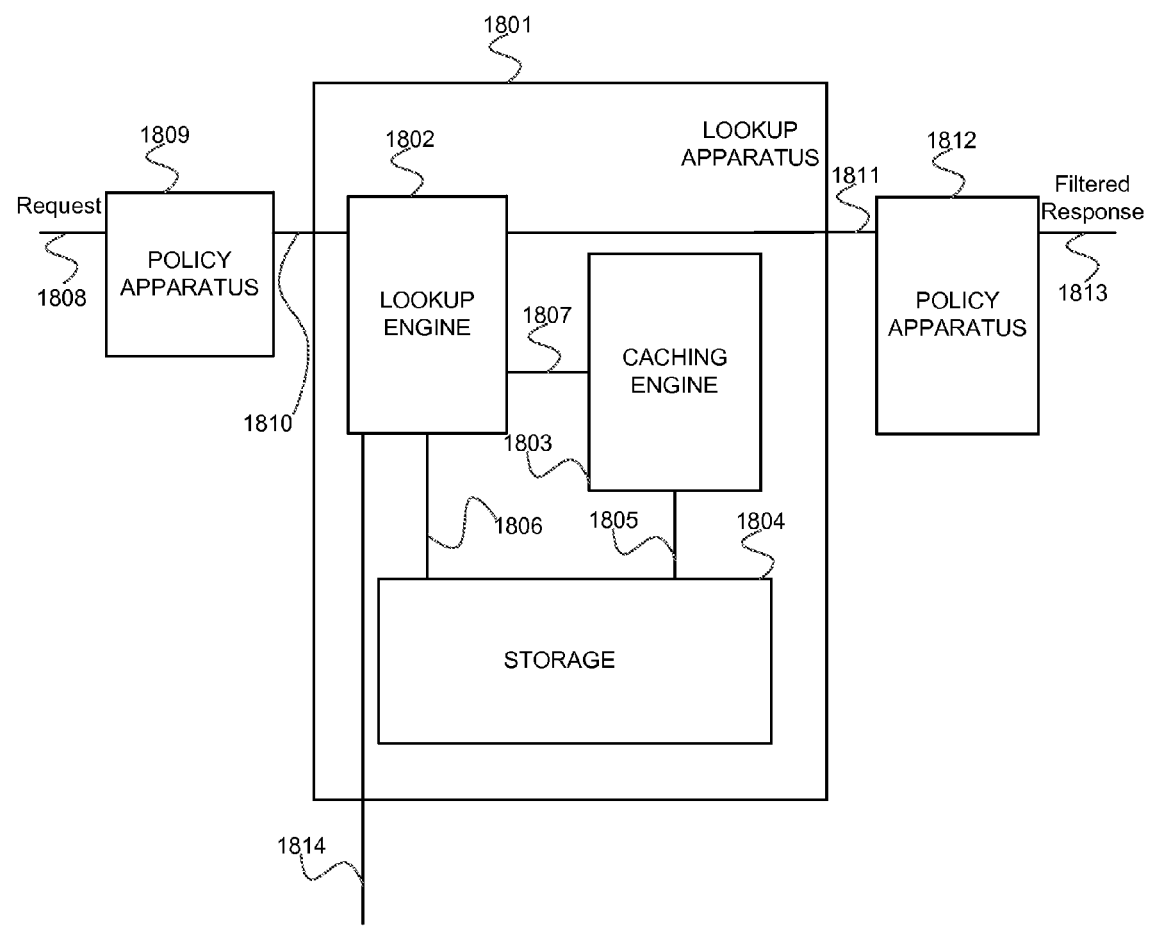
FIG. 18 illustrates an example of lookup apparatus such as lookup apparatus 401 of FIG. 4.

FIG. 18 illustrates an example of lookup apparatus such as lookup apparatus 401 of FIG. 4.

In this example lookup apparatus acts as a general information search apparatus with inline policy filtering for inputs and outputs.

Lookup apparatus 1801 receives an information request on its input 1810 which may be filtered by an inline policy apparatus 1809 which receives requests 1808.

Lookup apparatus 1801 input 1810 feeds to lookup engine 1802 in the lookup apparatus 1801, which communicates 1814 with at least one or more apparatuses that contains information being looked for, store 1806 the information received in storage 1804, and connects 1807 to a caching engine 1803 which connects 1805 to storage for faster access to data in storage.

Lookup engine 1802, looks up the requested information from direct consult with communication 1814 with one or more other apparatuses whether the information requested is available, or look up using cache 1803 or storage 1804 which stores previous look up results. If information requested is found, lookup engine 1802 communicates 1811 the information requested from the output 1811, which may be filtered by an inline policy apparatus 1812 which sends filtered responses 1813 to requestors. If information requested is found, lookup engine 1802 directly stores 1806 the results in storage 1806, or stores 1807 through caching engine 1803 which then stores 1805 to storage 1804.

To find the information requested, lookup apparatus 1801 relies on at least one or more apparatuses such as communications mapping apparatus or other apparatuses that may contain information being looked for.

Figure 19:
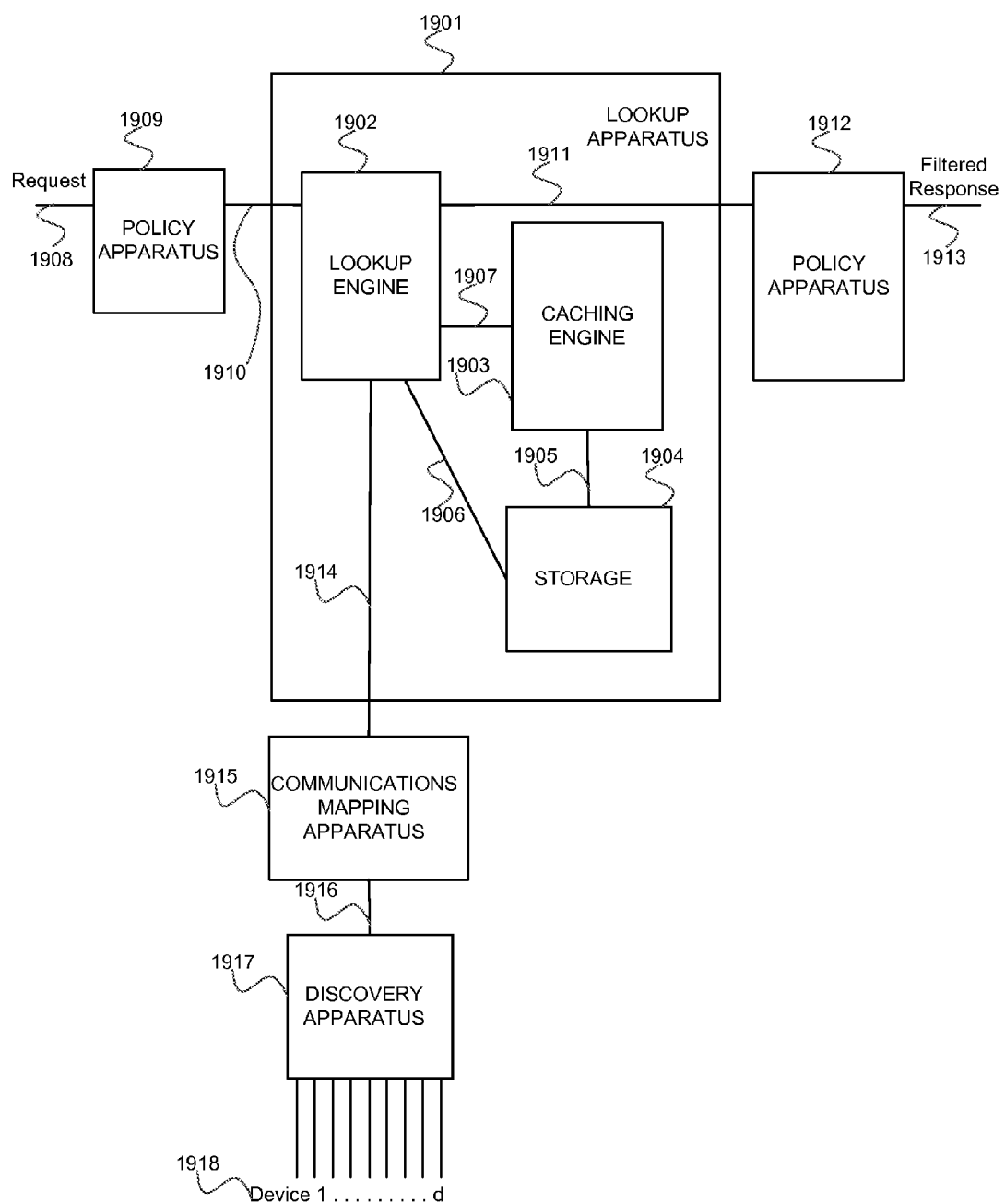
FIG. 19 illustrates an example of lookup apparatus such as lookup apparatus 401 of FIG. 4.

FIG. 19 illustrates an example of lookup apparatus such as lookup apparatus 401 of FIG. 4.

In this example lookup apparatus acts as an information search apparatus to search information in communications mapping apparatus with inline policy filtering for inputs and outputs.

Lookup apparatus 1901 receives an information request on its input 1910 which may be filtered by an inline policy apparatus 1909 which receives requests 1908.

Lookup apparatus 1901 input 1910 feeds to lookup engine 1902 in the lookup apparatus 1901, which communicates 1914 with communications mapping apparatus 1915, store 1906 the information received in storage 1904, and connects 1907 to a caching engine 1903 which connects 1905 to storage for faster access to data in storage.

Lookup engine 1902, looks up the requested information from direct consult with communication 1914 with one or more other apparatuses whether the information requested is available, or look up using cache 1903 or storage 1904 which stores previous look up results. If information requested is found, lookup engine 1902 communicates 1911 the information requested from the output 1911, which may be filtered by an inline policy apparatus 1912 which sends filtered responses 1913 to requestors. If information requested is found, lookup engine 1902 directly stores 1906 the results in storage 1906, or stores 1107 through caching engine 1903 which then stores 1905 to storage 1904.

To find the information requested, lookup apparatus 1901 relies on at least one or more communications 1915 to communications mapping apparatuses 1915, which may communicate 1916 to at least one or more discovery apparatuses 1917, which may communicate to devices 1 to d 1918.

Figure 20:
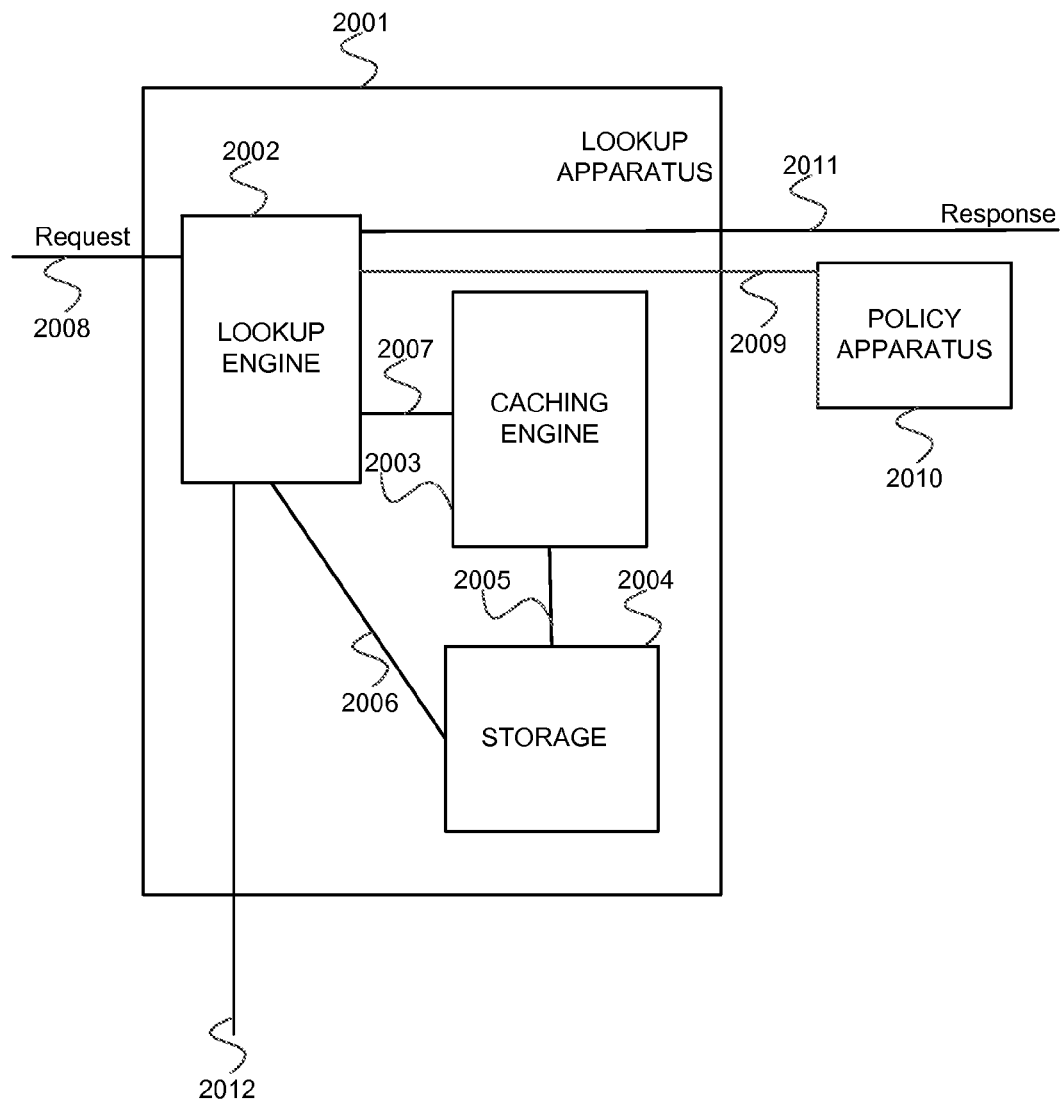
FIG. 20 illustrates an example of lookup apparatus such as lookup apparatus 401 of FIG. 4.

FIG. 20 illustrates an example of lookup apparatus such as lookup apparatus 401 of FIG. 4.

In this example lookup apparatus acts as a general information search apparatus with allow/deny policy filtering.

Lookup apparatus 2001 receives an information request on its input 2008 which may be allowed or denied based on communication 2009 with policy apparatus 2010.

Lookup apparatus 2001 input 2008 feeds to lookup engine 2002 in the lookup apparatus 2001, which communicates 2012 with at least one or more apparatuses that contains information being looked for, store 2006 the information received in storage 2004, and connects 2007 to a caching engine 2003 which connects 2005 to storage for faster access to data in storage.

Lookup engine 2002, looks up the requested information from direct consult with communication 2012 with one or more other apparatuses whether the information requested is available, or look up using cache 2003 or storage 2004 which stores previous look up results. If information requested is found, lookup engine 2002 consults with policy apparatus 2009 for whether to send outbound response using communication 2009 with policy apparatus 2010, if policy apparatus 2010 communicates 2009 allow, lookup engine 2002 communicates 2011 the information requested using the output 2011. If information requested is found, lookup engine 2002 directly stores 2006 the results in storage 2006, or stores 2007 through caching engine 2003 which then stores 2005 to storage 2004.

To find the information requested, lookup apparatus 2001 relies on at least one or more apparatuses such as communications mapping apparatus or other apparatuses that may contain information being looked for.

Figure 21:
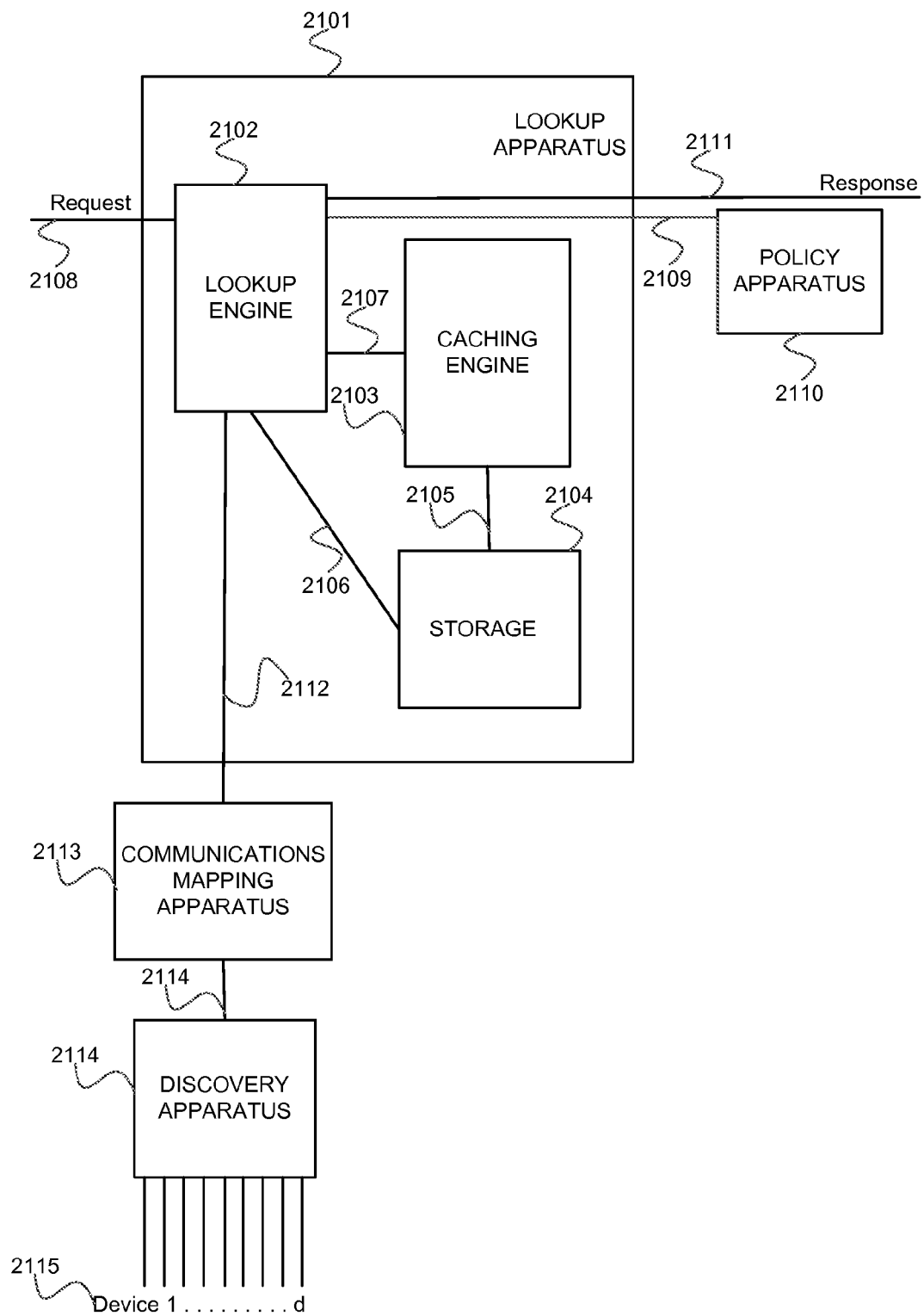
FIG. 21 illustrates an example of lookup apparatus such as lookup apparatus 401 of FIG. 4.

FIG. 21 illustrates an example of lookup apparatus such as lookup apparatus 401 of FIG. 4.

In this example lookup apparatus acts as an information search apparatus to search information in communications mapping apparatus with allow/deny policy filtering.

Lookup apparatus 2101 receives an information request on its input 2108 which may be allowed or denied based on communication 2109 with policy apparatus 2110.

Lookup apparatus 2101 input 2108 feeds to lookup engine 2102 in the lookup apparatus 2101, which communicates 2112 with communications mapping apparatus 2113, store 2106 the information received in storage 2104, and connects 2107 to a caching engine 2103 which connects 2105 to storage for faster access to data in storage.

Lookup engine 2102, looks up the requested information from direct consult with communication 2112 with one or more other apparatuses whether the information requested is available, or look up using cache 2103 or storage 2104 which stores previous look up results. If information requested is found, lookup engine 2102 consults with policy apparatus 2109 for whether to send outbound response using communication 2109 with policy apparatus 2110, if policy apparatus 2110 communicates 2109 allow, lookup engine 2102 communicates 2111 the information requested using the output 2111. If information requested is found, lookup engine 2102 directly stores 2106 the results in storage 2106, or stores 2107 through caching engine 2103 which then stores 2105 to storage 2104.

To find the information requested, lookup apparatus 2101 relies on at least one or more communications 2115 to communications mapping apparatuses 2115, which may communicate 2116 to at least one or more discovery apparatuses 2117, which may communicate to devices 1 to d 2118.

Figure 22:
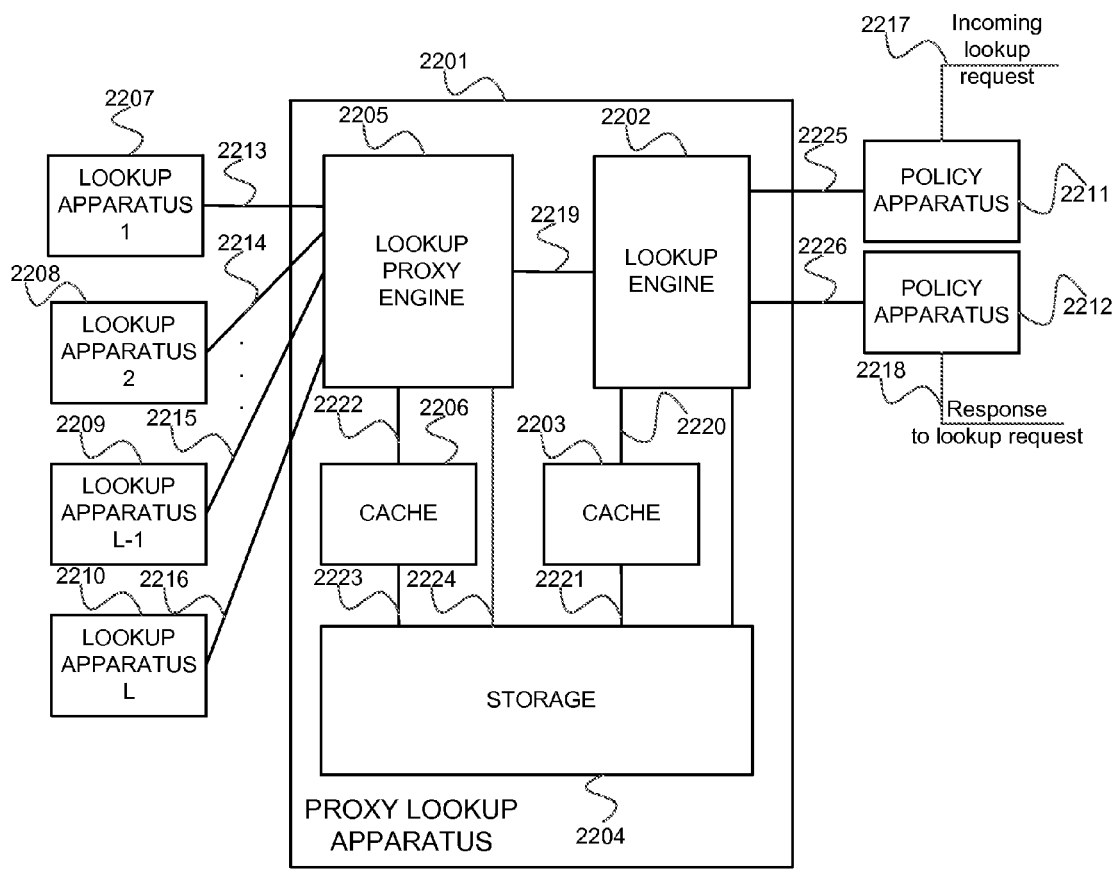
FIG. 22 illustrates an example of proxy lookup apparatus such as lookup apparatus 401 of FIG. 4.

FIG. 22 illustrates an example of proxy lookup apparatus such as lookup apparatus 401 of FIG. 4.

Proxy lookup apparatus 2201 receives lookup requests 2225 which may be filtered by inline policy apparatus 2211. Policy apparatus 2211 receives the incoming look up requests over connection 2217, such as requests from other lookup apparatuses. Proxy lookup apparatus 2201 receives the communication 2225 for an information request over lookup engine 2202 in proxy lookup apparatus 2201. Lookup engine 2202 looks up the cache 2203 or storage 2204 for stored request response pairs from past, if not found, passes the request to lookup proxy engine 2205, which communicates 2213-2216 the request at least one or more other lookup apparatuses 1 to L 2207-2210 and also looks up in cache 2206 and in storage 2224. If lookup apparatuses 2207-2210 communicate 2213-2216 a response to lookup proxy engine 2205 with information requested, or information is found in cache 2206 or storage 2204, lookup proxy engine 2205 communicates 2219 the response to lookup engine 2202, and stores 2206 in storage 2204 and/or stores 222 in cache 2206 which stores 2223 in storage. Lookup engine communicates 2226 the response from storage 2204, cache 2203 or lookup proxy engine 2205, which may be filtered by an inline policy apparatus 2212, which communicates 2218 the filtered response to requestor. Lookup engine 2205 stores 2203 the request and response pairs in storage 2204, or stores 2220 in cache 2203 which stores 2221 in storage 2204.

Figure 23:
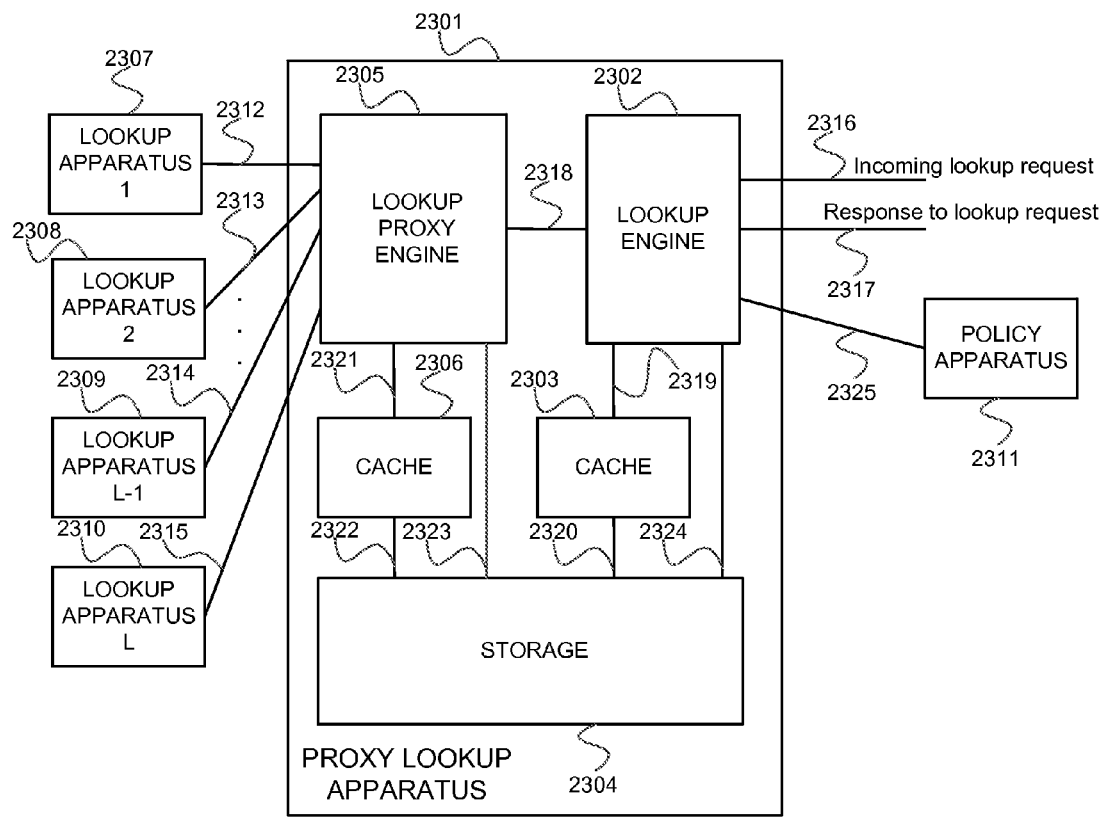
FIG. 23 illustrates an example of proxy lookup apparatus such as lookup apparatus 401 of FIG. 4.

FIG. 23 illustrates an example of proxy lookup apparatus such as lookup apparatus 401 of FIG. 4.

In the illustrated example the proxy lookup apparatus 2301 has a lookup proxy engine 2305, a lookup engine 2302 and a storage 2304. In the example the lookup proxy engine 2305 is connected to a cache 2306 and storage 2304. The lookup engine 2302 is connected to cache 2303 and storage 2304.

The lookup engine 2302 may receive a lookup request 2316 such as access information for a video conferencing apparatus from the lookup apparatus of another organization.

Responsive to receiving the lookup request 2316, the lookup engine 2302 may consult a policy apparatus 2311. The policy apparatus 2311 may provide an indication as to whether the lookup engine 2302 should allow the incoming lookup request.

Responsive to policy apparatus 2311 approving, the lookup engine searches cache 2303, searches storage 2304, if information is not found, lookup engine 2302 forms a requests and sends the requests to lookup proxy engine 2305 over connection 2318.

The lookup proxy engine searches cache 2306, searches storage 2304, if information is not found, lookup proxy engine 2305 contacts any number of lookup apparatuses 1 through l 2307-2310 over connections 2312 through 2315. If the information requested is provided by the lookup apparatuses 1 through L 2307-2310, it is communicated 2318 to lookup engine 2302, stored 2323 in storage 2304 and/or stored 2321 in cache 2306 which stores 2322 in storage 2304.

Responsive to lookup proxy engine 2305, lookup engine 2302 may consult a policy apparatus 2311. The policy apparatus 2311 may provide an indication as to whether the lookup engine 2302 should allow the outbound lookup response.

Responsive to policy apparatus 2311 approving, the lookup engine 2302 forms a response and sends over connection 2317. Lookup engine stores 2319 the request/response pairs in cache 2303 which stores 2320 in storage 2304. Lookup engine stores 2324 the request/response pairs in storage 2304.

While the example may show one proxy engine, other embodiments may include multiple lookup proxy engines.

Figure 24:
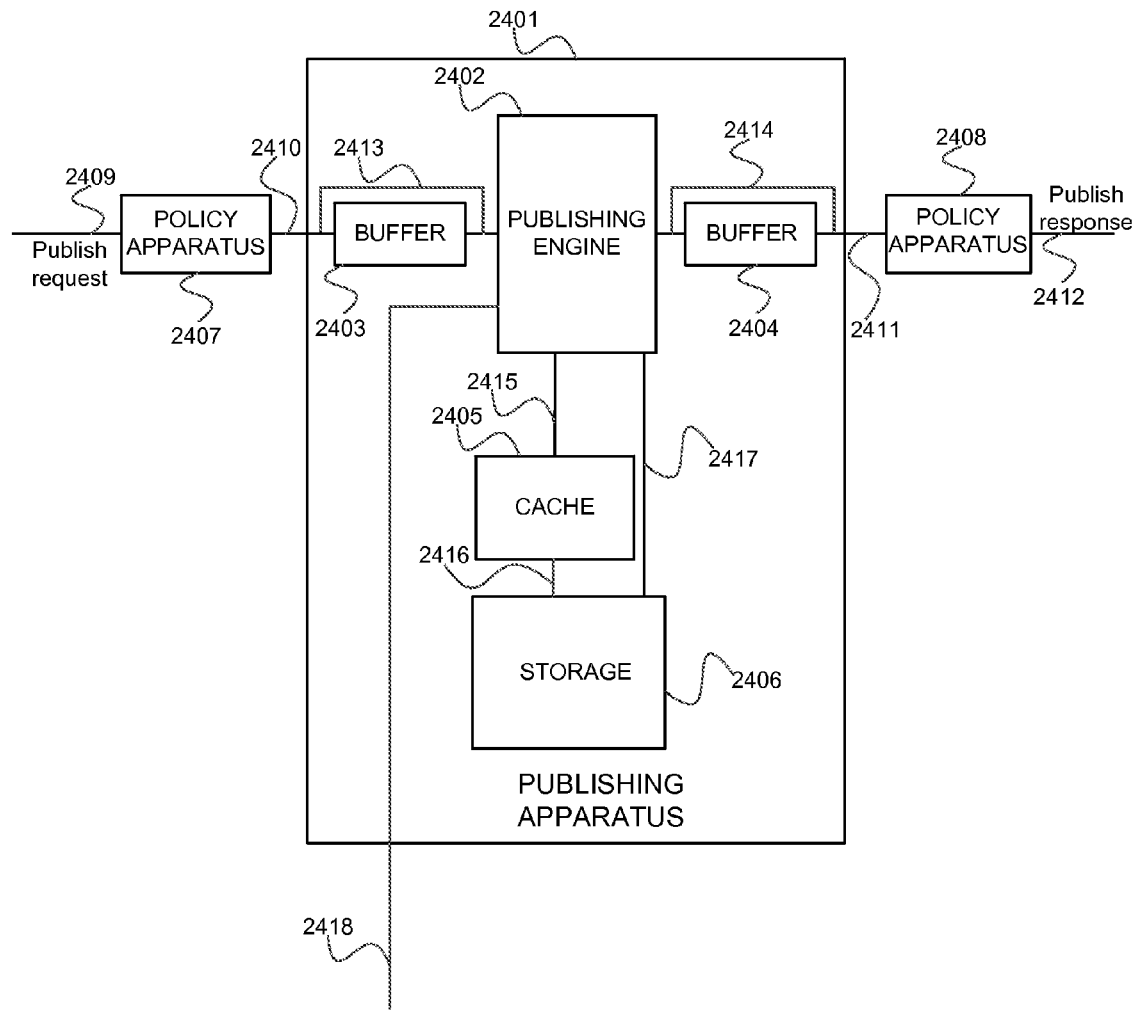
FIG. 24 illustrates an example of publishing apparatus such as publishing apparatus 501 of FIG. 5.

FIG. 24 illustrates an example of publishing apparatus such as publishing apparatus 501 of FIG. 5.

In this example publishing apparatus 2401 acts as a general information publishing apparatus with inline policy filtering for inputs and outputs.

Publishing apparatus 2401 receives a publish request on its input 2410 which may be filtered by an inline policy apparatus 2407 which receives publish requests 2409.

Publishing apparatus 2401 input 2410 feeds directly 2413 or through a buffer 2403 to publishing engine 2402 in the publishing apparatus 2401. In response to publishing request, publishing engine 2402 searches cache 2406, searches storage 2406, if not found, communicates 2418 with at least one or more apparatuses that contains information being looked for. If the requested information is communicated 2418 from the apparatuses to publishing engine 2402, publishing engine 2402 stores 2417 the information received in storage 2406 and/or connects 2415 to a cache 2405 which connects 2416 to storage 2406 for faster access to data in storage 2406.

After publishing engine 2402 finds the information for publish request from direct consult with communication 2418 with one or more other apparatuses, or cache 2405 or storage 2406 which stores previous publish results, publishing engine 2402 communicates 2411 the information requested from the output 2411, which may be filtered by an inline policy apparatus 2408 which sends filtered responses 2412 to requestors. If information requested is found, publishing engine 2402 may directly store 2417 the results in storage 2406, or store 2407 through caching engine 2403 which then stores 2405 to storage 2404.

To find the information requested that does not exist in storage or cache, publishing apparatus 2401 relies on at least one or more apparatuses such as communications mapping apparatus, lookup apparatuses, other publishing apparatuses or other apparatuses that may contain information being looked for.

Publishing apparatus 2401 may have a storage that may hold all or some data that is allowed to be published without relying on repeated communications to other apparatuses such as communications mapping apparatus. In an embodiment of lookup apparatus, lookup apparatus may have a smaller storage in comparison to publishing apparatus, enough to cache real time queries in consulting with the publishing apparatus or communications mapping apparatus.

Publishing apparatus 2401 may also synchronize with other publishing apparatuses.

Publishing apparatus 2401 may hold state information such as historical data, session information which may optimize queries or response time.

Figure 25:
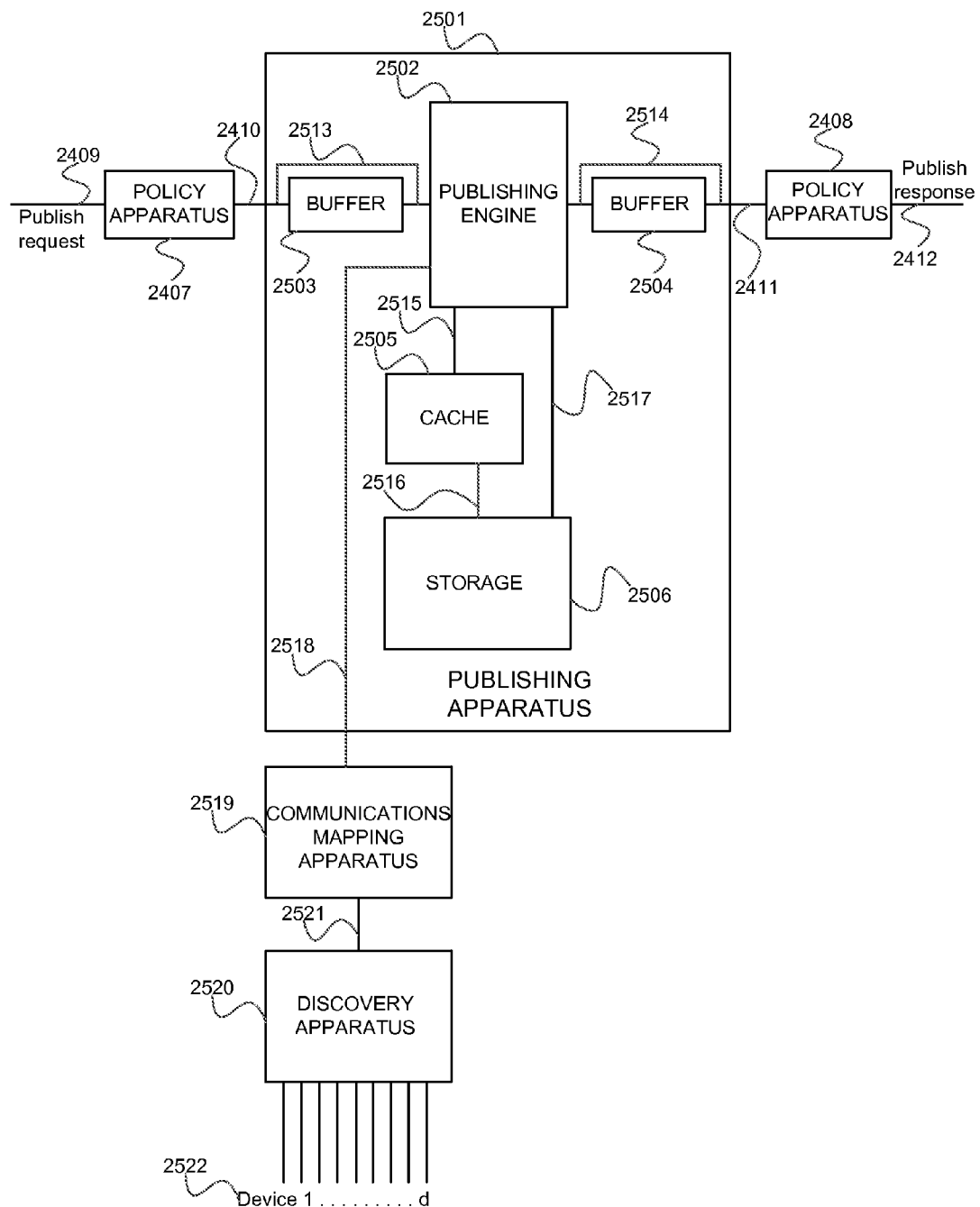
FIG. 25 illustrates an example of publishing apparatus such as publishing apparatus 501 of FIG. 5.

FIG. 25 illustrates an example of publishing apparatus such as publishing apparatus 501 of FIG. 5.

In this example publishing apparatus acts as an information publishing apparatus to publishing information in communications mapping apparatus with inline policy filtering for inputs and outputs.

In this example publishing apparatus 2501 acts as a general information publishing apparatus with inline policy filtering for inputs and outputs.

Publishing apparatus 2501 receives a publish request on its input 2510 which may be filtered by an inline policy apparatus 2507 which receives publish requests 2509.

Publishing apparatus 2501 input 2510 feeds directly 2513 or through a buffer 2503 to publishing engine 2502 in the publishing apparatus 2501. In response to publishing request, publishing engine 2502 searches cache 2506, searches storage 2506, if not found, communicates 2518 with communications mapping apparatus 2519, which may communicate 2521 to a discovery apparatus 2520. If the requested information is communicated 2518 from communications mapping apparatus 2519 to publishing engine 2502, publishing engine 2502 stores 2517 the information received in storage 2506 and/or connects 2515 to a cache 2505 which connects 2516 to storage 2506 for faster access to data in storage 2506.

After publishing engine 2502 finds the information for publish request from direct consult with communication 2518 with communications mapping apparatus 2519, or cache 2505 or storage 2506 which stores previous publish results, publishing engine 2502 communicates 2511 the information requested from the output 2511, which may be filtered by an inline policy apparatus 2508 which sends filtered responses 2512 to requestors. If information requested is found, publishing engine 2502 may directly store 2517 the results in storage 2506, or store 2507 through caching engine 2503 which then stores 2505 to storage 2504.

To find the information requested that does not exist in storage or cache, publishing apparatus 2501 relies on at least one or more of communications mapping apparatuses, lookup apparatuses, other publishing apparatuses or other apparatuses that may contain information being looked for.

Publishing apparatus 2501 may have a storage that may hold all or some data that is allowed to be published without relying on repeated communications to other apparatuses such as communications mapping apparatus. In an embodiment of lookup apparatus, lookup apparatus may have a smaller storage in comparison to publishing apparatus, enough to cache real time queries in consulting with the publishing apparatus or communications mapping apparatus.

Publishing apparatus 2501 may also synchronize with other publishing apparatuses.

Publishing apparatus 2501 may hold state information such as historical data, session information which may optimize queries or response time.

Figure 26:
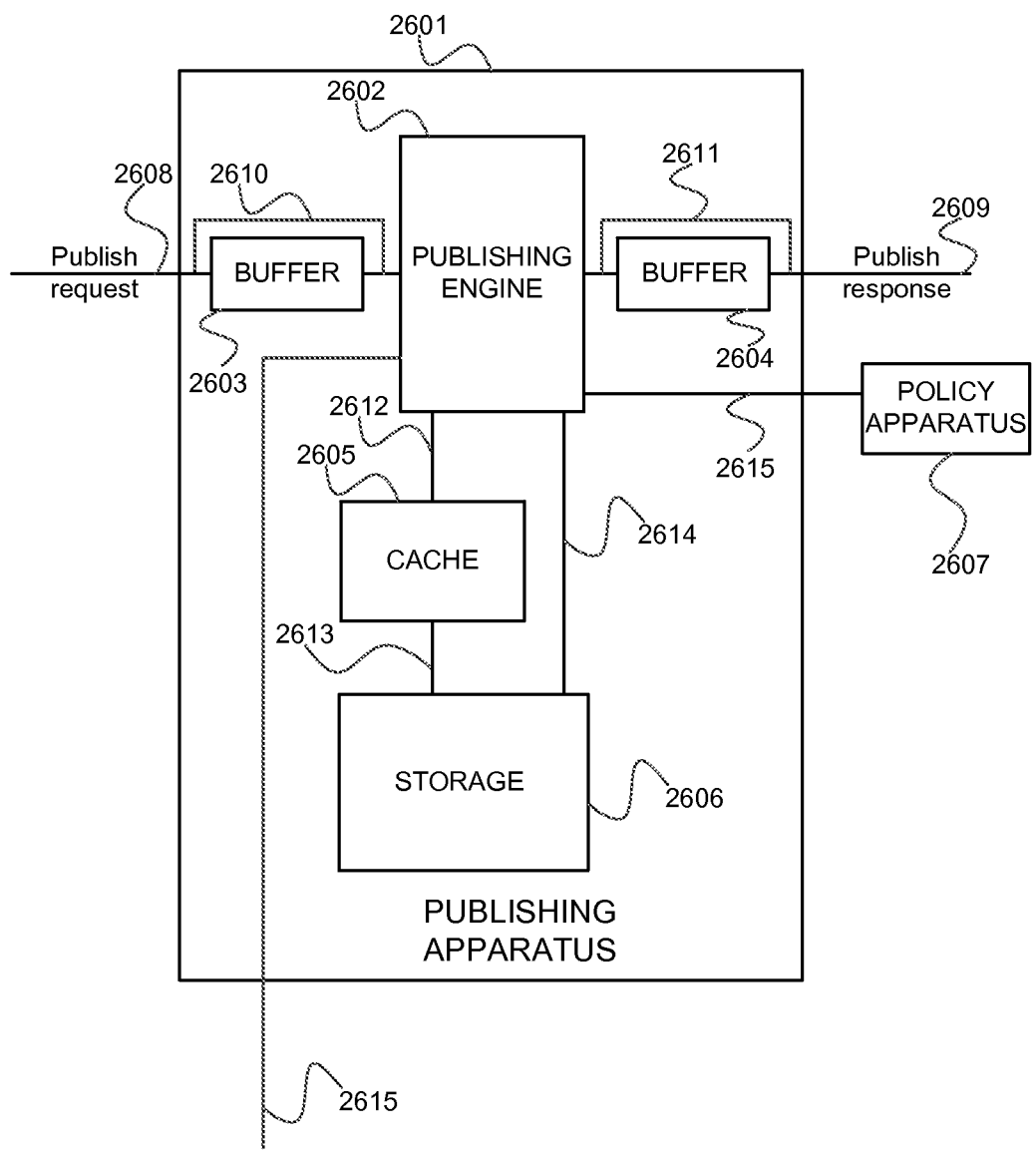
FIG. 26 illustrates an example of publishing apparatus such as publishing apparatus 501 of FIG. 5.

FIG. 26 illustrates an example of publishing apparatus such as publishing apparatus 501 of FIG. 5.

In this example publishing apparatus acts as a general information publishing apparatus with allow/deny policy filtering.

Publishing apparatus 2601 receives a publish request on its input 2608.

Publishing apparatus 2601 input 2608 feeds directly 2603 or through a buffer 2610 to publishing engine 2602 in the publishing apparatus 2601. In response to publishing request, publishing engine 2602 searches cache 2605, searches storage 2606, if not found, communicates 2615 with at least one or more apparatuses that contains information being looked for. If the requested information is communicated 2615 from the apparatuses to publishing engine 2602, publishing engine 2602 stores 2614 the information received in storage 2606 and/or connects 2612 to a cache 2605 which connects 2613 to storage 2606 for faster access to data in storage 2606.

After publishing engine 2602 finds the information for publish request from direct consult with communication 2618 with one or more other apparatuses, or cache 2605 or storage 2606 which stores previous publish results, publishing engine 2602, in consulting with a policy apparatus 2607 which communicates 2615 an allow message allowing publishing engine 2602 to send response to requestor on output 2609, which may be fed directly 2611 or through a buffer 2604, or deny message which causes publishing engine 2602 to not to send a response or send a response with informing respond to request is denied. If information requested is found from outside connections 2615, publishing engine 2602 may directly store 2614 the results in storage 2606, or store 2612 through caching engine 2603 which then stores 2613 to storage 2606.

To find the information requested that does not exist in storage 2606 or cache 2605, publishing apparatus 2601 relies on at least one or more apparatuses such as communications mapping apparatus, lookup apparatuses, other publishing apparatuses or other apparatuses that may contain information being looked for.

Publishing apparatus 2601 may have a storage that may hold all or some data that is allowed to be published without relying on repeated communications to other apparatuses such as communications mapping apparatus. In an embodiment of lookup apparatus, lookup apparatus may have a smaller storage in comparison to publishing apparatus, enough to cache real time queries in consulting with the publishing apparatus or communications mapping apparatus.

Publishing apparatus 2601 may also synchronize with other publishing apparatuses.

Publishing apparatus 2601 may hold state information such as historical data, session information which may optimize queries or response time.

Figure 27:
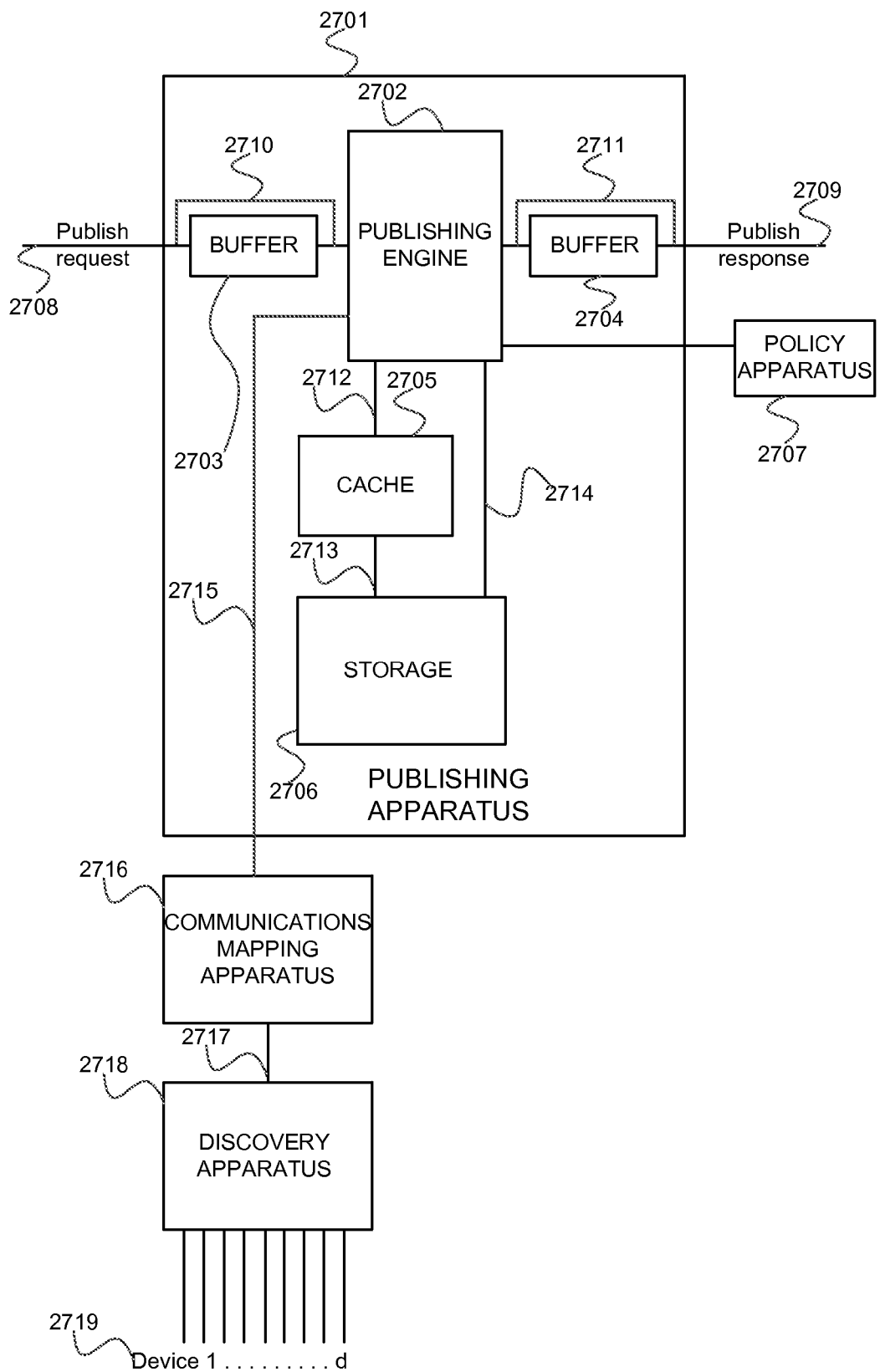
FIG. 27 illustrates an example of publishing apparatus such as publishing apparatus 501 of FIG. 5.

FIG. 27 illustrates an example of publishing apparatus such as publishing apparatus 501 of FIG. 5.

In this example publishing apparatus acts as an information publishing apparatus to publishing information in communications mapping apparatus with allow/deny policy filtering.

Publishing apparatus 2701 receives a publish request on its input 2708.

Publishing apparatus 2701 input 2708 feeds directly 2703 or through a buffer 2710 to publishing engine 2702 in the publishing apparatus 2701. In response to publishing request, publishing engine 2702 searches cache 2705, searches storage 2706, if not found, communicates 2715 with communications mapping apparatus 2716, which communicates 2717 to discovery apparatus 2718, which communicates with device 1 to d 2719. If the requested information is communicated 2715 from the communications mapping apparatus to publishing engine 2702, publishing engine 2702 stores 2714 the information received in storage 2706 and/or connects 2712 to a cache 2705 which connects 2713 to storage 2706 for faster access to data in storage 2706.

After publishing engine 2702 finds the information for publish request from direct consult with communication 2718 with communications mapping apparatus 2716, or cache 2705 or storage 2706 which stores previous publish results, publishing engine 2702, in consulting with a policy apparatus 2707 which communicates 2715 an allow message allowing publishing engine 2702 to send response to requestor on output 2709, which may be fed directly 2711 or through a buffer 2704, or deny message which causes publishing engine 2702 to not to send a response or send a response with informing respond to request is denied. If information requested is found from outside connections 2715, publishing engine 2702 may directly store 2714 the results in storage 2706, or store 2712 through caching engine 2703 which then stores 2713 to storage 2706.

To find the information requested that does not exist in storage 2706 or cache 2705, publishing apparatus 2701 relies on at least one or more communications mapping apparatus, lookup apparatuses, other publishing apparatuses or other apparatuses that may contain information being looked for.

Publishing apparatus 2701 may have a storage that may hold all or some data that is allowed to be published without relying on repeated communications to other apparatuses such as communications mapping apparatus. In an embodiment of lookup apparatus, lookup apparatus may have a smaller storage in comparison to publishing apparatus, enough to cache real time queries in consulting with the publishing apparatus or communications mapping apparatus.

Publishing apparatus 2701 may also synchronize with other publishing apparatuses.

Publishing apparatus 2701 may hold state information such as historical data, session information which may optimize queries or response time.

Figure 28:
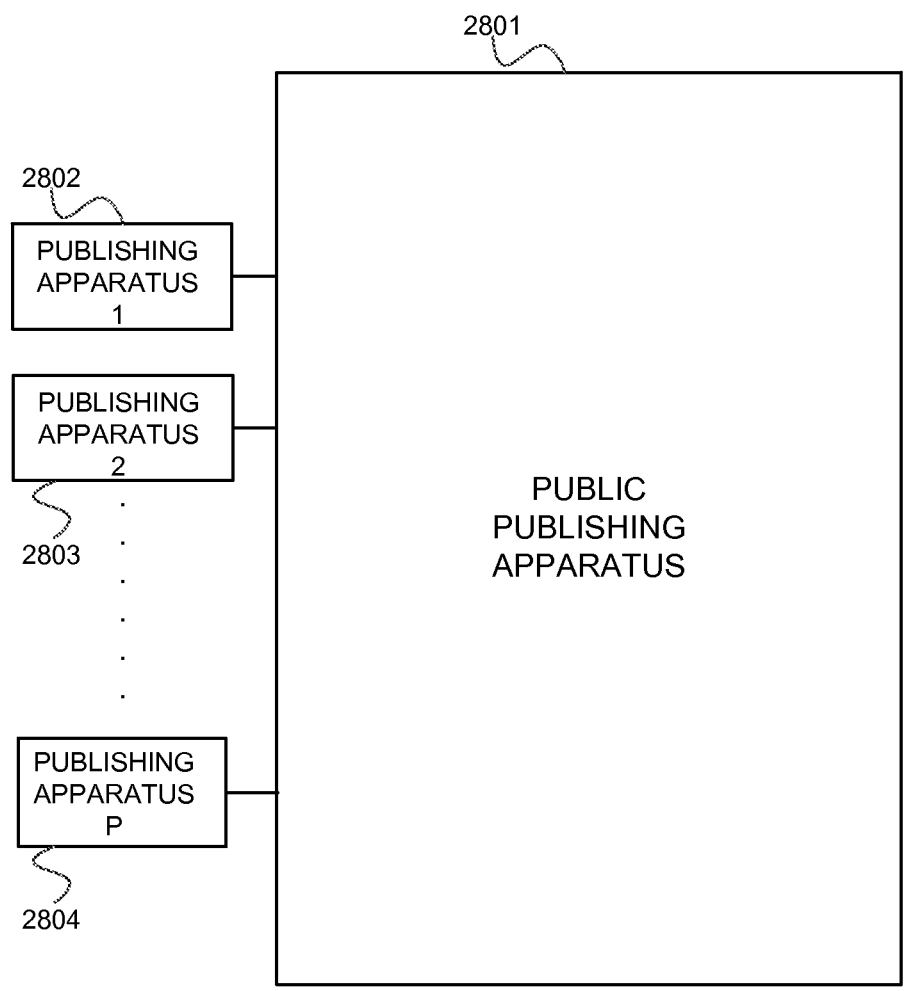
FIG. 28 illustrates an example of public publishing apparatus such as publishing apparatus 501 of FIG. 5.

FIG. 28 illustrates an example of public publishing apparatus such as publishing apparatus 501 of FIG. 5.

A public publishing apparatus 2801 may accept communications from other publishing apparatuses 1 to P 2802-2804 which may communicate data that is allowed to be public. Public publishing apparatus 2601 may serve the public data to any publishing apparatus if demanded, or synch parts or all of the data to any publishing apparatus if it demands so.

Figure 29:
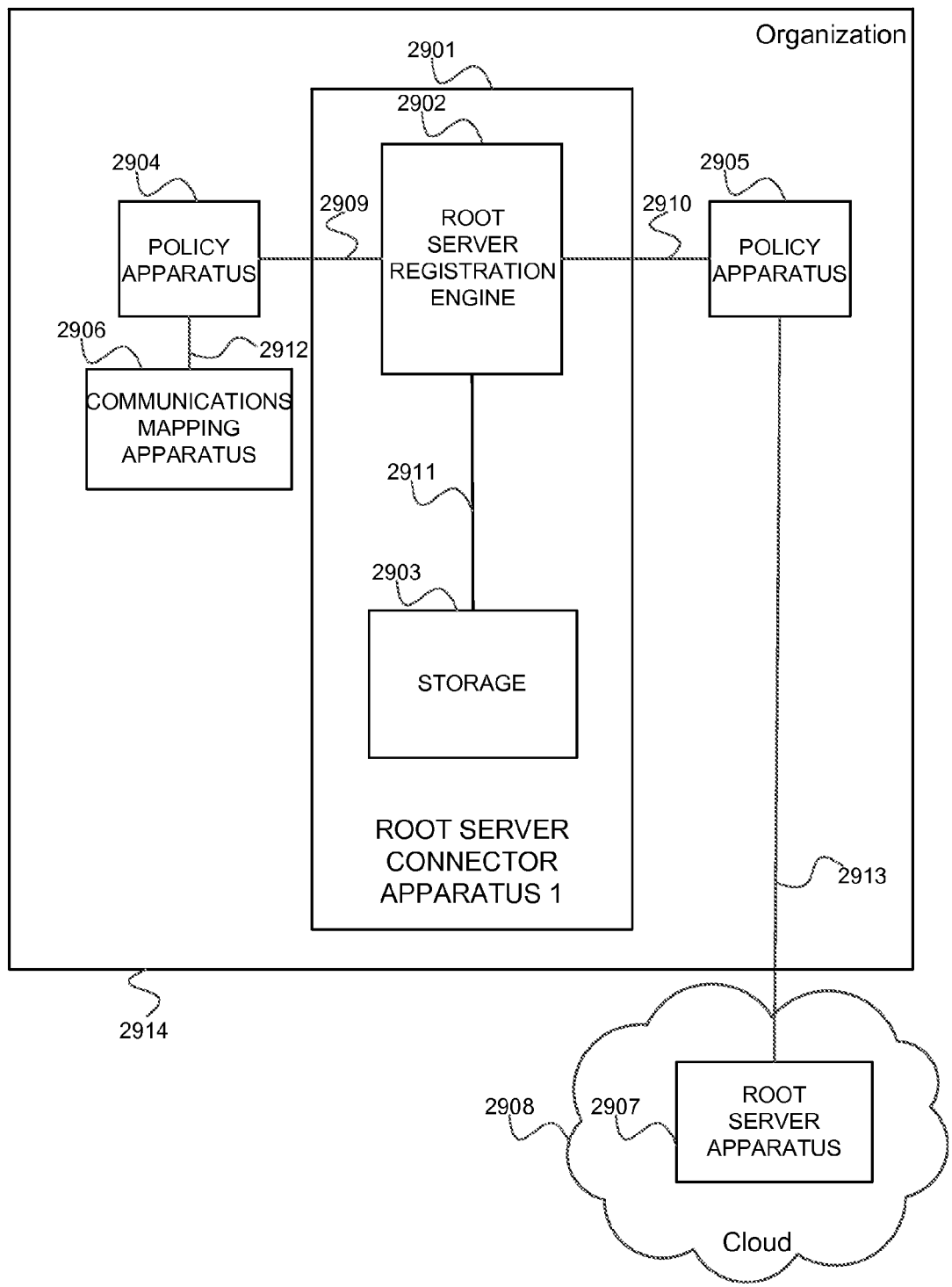
FIG. 29 illustrates an example of root server connector apparatus such as root server connector apparatus 601 of FIG. 6.

FIG. 29 illustrates an example of root server connector apparatus such as root server connector apparatus 601 of FIG. 6.

A root server connector apparatus 2901 may have a root server registration engine 2902 and a storage 2903. Root server registration engine 2902 in the root server registration apparatus 2901 of an organization 2901, communicates with 2913 and registers itself with the root server 2907 as point of contact for the organization. Root server connector apparatus 2901 may also communicate with one or more communications mapping apparatuses in the organization and register publicly available resources with the root server 2907.

In this embodiment, to obtain organization information to be registered with root server 2907, root server connector registration engine 2902 communicates 2909 to an inline policy apparatus 2904, which communicates with 2912 a communications mapping apparatus 2906. Policy apparatus 2904 determines what is allowed to be read by the root server registration engine 2902. Root server registration engine 2902 stores 2911 the information to be registered in storage 2903 and communicates 2910 through an inline policy apparatus 2905, which communicates with 2913 a root server apparatus 2907, which may be in cloud 2908 to register access information for the organization. Policy apparatus 2905 determines what is allowed to be registered by the root server registration engine 2902 to root server apparatus 2907. In other embodiments, root server registration engine 2902 may also communicate with lookup apparatuses and publishing apparatuses in the organization and register access information for those apparatuses with root server apparatus 2907.

Figure 30:
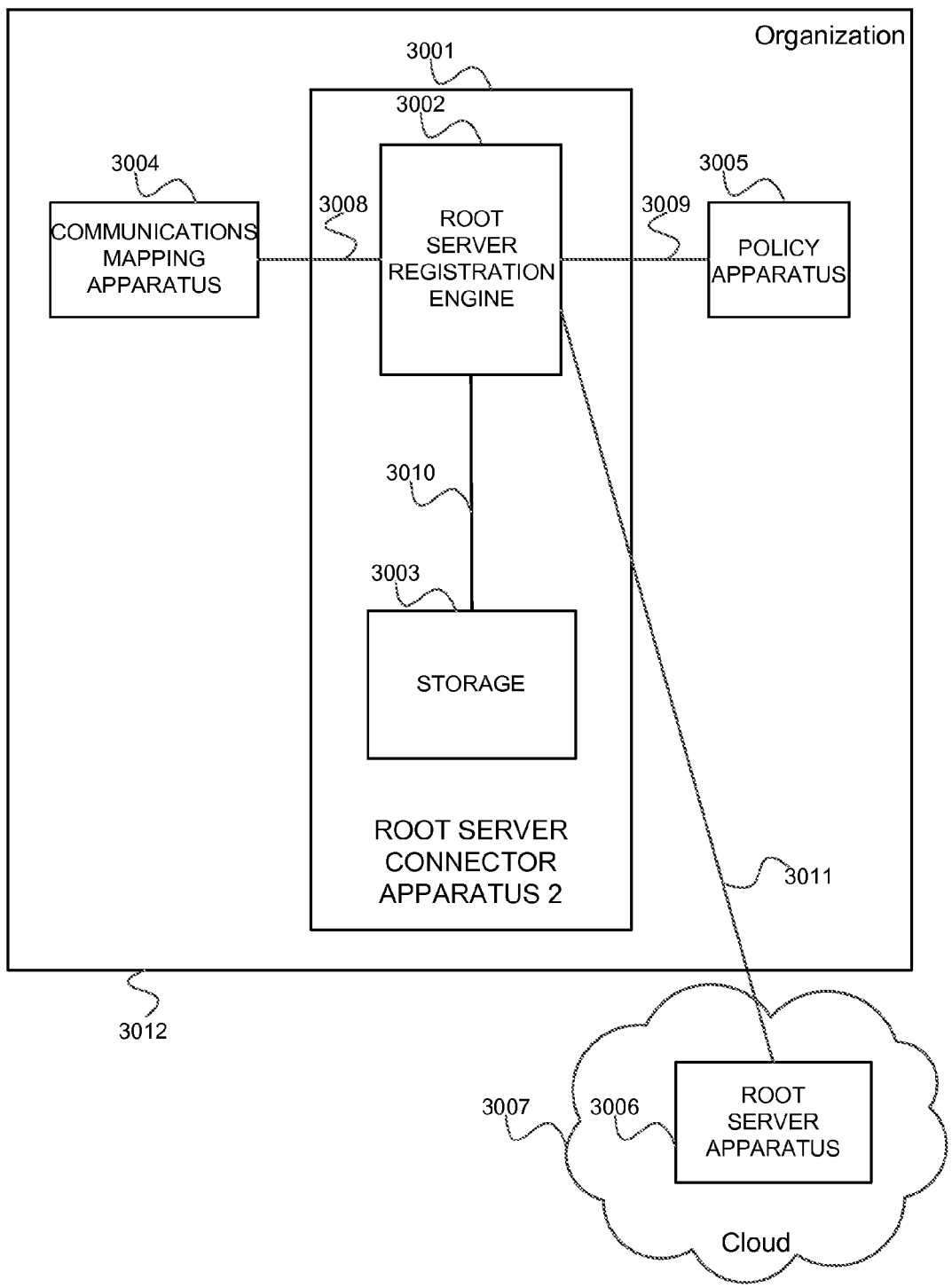
FIG. 30 illustrates an example of root server connector apparatus such as root server connector apparatus 601 of FIG. 6.

FIG. 30 illustrates an example of root server connector apparatus such as root server connector apparatus 601 of FIG. 6.

A root server connector apparatus 3001 may have a root server registration engine 3002 and a storage 3003. Root server registration engine 3002 in the root server registration apparatus 3001 of an organization 3001, communicates with 3013 and registers itself with the root server 3007 as point of contact for the organization. Root server connector apparatus 3001 may also communicate with one or more communications mapping apparatuses in the organization and register publicly available resources with the root server 3007.

In this embodiment, to obtain organization information to be registered with root server 3007, root server connector registration engine 3002 communicates 3009 to a policy apparatus 3005 for approval of communication to 3012 a communications mapping apparatus 3006. Policy apparatus 3005 allows and denies the collecting information about each apparatuses in the organization based on the policy set in the apparatus, such as register public conference rooms but don't register CEO's conference room. Root server registration engine 3002 stores 3011 the information to be registered in storage 3003 and communicates 3009 to policy apparatus 3005 for approval of communicating to a root server apparatus 3007. If policy apparatus 3005 allows registration with the particular root server apparatus 3006, which may be in cloud 3008 root server registration engine 3002 registers access information for the organization with the root server apparatus 3006. Policy apparatus 3005 determines which root servers is the organization allowed to register with. In other embodiments, root server registration engine 3002 may also communicate with lookup apparatuses and publishing apparatuses in the organization and register access information for those apparatuses with root server apparatus 3006.

Figure 31:
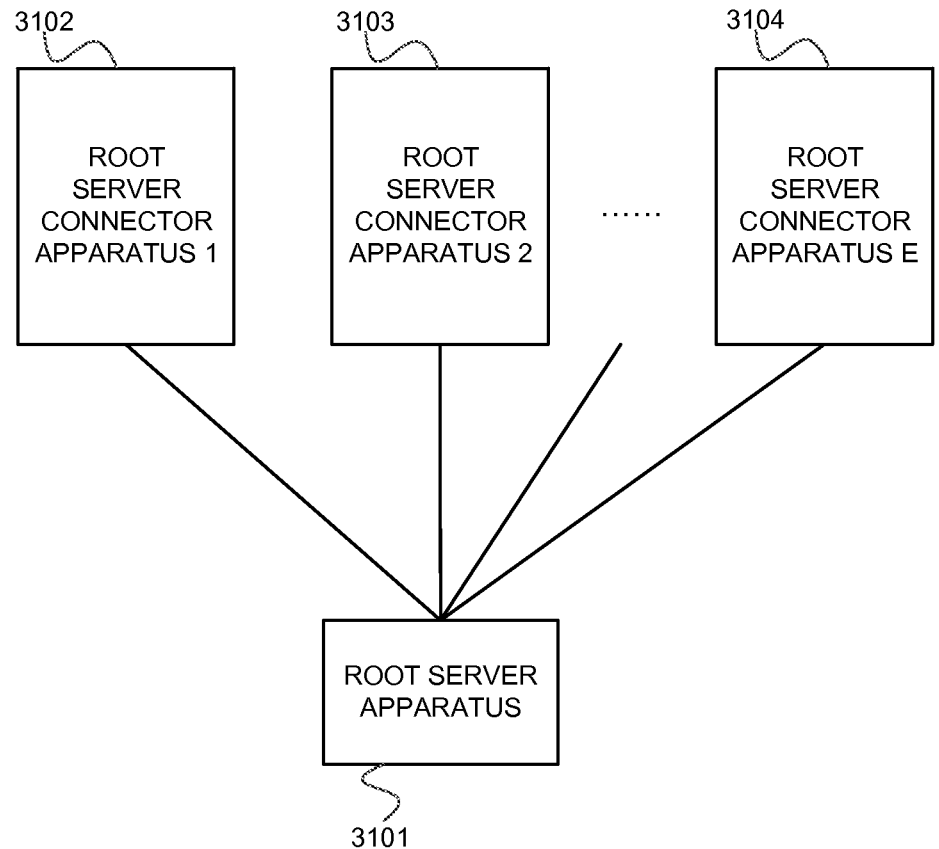
FIG. 31 illustrates an example of root server connector apparatuses and root server apparatus such as root server connector apparatus 601 of FIG. 6 and root server apparatus 701 of FIG. 7.

FIG. 31 illustrates an example of root server connector apparatuses and root server apparatus such as root server connector apparatus 601 of FIG. 6 and root server apparatus 701 of FIG. 7.

In this example one or more root server connector apparatuses 1 to e 3102-3104, may communicate with a root server apparatus 3101. Each root server connector apparatus may represent one or more organizations. When a root server connector apparatus, such as root server connector apparatus 1 3102, needs to reach a target organization, such as Company B, that is outside its represented organizations, such as Company A, root server apparatus 3101 is consulted and organization information is passed to root server apparatus 3101. Root server apparatus 3101 responds access information for target organization's root server connector apparatus, such as root server connector apparatus 2 3103 for Company B, and any other services provided publicly by the organization, such as availability and access information for lookup apparatuses and publishing apparatuses. In some cases organizations may allow access to discovery apparatuses and communications mapping apparatuses or calendaring apparatuses and such access information would be registered using root server connector apparatus to root server apparatus and would be made available through root server apparatus to other organizations.

Figure 32:
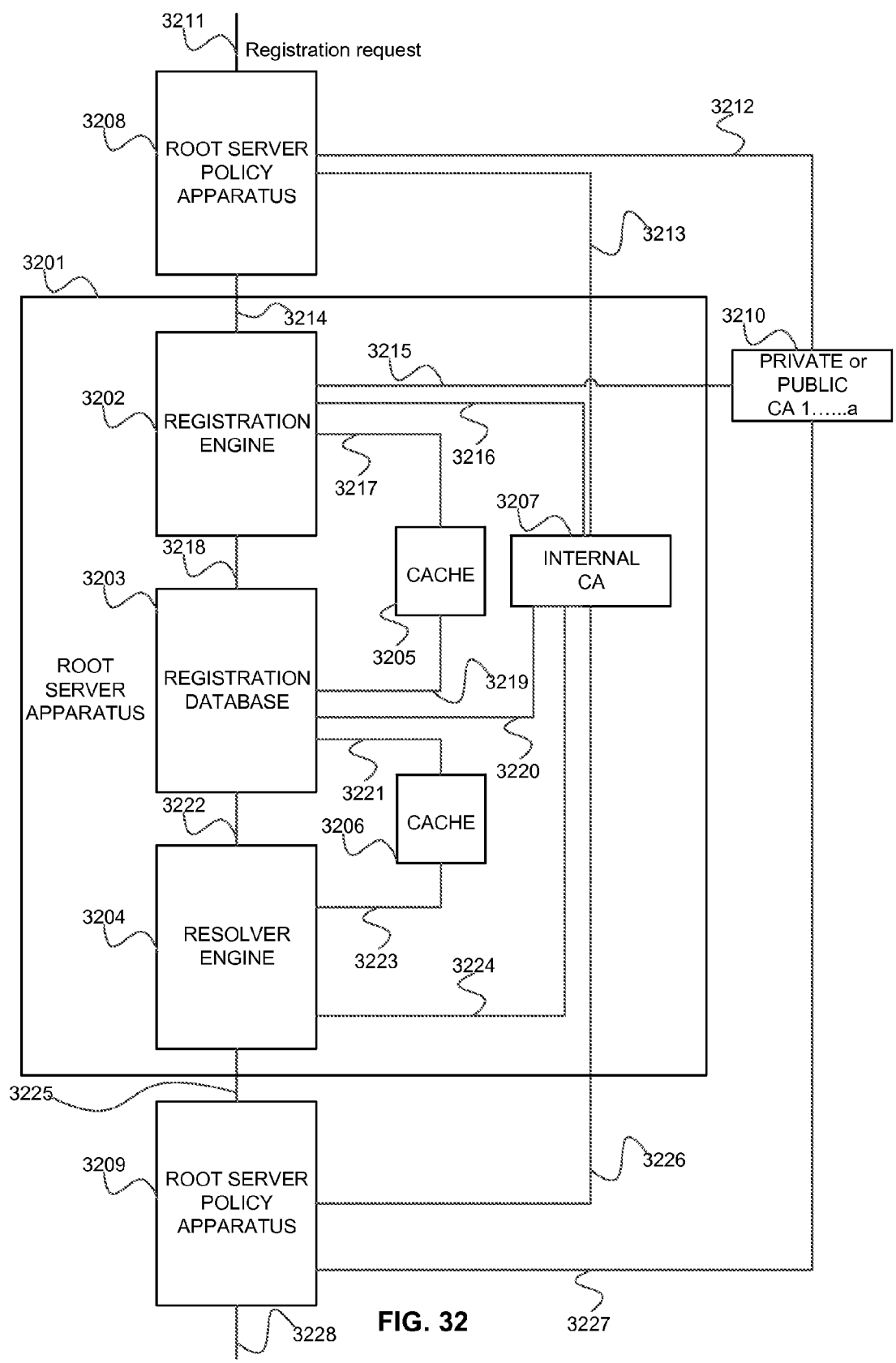
FIG. 32 illustrates an example of root server apparatus such as root server apparatus 701 of FIG. 7.

FIG. 32 illustrates an example of root server apparatus such as root server apparatus 701 of FIG. 7.

In this example a root server apparatus 3211 has a registration engine 3202, registration database 3203, resolver engine 3204, internal certificate authority 3207.

Registration engine 3202 may access registration database directly 3218 or using connection 3217 to a cache 3205 which connects 3219 to registration database 3203, such as using cache 3205 to improve access speed for frequently accessed items.

Resolver engine 3204 may access registration database 3204 directly 3222 or using connection 3223 to a cache 3206 which connects 3221 to registration database 3203, such as using cache 3206 to improve access speed for frequently accessed items Registration requests communicated 3211 to root server apparatus 3201 registration engine 3202 may be filtered by an inline policy apparatus 3208. Policy apparatus 3208 receives the registration request communication 3211, may check the identity of the registration request originator with communication 3213 to internal certificate authority 3207 in root server or with communication 3212 to one or more private or public certificate authorities 1 to a 3210, and forwards the registration request communication 3214 to registration engine 3202.

Resolving requests to 3228 root server apparatus may be filtered by an inline policy apparatus 3209. Policy apparatus 3209 receives the resolve request communication 3228, may check the identity of the registration request originator with communication 3226 to internal certificate authority 3207 in root server or with communication 3227 to one or more private or public certificate authorities 1 to a 3210, and forwards the registration request communication 3214 to resolver engine 3202.

Registration engine 3202 receives the registration request and records 3218 it in the registration database 3203 in consulting 3216 with the internal certificate authority 3207, and in consulting 3215 with one or more private certificate authorities and one or more public certificate authorities 1 to a 3210. Registration information may include access information for the root server connector apparatus, lookup apparatus, publishing apparatus for the organization and other information organization may want to make it available publicly.

Registration engine 3202 may sign the information with internal certificates and store in registration database 3203.

Registration database 3203 may work in consulting with internal certificate authority 3207 to permit engines to access database if they present valid certificates for access authorization and/or sign the requests with certificates.

Resolver engine 3204 receives 3225 resolving request and queries 3222 the registration database 3203 for the information. Once information is fetched, validity is checked by checking the signature on the information received against the signatures from the internal certificate authorities 3207 with communication 3226 to internal certificate authorities 3207. Alternatively, once information is fetched, validity is checked by checking the signature on the information received against the signatures from the one or more public certificate authorities and one or more public certificate authorities 1 to a 3210 with communication 3229 to one or more public certificate authorities and one or more public certificate authorities 1 to a 3210. Once validated, resolver engine 3204 communicates 3225 the response to policy apparatus 3209 to be communicated 3228 to requestor.

As registration information is received, authenticity of information source and information itself is verified with certificates.

Certificates are used to authenticate and encrypt the communications between the components of the root server 3201 and other apparatuses such as root server policy apparatus, root server connector apparatus, private certificate authorities, public certificate authorities 1 to a 3210.

Figure 33:
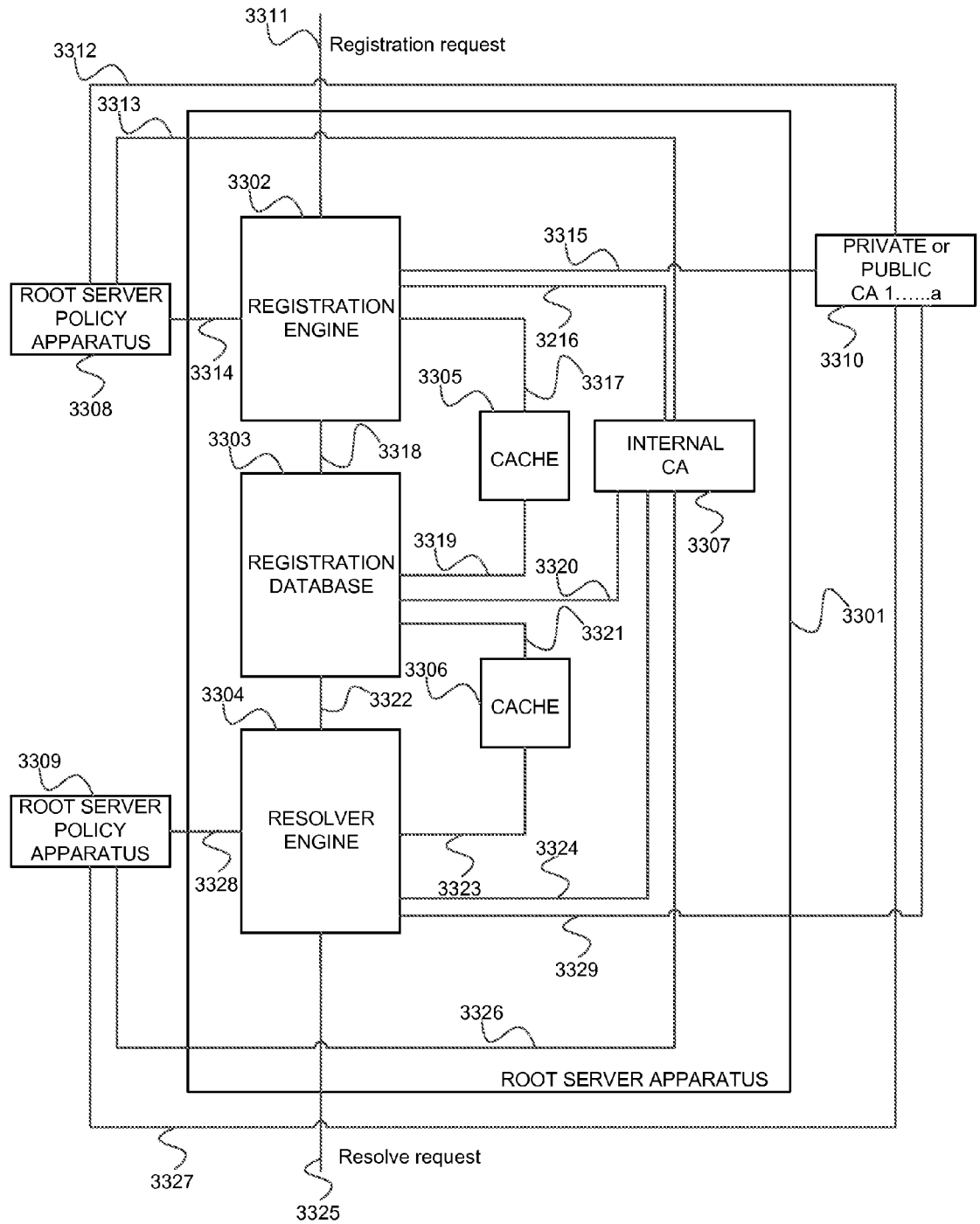
FIG. 33 illustrates an example of root server apparatus such as root server apparatus 701 of FIG. 7.

FIG. 33 illustrates an example of root server apparatus such as root server apparatus 701 of FIG. 7.

In this example a root server apparatus 3311 has a registration engine 3302, registration database 3303, resolver engine 3304, internal certificate authority 3307.

Registration engine 3302 may access registration database directly 3318 or using connection 3317 to a cache 3305 which connects 3319 to registration database 3303, such as using cache 3305 to improve access speed for frequently accessed items.

Resolver engine 3304 may access registration database 3304 directly 3322 or using connection 3323 to a cache 3306 which connects 3321 to registration database 3303, such as using cache 3306 to improve access speed for frequently accessed items Registration requests communicated 3311 to root server apparatus 3301 registration engine 3302 may be allowed or denied by consulting policy apparatus 3308. Policy apparatus 3308 receives the registration request communication 3314, may check the identity of the registration request originator with communication 3313 to internal certificate authority 3307 in root server apparatus or with communication 3312 to one or more private or public certificate authorities 1 to a 3310, and communicates 3314 allow or deny to response to registration engine 3302.

Resolving requests communicated 3325 to root server apparatus 3301 resolver engine 3304 may be allowed or denied by consulting policy apparatus 3309. Policy apparatus 3309 receives the registration request communication 3328, may check the identity of the registration request originator with communication 3326 to internal certificate authority 3307 in root server apparatus or with communication 3327 to one or more private or public certificate authorities 1 to a 3310, and communicates 3328 allow or deny to response to resolver engine 3304.

Registration engine 3302 receives the registration request and records 3318 it in the registration database 3303 in consulting 3316 with the internal certificate authority 3307, and in consulting 3315 with one or more private certificate authorities and one or more public certificate authorities 1 to a 3310. Registration information may include access information for the root server connector apparatus, lookup apparatus, publishing apparatus for the organization and other information organization may want to make it available publicly.

Registration engine 3302 may sign the information with internal certificates and store in registration database 3303.

Registration database 3303 may work in consulting with internal certificate authority 3307 to permit engines to access database if they present valid certificates for access authorization and/or sign the requests with certificates.

Resolver engine 3304 receives 3325 resolving request and queries 3322 the registration database 3303 for the information. Once information is fetched, validity is checked by checking the signature on the information received against the signatures from the internal certificate authorities 3307 with communication 3326 to internal certificate authorities 3307. Alternatively, once information is fetched, validity is checked by checking the signature on the information received against the signatures from the one or more public certificate authorities and one or more public certificate authorities 1 to a 3310 with communication 3329 to one or more public certificate authorities and one or more public certificate authorities 1 to a 3310. Once validated, resolver engine 3304 consults 3328 the policy apparatus 3309, if policy apparatus 3309 approves sending the response message, resolver engine 3304 communicates 3325 the response message to requestor.

As registration information is received, authenticity of information source and information itself is verified with certificates.

Certificates are used to authenticate and encrypt the communications between the components of the root server 3301 and other apparatuses such as root server policy apparatus, root server connector apparatus, private certificate authorities, public certificate authorities 1 to a 3310.

Figure 34:
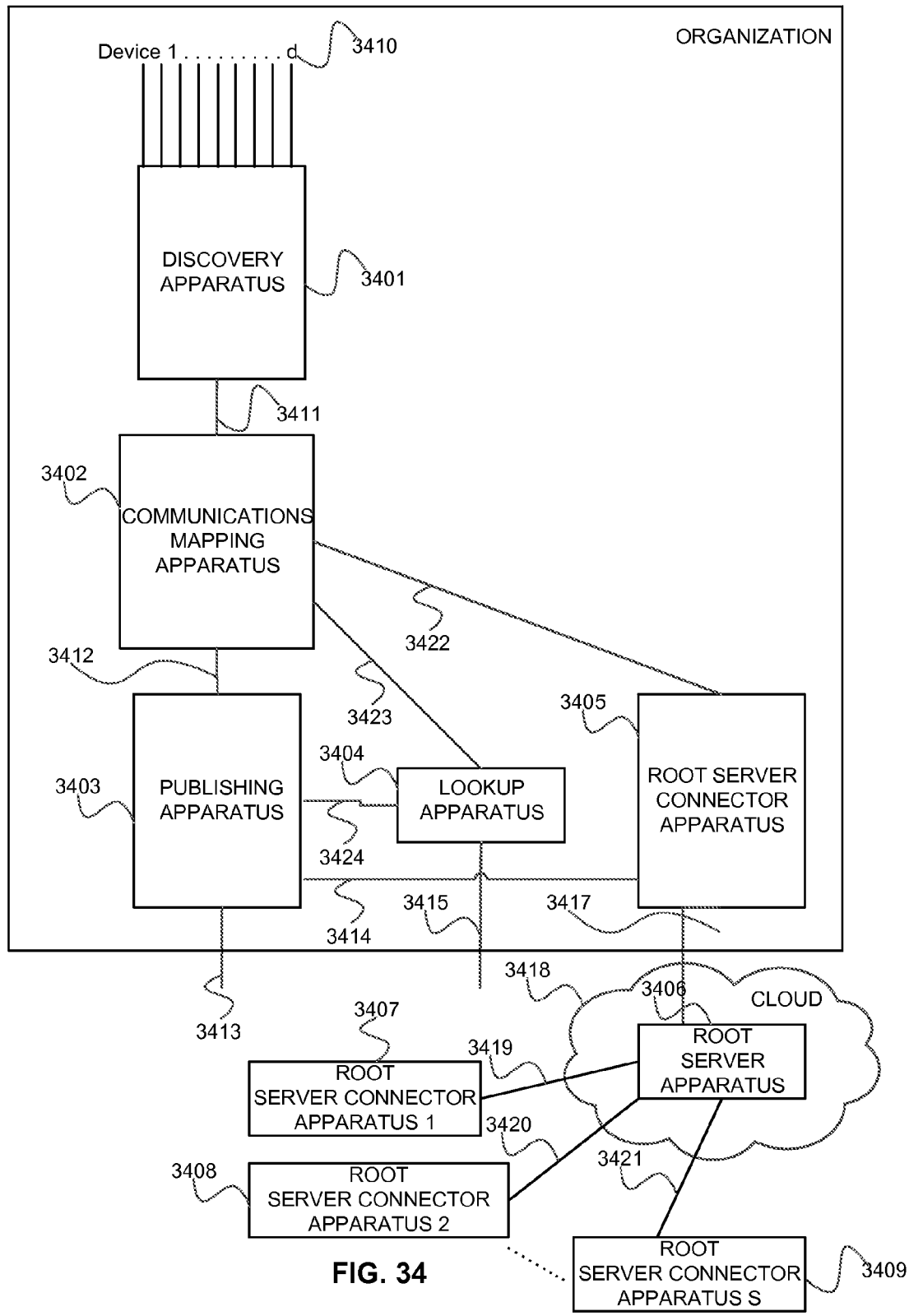
FIG. 34 illustrates an example of an organization connection to root server apparatus using root server connector apparatus in an environment with one or more of each discovery apparatus such as discovery apparatus 101 in FIG. 1, communications mapping apparatus such as communications mapping apparatus 201 in FIG. 2, policy apparatus such as policy apparatus 301 in FIG. 3, lookup apparatus such as lookup apparatus 401 in FIG. 4, publishing apparatus such as publishing apparatus 501 in FIG. 5, root server connector apparatus such as root server connector apparatus 601 in FIG. 6, root server apparatus such as root server apparatus 701 in FIG. 7, root server policy apparatus such as root server policy apparatus 801 in FIG. 8, pooling apparatus such as pooling apparatus 901 in FIG. 9.

FIG. 34 illustrates an example of an organization connection to root server apparatus using root server connector apparatus in an environment with one or more of each discovery apparatus such as discovery apparatus 101 in FIG. 1, communications mapping apparatus such as communications mapping apparatus 201 in FIG. 2, policy apparatus such as policy apparatus 301 in FIG. 3, lookup apparatus such as lookup apparatus 401 in FIG. 4, publishing apparatus such as publishing apparatus 501 in FIG. 5, root server connector apparatus such as root server connector apparatus 601 in FIG. 6, root server apparatus such as root server apparatus 701 in FIG. 7, root server policy apparatus such as root server policy apparatus 801 in FIG. 8, pooling apparatus such as pooling apparatus 901 in FIG. 9.

In this example an organization has devices 1 to d 3410 which is discovered by discovery apparatus 3401, which communicates 3411 the reference information from discovery apparatus 3401 to communications mapping apparatus 3402. Communications mapping apparatus 3402 creates a map of all the resources in organization which are discovered by discovery apparatus.

Publishing apparatus 3403 provides public information about the organization by receiving information to be published over communications 3412 from communications mapping apparatus 3402 and storing, updating them in the apparatus and publishing them over connections 3413.

Lookup apparatus 3404 provides public lookup services and communicates with 3423 and consults communications mapping apparatus 3402 to obtain and respond to such requests coming over connections 3415.

Root server connector apparatus 3405 registers itself as organizations point of contact over communications 3417 with the root server 3406 which may be in cloud 3418.

Root server connector apparatus 3405 also publishes access information for publishing apparatus 3403, lookup apparatus 3404 and communications mapping apparatus 3402 which may be learned and updated over connections 3414 to publishing apparatus 3403, connections 3422 to communications mapping apparatus 3402 and connections 3424 to lookup apparatus 3404.

Root server connector apparatus 3405 may publish some information from communications mapping apparatus 3402 to root server apparatus 3406.

Other organizations with root server connectors 1 to s 3407-3409 may also register themselves with the root server apparatus 3406, making the root server apparatus a central repository of access information for all the organizations registering with the root server apparatus 3406.

Organization may utilize one or more policy apparatuses such as policy apparatus 301 in FIG. 3 to enforce organizational policies.

Root server authority may utilize one or more root server policy apparatuses such as root server policy apparatus 801 in FIG. 8 to enforce root server security and access.

Organization may utilize one or more pooling apparatus such as pooling apparatus 901 in FIG. 9 to pool resources such as conference rooms in the same floor.

Figure 35:
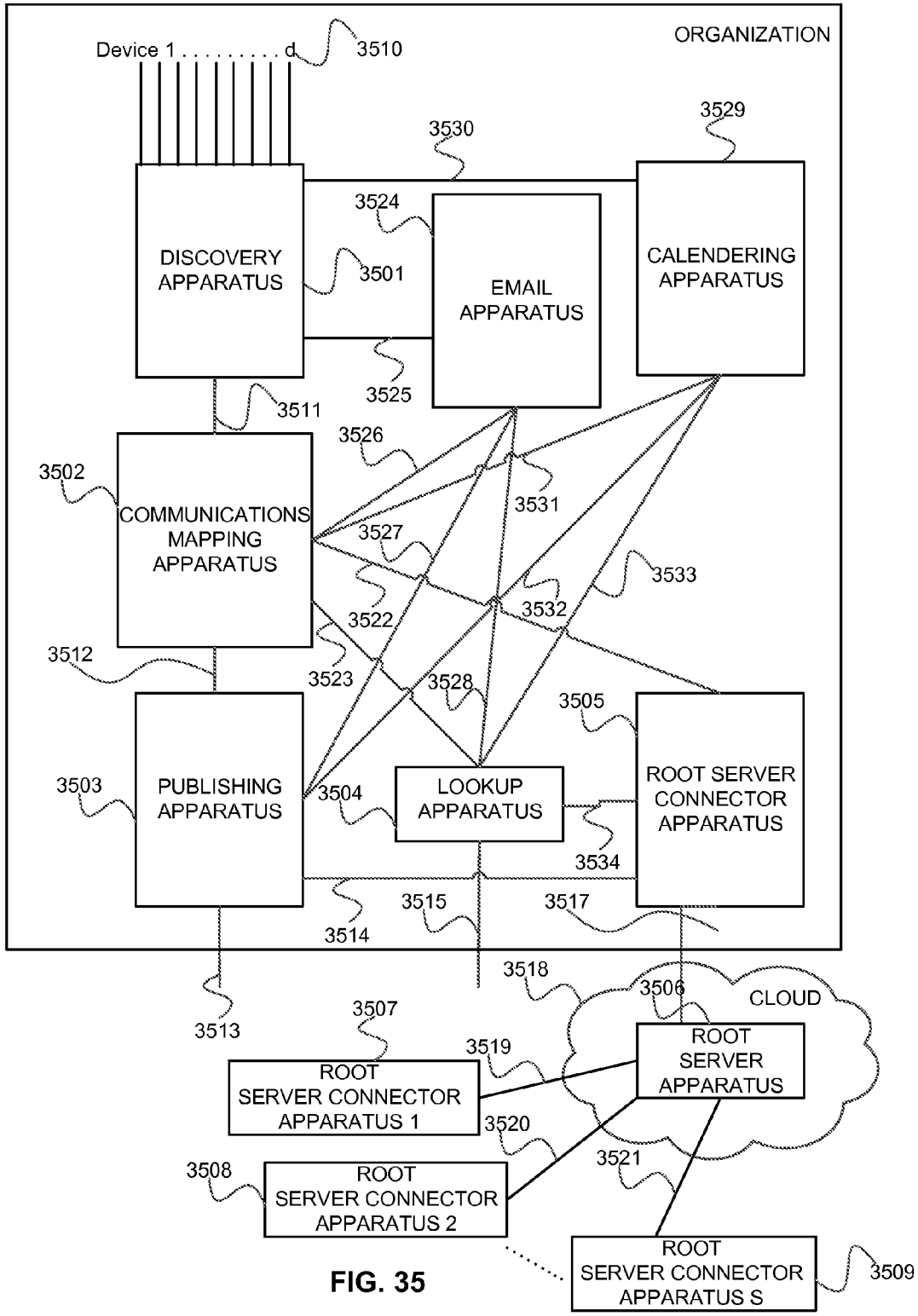
FIG. 35 illustrates an example of an organization connection to root server apparatus using root server connector apparatus in an environment with one or more of each email apparatus, calendaring apparatus, discovery apparatus such as discovery apparatus 101 in FIG. 1, communications mapping apparatus such as communications mapping apparatus 201 in FIG. 2, policy apparatus such as policy apparatus 301 in FIG. 3, lookup apparatus such as lookup apparatus 401 in FIG. 4, publishing apparatus such as publishing apparatus 501 in FIG. 5, root server connector apparatus such as root server connector apparatus 601 in FIG. 6, root server apparatus such as root server apparatus 701 in FIG. 7, root server policy apparatus such as root server policy apparatus 801 in FIG. 8, pooling apparatus such as pooling apparatus 901 in FIG. 9.

FIG. 35 illustrates an example of an organization connection to root server apparatus using root server connector apparatus in an environment with one or more of each email apparatus, calendaring apparatus, discovery apparatus such as discovery apparatus 101 in FIG. 1, communications mapping apparatus such as communications mapping apparatus 201 in FIG. 2, policy apparatus such as policy apparatus 301 in FIG. 3, lookup apparatus such as lookup apparatus 401 in FIG. 4, publishing apparatus such as publishing apparatus 501 in FIG. 5, root server connector apparatus such as root server connector apparatus 601 in FIG. 6, root server apparatus such as root server apparatus 701 in FIG. 7, root server policy apparatus such as root server policy apparatus 801 in FIG. 8, pooling apparatus such as pooling apparatus 901 in FIG. 9.

In this example an organization has devices 1 to d 3510 which is discovered by discovery apparatus 3501. Discovery apparatus connects 3525 to email apparatus 3524 and communicates with 3530 calendaring apparatus and discovers the information and services provided. Discovery apparatus 3501 communicates 3511 the reference information from discovery apparatus 3501 to communications mapping apparatus 3502.

Communications mapping apparatus 3502 creates a map of all the resources in organization which are discovered by discovery apparatus. Communications mapping apparatus may connect 3526 to email apparatus 3530, may connect 3531 to calendaring apparatus to communicate to request and receive additional information that may not be presented in reference information received from the discovery apparatus 3501.

Email apparatus 3524 is discovered by discovery apparatus 3501, mapped and extended information obtained by communications mapping apparatus 3502, publishable information published by publishing apparatus 3503, e-mails are looked up by lookup apparatus 3504, and existence is registered to root server 3506 by root server connector apparatus 3505.

Calendaring apparatus 3529 is discovered by discovery apparatus 3501, mapped and extended information obtained by communications mapping apparatus 3502, publishable information published by publishing apparatus 3503, calendars are looked up by lookup apparatus 3504, and existence is registered to root server 3506 by root server connector apparatus 3505.

Publishing apparatus 3503 provides public information about the organization by receiving information to be published over communications 3512 from communications mapping apparatus 3502 and storing, updating them in the apparatus and publishing them over connections 3513. Such information may include information received with communication 3527 with email apparatus 3530, information received with communication 3532 with calendaring apparatus 3529.

Lookup apparatus 3504 provides public lookup services and communicates with 3523 and consults communications mapping apparatus 3502 to obtain and respond to such requests coming over connections 3515. Such information may include information received with communication 3528 with email apparatus 3530, information received with communication 3533 with calendaring apparatus 3529.

Root server connector apparatus 3505 registers itself as organizations point of contact over communications 3517 with the root server 3506 which may be in cloud 3518.

Root server connector apparatus 3505 also publishes access information for publishing apparatus 3503, lookup apparatus 3504 and communications mapping apparatus 3502 which may be learned and updated over connections 3514 to publishing apparatus 3503, connections 3522 to communications mapping apparatus 3502 and connections 3524 to lookup apparatus 3504.

Root server connector apparatus 3505 publishes access information about email apparatus 3524 and calendaring apparatus 3529, which may be learned and updated through communication mapping apparatus 3502.

Root server connector apparatus 3505 may publish some information from communications mapping apparatus 3502 to root server apparatus 3506.

Other organizations with root server connectors 1 to s 3507-3509 may also register themselves with the root server apparatus 3506, making the root server apparatus a central repository of access information for all the organizations registering with the root server apparatus 3506.

Organization may utilize one or more policy apparatuses such as policy apparatus 301 in FIG. 3 to enforce organizational policies.

Root server authority may utilize one or more root server policy apparatuses such as root server policy apparatus 801 in FIG. 8 to enforce root server security and access.

Organization may utilize one or more pooling apparatus such as pooling apparatus 901 in FIG. 9 to pool resources such as conference rooms in the same floor.

Figure 36:
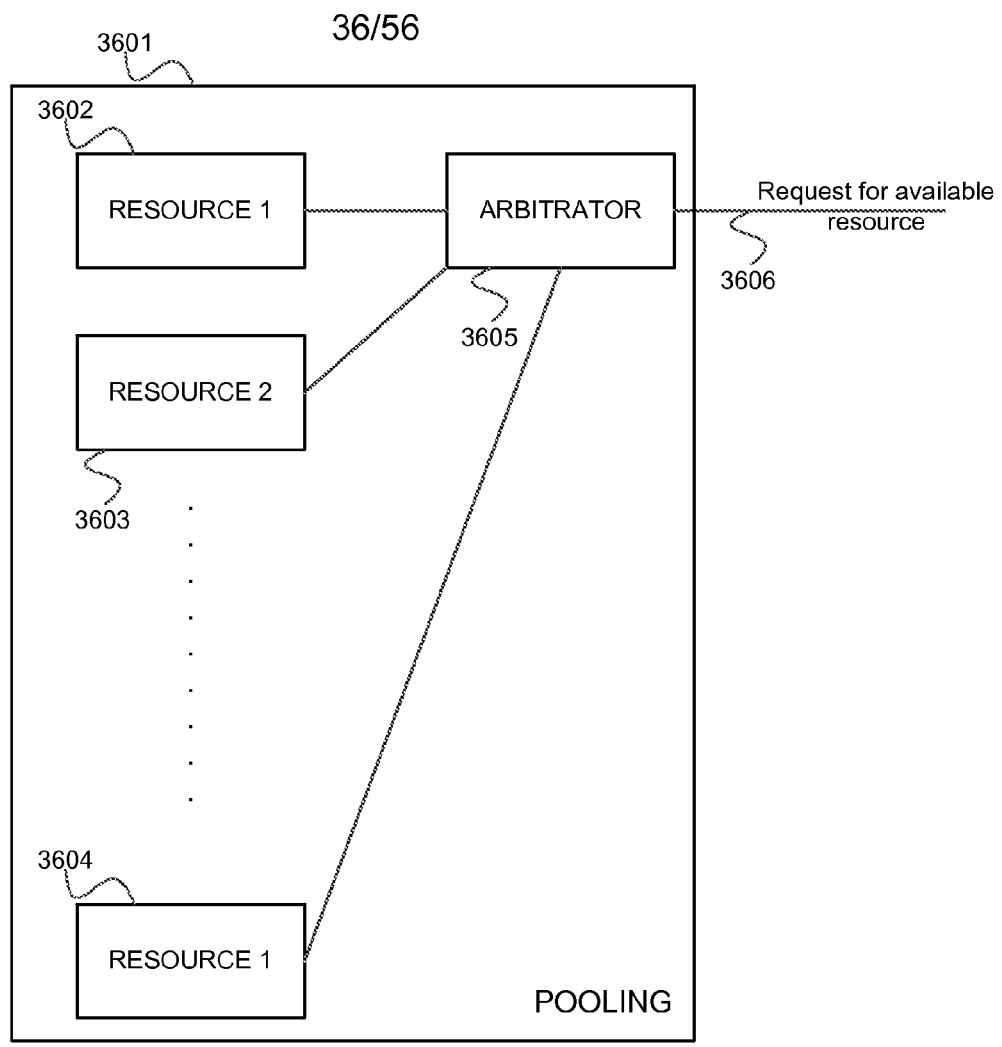
FIG. 36 illustrates an example of pooling apparatus with an available resource request such as pooling apparatus 901 in FIG. 9.

FIG. 36 illustrates an example of pooling apparatus with an available resource request such as pooling apparatus 901 in FIG. 9.

In an example of pooling apparatus 3601, multiple resources pooled are identified in the pool as resource 1 to r 3602-3604.

A request for an available resource is made to pooling apparatus which is received by arbitrator 3605 in pooling apparatus 3601 over connection 3606 to arbitrator 3605 in pooling apparatus 3601.

Arbitrator 3605 checks availability of the resources and locks in an available one, for example resource 1 3602, and provides access information for the apparatus assigned as a response over connection 3606 of pooling apparatus 3601, if there is no resources available, request is denied or ignored and may be communicated 3706 back to requestor.

In certain embodiments, resources may be conference rooms, phone lines, multipoint video conferencing ports available, or even human resources such as available conference concierge person, in which case video conference number or phone number of the person may be returned from the pooling apparatus.

Figure 37:
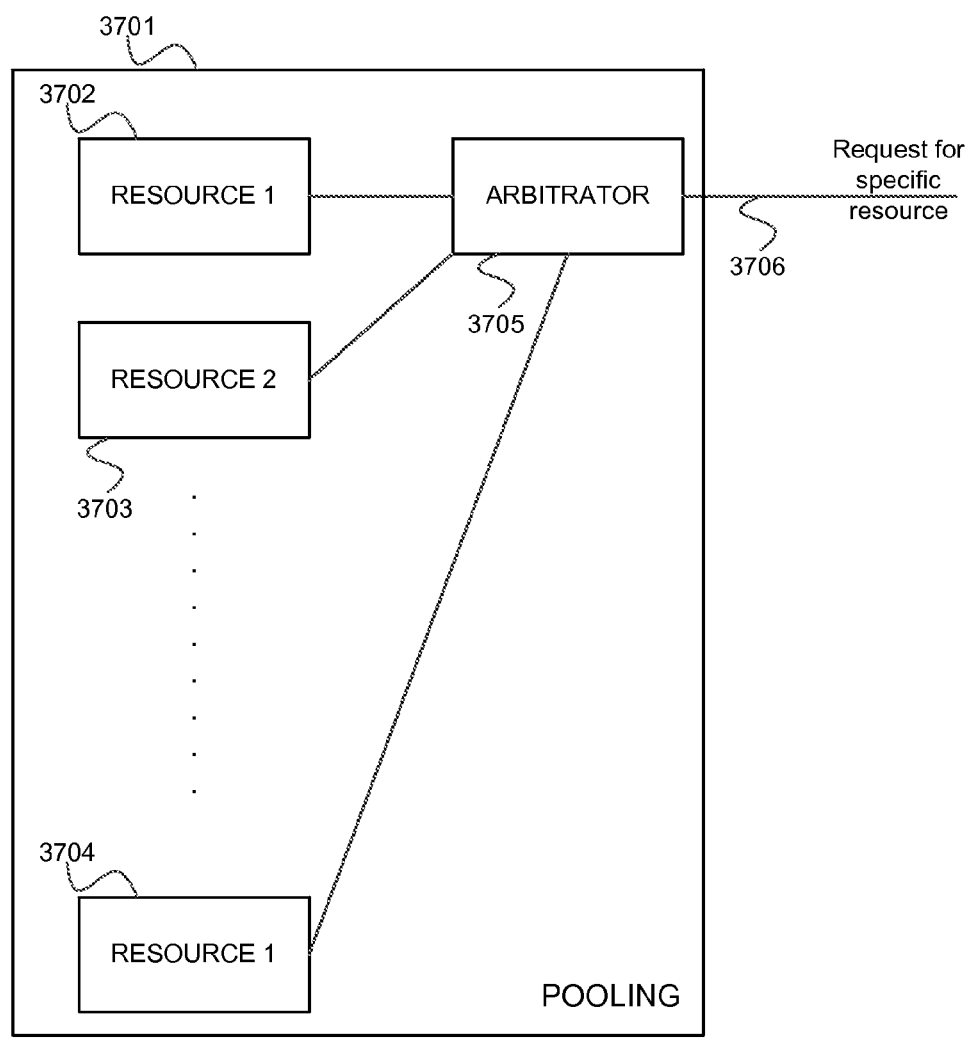
FIG. 37 illustrates an example of pooling apparatus with a specific resource request such as pooling apparatus 901 in FIG. 9.

FIG. 37 illustrates an example of pooling apparatus with a specific resource request such as pooling apparatus 901 in FIG. 9.

In an example of pooling apparatus 3701, multiple resources pooled are identified in the pool as resource 1 to r 3702-3704.

A request for a specific resource, for example resource 2, is made to pooling apparatus which is received by arbitrator 3705 in pooling apparatus 3701 over connection 3706 to arbitrator 3705 in pooling apparatus 3701.

Arbitrator 3705 checks availability of the specific resource, for example resource 2, and locks in the resource if it is available and provides access information for the apparatus assigned as a response over connection 3706 of pooling apparatus 3701, if there is no resources available, request is denied or ignored and may be communicated 3706 back to requestor.

In certain embodiments, resources may be conference rooms, phone lines, multipoint video conferencing ports available, or even human resources such as available conference concierge person, in which case video conference number or phone number of the person may be returned from the pooling apparatus.

Figure 38:
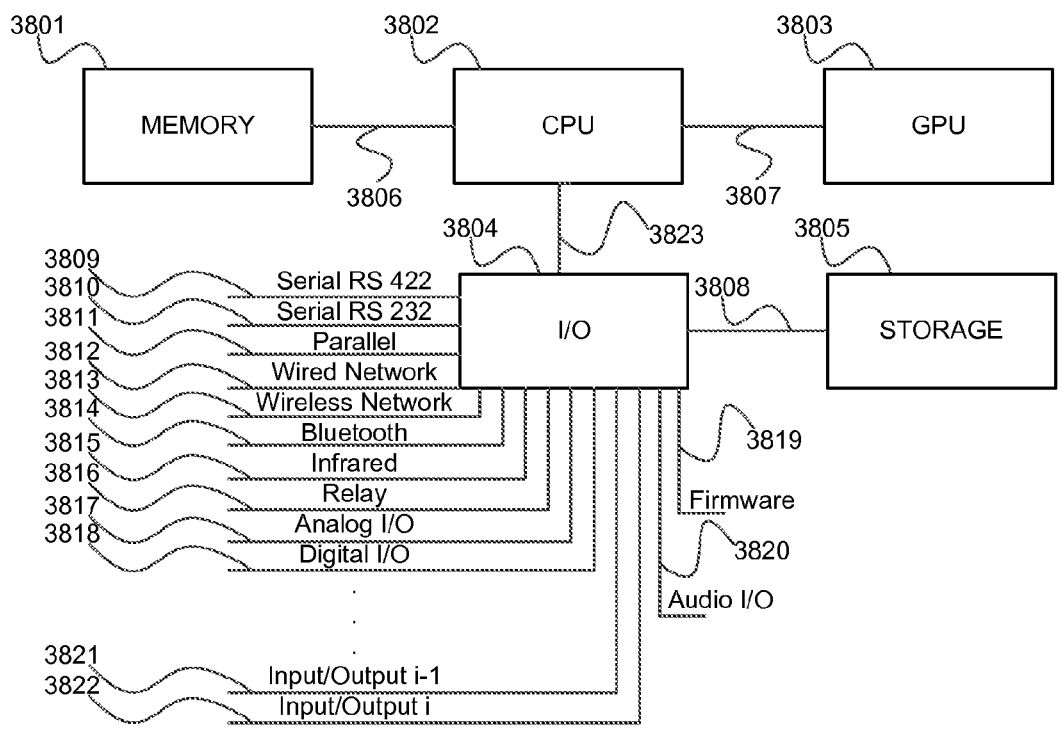
FIG. 38 illustrates an example hardware platform that may be used for discovery apparatus such as discovery apparatus 101 in FIG. 1, communications mapping apparatus such as communications mapping apparatus 201 in FIG. 2, policy apparatus such as policy apparatus 301 in FIG. 3, lookup apparatus such as lookup apparatus 401 in FIG. 4, publishing apparatus such as publishing apparatus 501 in FIG. 5, root server connector apparatus such as root server connector apparatus 601 in FIG. 6, root server apparatus such as root server apparatus 701 in FIG. 7, root server policy apparatus such as root server policy apparatus 801 in FIG. 8, pooling apparatus such as pooling apparatus 901 in FIG. 9.

FIG. 38 illustrates an example hardware platform that may be used for discovery apparatus such as discovery apparatus 101 in FIG. 1, communications mapping apparatus such as communications mapping apparatus 201 in FIG. 2, policy apparatus such as policy apparatus 301 in FIG. 3, lookup apparatus such as lookup apparatus 401 in FIG. 4, publishing apparatus such as publishing apparatus 501 in FIG. 5, root server connector apparatus such as root server connector apparatus 601 in FIG. 6, root server apparatus such as root server apparatus 701 in FIG. 7, root server policy apparatus such as root server policy apparatus 801 in FIG. 8, pooling apparatus such as pooling apparatus 901 in FIG. 9.

In an example of discovery apparatus hardware implementation, there is a CPU 3802, which has a direct connection 3806 to memory 3801 and a direct connection 3807 to GPU 3803, and a direct connection 3823 to I/O 3804.

I/O has 1 to i connections 3809-3822 which include Serial RS422, Serial RS232, parallel, wired network, wireless network, Bluetooth, infrared, relay, analog I/O, digital I/O, firmware, audio I/O, input i-1, input i. I/O also connects 3808 to storage 3805.

Figure 39:
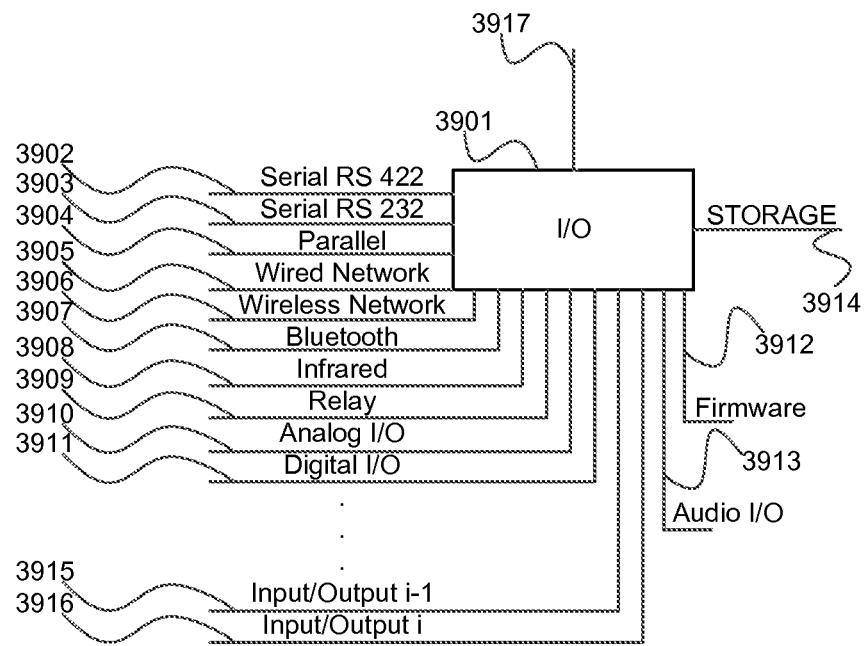
FIG. 39 illustrates an example I/O module that may be used for discovery apparatus such as discovery apparatus 101 in FIG. 1, communications mapping apparatus such as communications mapping apparatus 201 in FIG. 2, policy apparatus such as policy apparatus 301 in FIG. 3, lookup apparatus such as lookup apparatus 401 in FIG. 4, publishing apparatus such as publishing apparatus 501 in FIG. 5, root server connector apparatus such as root server connector apparatus 601 in FIG. 6, root server apparatus such as root server apparatus 701 in FIG. 7, root server policy apparatus such as root server policy apparatus 801 in FIG. 8, pooling apparatus such as pooling apparatus 901 in FIG. 9.

FIG. 39 illustrates an example I/O module that may be used for discovery apparatus such as discovery apparatus 101 in FIG. 1, communications mapping apparatus such as communications mapping apparatus 201 in FIG. 2, policy apparatus such as policy apparatus 301 in FIG. 3, lookup apparatus such as lookup apparatus 401 in FIG. 4, publishing apparatus such as publishing apparatus 501 in FIG. 5, root server connector apparatus such as root server connector apparatus 601 in FIG. 6, root server apparatus such as root server apparatus 701 in FIG. 7, root server policy apparatus such as root server policy apparatus 801 in FIG. 8, pooling apparatus such as pooling apparatus 901 in FIG. 9.

I/O 3901 has 1 to i connections 3902-3916 which include Serial RS422, Serial RS232, parallel, wired network, wireless network, Bluetooth, infrared, relay, analog I/O, digital I/O, firmware, audio I/O, input i-1, input i. I/O interfaces with system over connection 3917.

Figure 40:
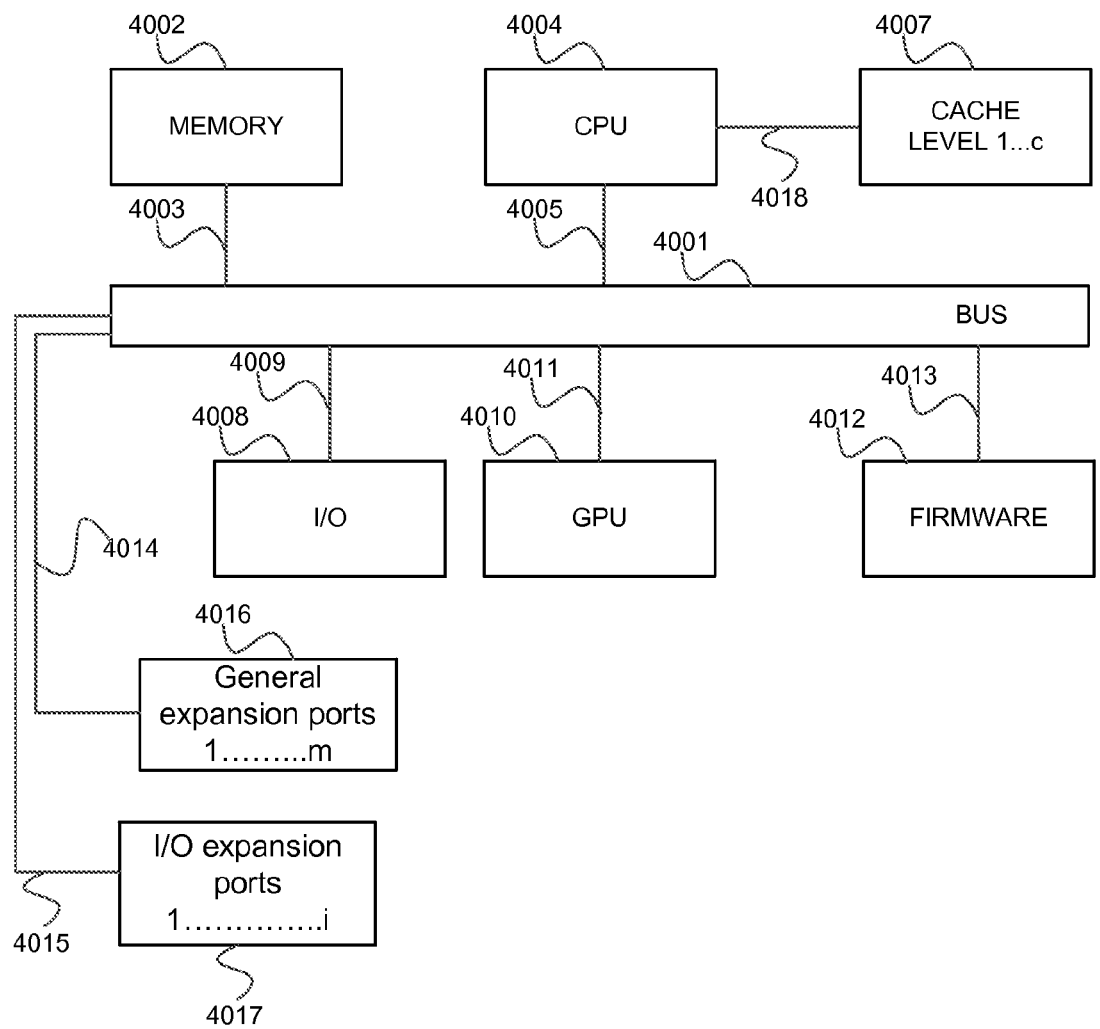
FIG. 40 illustrates an example hardware platform that may be used for discovery apparatus such as discovery apparatus 101 in FIG. 1, communications mapping apparatus such as communications mapping apparatus 201 in FIG. 2, policy apparatus such as policy apparatus 301 in FIG. 3, lookup apparatus such as lookup apparatus 401 in FIG. 4, publishing apparatus such as publishing apparatus 501 in FIG. 5, root server connector apparatus such as root server connector apparatus 601 in FIG. 6, root server apparatus such as root server apparatus 701 in FIG. 7, root server policy apparatus such as root server policy apparatus 801 in FIG. 8, pooling apparatus such as pooling apparatus 901 in FIG. 9.

FIG. 40 illustrates an example hardware platform that may be used for discovery apparatus such as discovery apparatus 101 in FIG. 1, communications mapping apparatus such as communications mapping apparatus 201 in FIG. 2, policy apparatus such as policy apparatus 301 in FIG. 3, lookup apparatus such as lookup apparatus 401 in FIG. 4, publishing apparatus such as publishing apparatus 501 in FIG. 5, root server connector apparatus such as root server connector apparatus 601 in FIG. 6, root server apparatus such as root server apparatus 701 in FIG. 7, root server policy apparatus such as root server policy apparatus 801 in FIG. 8, pooling apparatus such as pooling apparatus 901 in FIG. 9.

In an example discovery apparatus, there is a CPU 4004 that connects 4018 to multi-level cache from cache level 1 to cache level C 4007. There is a common bus for interconnection of memory 4002, CPU 4004, GPU 4010, firmware 4012, I/O 4008, general expansion ports 1 to m 4016, and I/O expansion ports 1 to i 4017 using connections 4003, 4005, 4011, 4013, 4009, 4014, and 4015.

Figure 41:
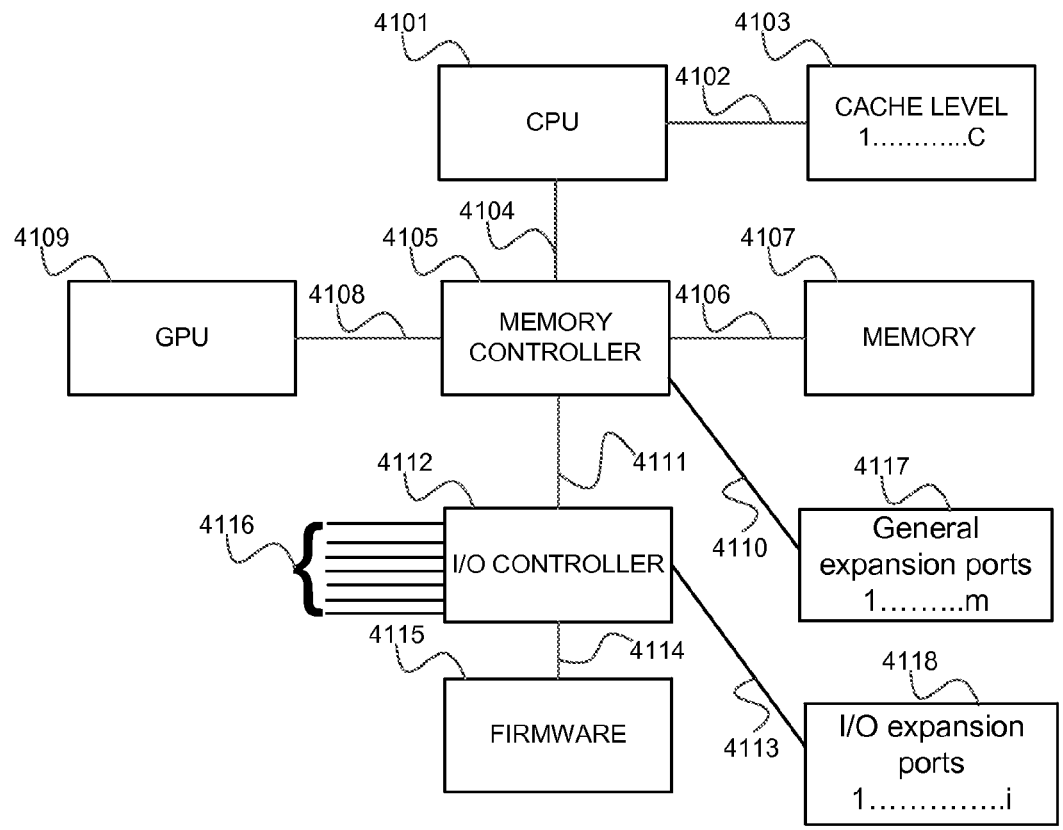
FIG. 41 illustrates an example hardware platform that may be used for discovery apparatus such as discovery apparatus 101 in FIG. 1, communications mapping apparatus such as communications mapping apparatus 201 in FIG. 2, policy apparatus such as policy apparatus 301 in FIG. 3, lookup apparatus such as lookup apparatus 401 in FIG. 4, publishing apparatus such as publishing apparatus 501 in FIG. 5, root server connector apparatus such as root server connector apparatus 601 in FIG. 6, root server apparatus such as root server apparatus 701 in FIG. 7, root server policy apparatus such as root server policy apparatus 801 in FIG. 8, pooling apparatus such as pooling apparatus 901 in FIG. 9.

FIG. 41 illustrates an example hardware platform that may be used for discovery apparatus such as discovery apparatus 101 in FIG. 1, communications mapping apparatus such as communications mapping apparatus 201 in FIG. 2, policy apparatus such as policy apparatus 301 in FIG. 3, lookup apparatus such as lookup apparatus 401 in FIG. 4, publishing apparatus such as publishing apparatus 501 in FIG. 5, root server connector apparatus such as root server connector apparatus 601 in FIG. 6, root server apparatus such as root server apparatus 701 in FIG. 7, root server policy apparatus such as root server policy apparatus 801 in FIG. 8, pooling apparatus such as pooling apparatus 901 in FIG. 9.

In an example discovery apparatus, there is a CPU 4101 connected 4102 to multi-level cache from cache level 1 to cache level C 4103. CPU connects 4104 to a memory controller 4105. Memory controller 4105 connects 4106 to memory 4107, connects 4111 to I/O controller 4112, connects 4110 to general expansion ports 1 to m 4117 and connects 4108 GPU 4109.

I/O controller 4112 has multiple input ports 4116 and connects 4113 to I/O expansion ports 1 to i 4118 and connects 4114 to firmware 4115.

Figure 42:
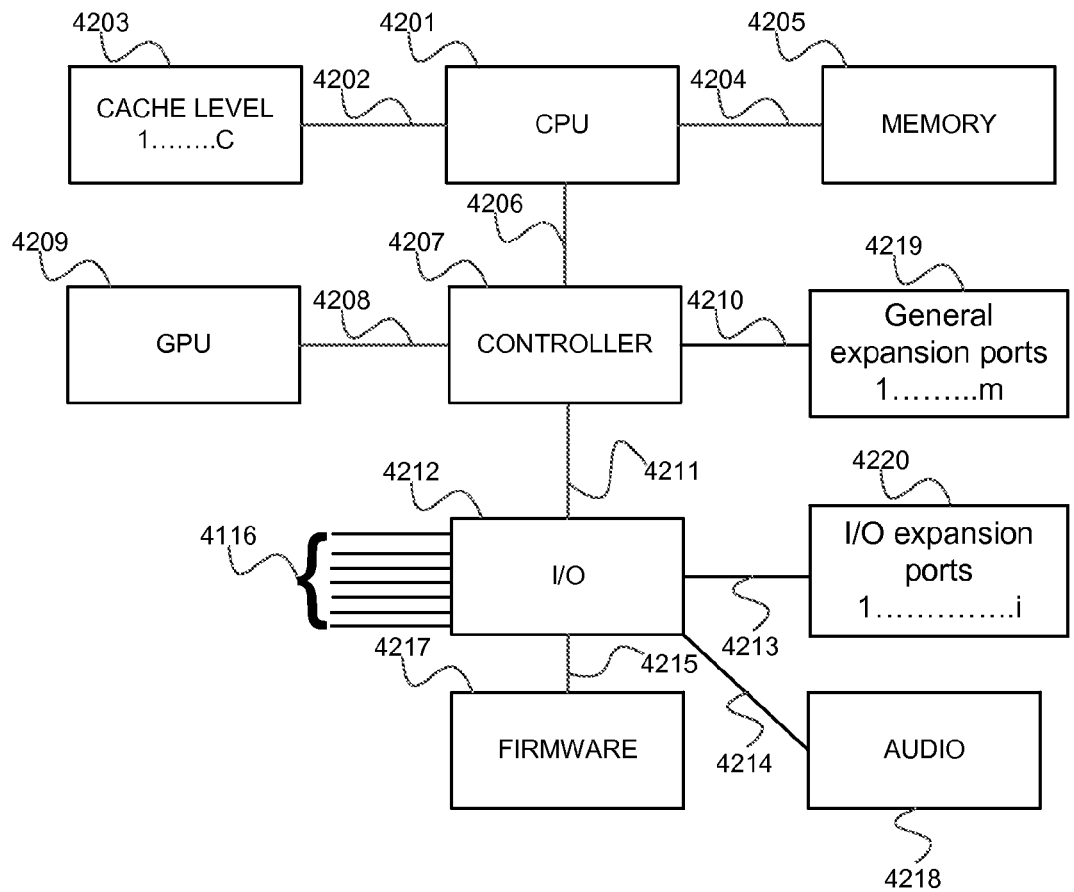
FIG. 42 illustrates an example hardware platform that may be used for discovery apparatus such as discovery apparatus 101 in FIG. 1, communications mapping apparatus such as communications mapping apparatus 201 in FIG. 2, policy apparatus such as policy apparatus 301 in FIG. 3, lookup apparatus such as lookup apparatus 401 in FIG. 4, publishing apparatus such as publishing apparatus 501 in FIG. 5, root server connector apparatus such as root server connector apparatus 601 in FIG. 6, root server apparatus such as root server apparatus 701 in FIG. 7, root server policy apparatus such as root server policy apparatus 801 in FIG. 8, pooling apparatus such as pooling apparatus 901 in FIG. 9.

FIG. 42 illustrates an example hardware platform that may be used for discovery apparatus such as discovery apparatus 101 in FIG. 1, communications mapping apparatus such as communications mapping apparatus 201 in FIG. 2, policy apparatus such as policy apparatus 301 in FIG. 3, lookup apparatus such as lookup apparatus 401 in FIG. 4, publishing apparatus such as publishing apparatus 501 in FIG. 5, root server connector apparatus such as root server connector apparatus 601 in FIG. 6, root server apparatus such as root server apparatus 701 in FIG. 7, root server policy apparatus such as root server policy apparatus 801 in FIG. 8, pooling apparatus such as pooling apparatus 901 in FIG. 9.

In an example discovery apparatus, there is a CPU 4201 connected 4202 to multi-level cache from cache level 1 to cache level C 4203. CPU 4201 connects 4204 to memory 4205 and connects 4206 to controller 4207.

Controller connects 4208 to GPU 4209, connects 4210 to general expansion ports 1 to m 4219 and connects 4211 to I/O 4212.

I/O has multiple ports 4116, and connects 4213 to I/O expansion ports 1 to i 4220, connects 4214 to audio 4218 and connects 4215 to firmware 4217.

Figure 43:
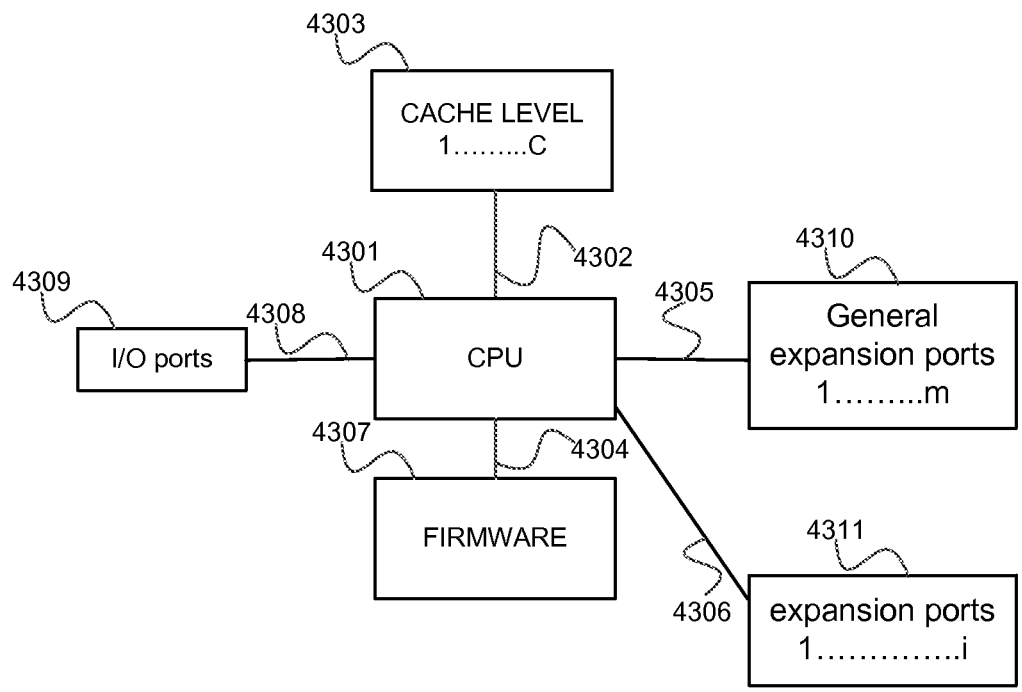
FIG. 43 illustrates an example hardware platform that may be used for discovery apparatus such as discovery apparatus 101 in FIG. 1, communications mapping apparatus such as communications mapping apparatus 201 in FIG. 2, policy apparatus such as policy apparatus 301 in FIG. 3, lookup apparatus such as lookup apparatus 401 in FIG. 4, publishing apparatus such as publishing apparatus 501 in FIG. 5, root server connector apparatus such as root server connector apparatus 601 in FIG. 6, root server apparatus such as root server apparatus 701 in FIG. 7, root server policy apparatus such as root server policy apparatus 801 in FIG. 8, pooling apparatus such as pooling apparatus 901 in FIG. 9.

FIG. 43 illustrates an example hardware platform that may be used for discovery apparatus such as discovery apparatus 101 in FIG. 1, communications mapping apparatus such as communications mapping apparatus 201 in FIG. 2, policy apparatus such as policy apparatus 301 in FIG. 3, lookup apparatus such as lookup apparatus 401 in FIG. 4, publishing apparatus such as publishing apparatus 501 in FIG. 5, root server connector apparatus such as root server connector apparatus 601 in FIG. 6, root server apparatus such as root server apparatus 701 in FIG. 7, root server policy apparatus such as root server policy apparatus 801 in FIG. 8, pooling apparatus such as pooling apparatus 901 in FIG. 9.

In an example discovery apparatus, there is a CPU 4301 with multi-level cache from cache level 1 to cache level C 4303. CPU 4301 connects 4304 to firmware 4307, connects 4308 to I/O ports 4309, connects 4305 to general expansion ports 1 to m 4310, connects 4306 to expansion ports 1 to i 4311.

This hardware configuration simplifies the circuit design by putting I/O in the CPU and may make the apparatus more energy, cost, space efficient.

Figure 44:
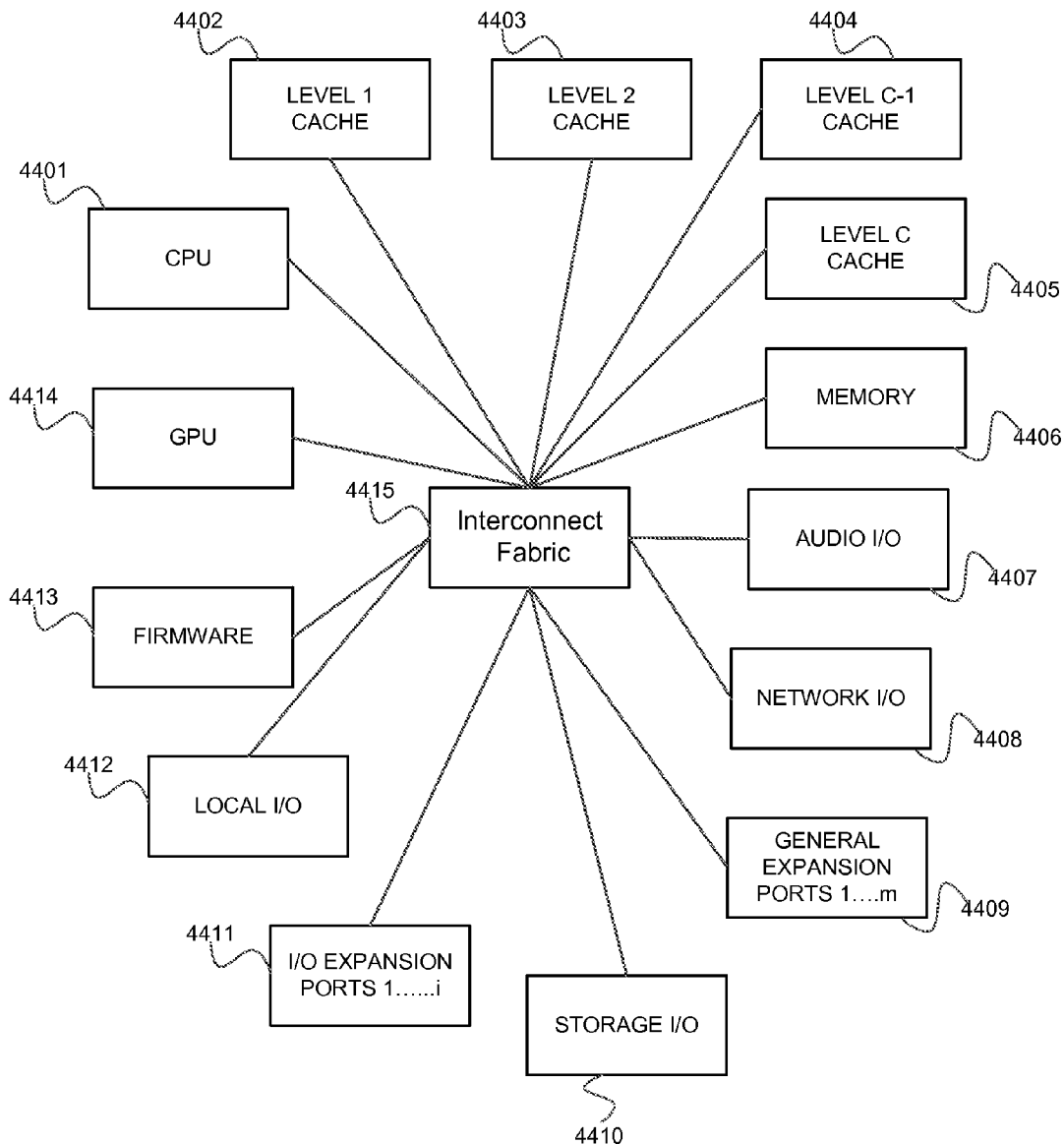
FIG. 44 illustrates an example hardware platform that may be used for discovery apparatus such as discovery apparatus 101 in FIG. 1, communications mapping apparatus such as communications mapping apparatus 201 in FIG. 2, policy apparatus such as policy apparatus 301 in FIG. 3, lookup apparatus such as lookup apparatus 401 in FIG. 4, publishing apparatus such as publishing apparatus 501 in FIG. 5, root server connector apparatus such as root server connector apparatus 601 in FIG. 6, root server apparatus such as root server apparatus 701 in FIG. 7, root server policy apparatus such as root server policy apparatus 801 in FIG. 8, pooling apparatus such as pooling apparatus 901 in FIG. 9.

FIG. 44 illustrates an example hardware platform that may be used for discovery apparatus such as discovery apparatus 101 in FIG. 1, communications mapping apparatus such as communications mapping apparatus 201 in FIG. 2, policy apparatus such as policy apparatus 301 in FIG. 3, lookup apparatus such as lookup apparatus 401 in FIG. 4, publishing apparatus such as publishing apparatus 501 in FIG. 5, root server connector apparatus such as root server connector apparatus 601 in FIG. 6, root server apparatus such as root server apparatus 701 in FIG. 7, root server policy apparatus such as root server policy apparatus 801 in FIG. 8, pooling apparatus such as pooling apparatus 901 in FIG. 9.

In an example discovery apparatus, there is a central interconnect fabric 4415 which may connect any component to any component directly.

Interconnect fabric 4415 connects one or more of the CPU 4401, level 1 4402, level 2 4403, level C-1 4404 to level C cache 4405, memory 4406, audio I/O 4407, network I/O 4408, general expansion ports 1 to m 4409, storage I/O 4410, I/O expansion ports 1 to l 4411, local I/O 4412, firmware 4413, GPU 4414.

Interconnect fabric may connect any component to any component over a dedicated channel that is established between two components over interconnect fabric. This allows any to any communication without effecting or disrupting the communications between other components. If two or more components need to communicate with same component, such as both CPU and GPU needs memory access, an arbitration process with priority schemes makes sure they have their turns to be able to communicate.

Having dedicated communications between components in a system or apparatus may allow removal of common bus bottleneck.

In other embodiments, there may be two or more interconnect fabrics interconnected in a way that each interconnect fabric may access other interconnect fabrics directly or through another interconnect fabric.

Interconnect fabric may have features like prioritization of communications such as giving CPU highest access to any resource, queuing of communications such as requests from storage queued and served by storage when storage becomes responsive, buffering communications such as data waiting to be written to storage is buffered and written when storage becomes responsive, multilevel queuing with multilevel priority communications such as memory access with four different queues for CPU, GPU, storage and the rest of the components and giving the highest priority to queue 1 for CPU, then queue 2 for GPU, then queue 3 for storage and then queue 4 for the rest of components. Other features may be security and access control to allow/disallow certain components to communicate with certain other components.

Embodiment described herein may be used for other computing applications other than the discovery apparatus and systems.

Figure 45:
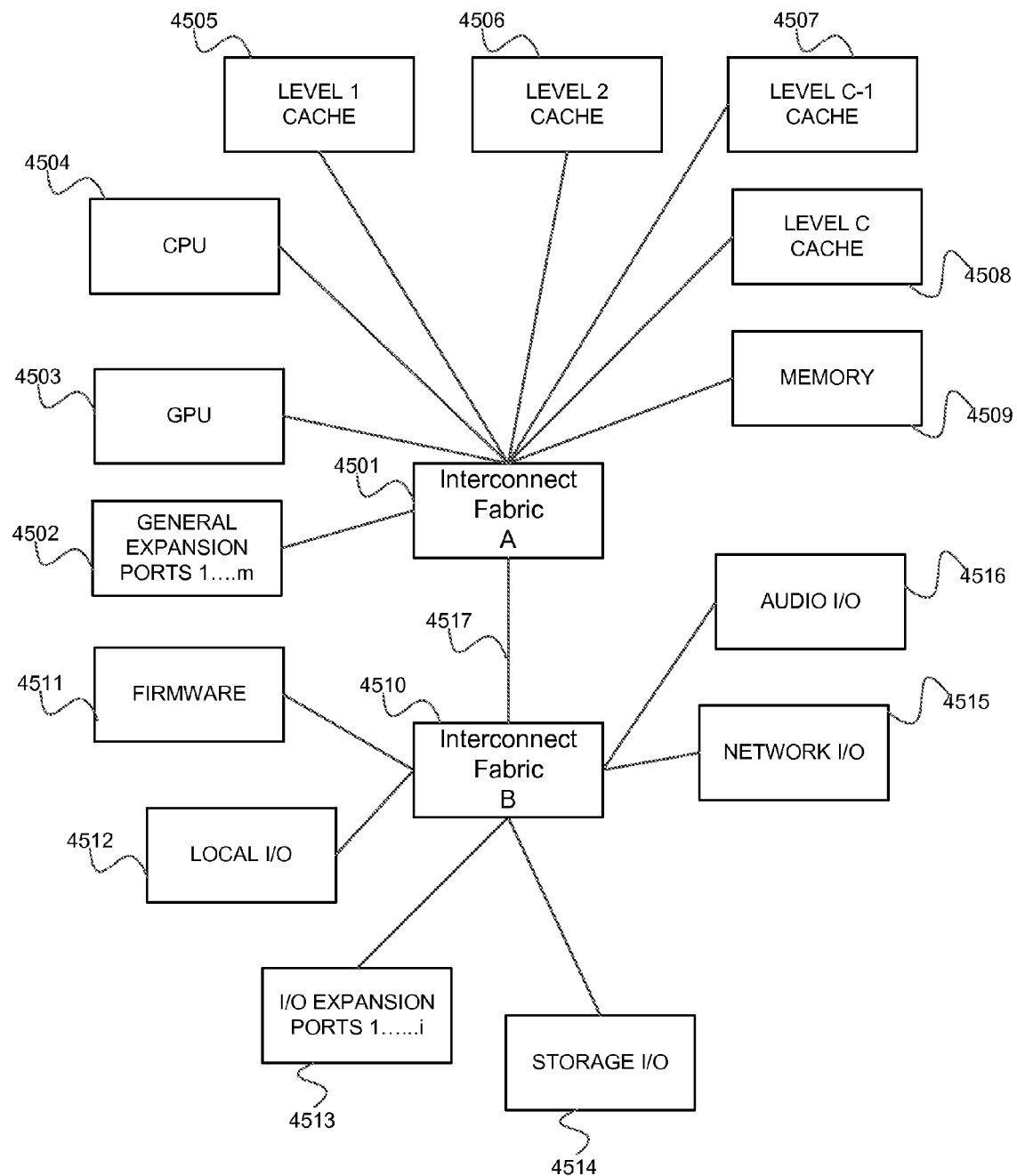
FIG. 45 illustrates an example hardware platform that may be used for discovery apparatus such as discovery apparatus 101 in FIG. 1, communications mapping apparatus such as communications mapping apparatus 201 in FIG. 2, policy apparatus such as policy apparatus 301 in FIG. 3, lookup apparatus such as lookup apparatus 401 in FIG. 4, publishing apparatus such as publishing apparatus 501 in FIG. 5, root server connector apparatus such as root server connector apparatus 601 in FIG. 6, root server apparatus such as root server apparatus 701 in FIG. 7, root server policy apparatus such as root server policy apparatus 801 in FIG. 8, pooling apparatus such as pooling apparatus 901 in FIG. 9.

FIG. 45 illustrates an example hardware platform that may be used for discovery apparatus such as discovery apparatus 101 in FIG. 1, communications mapping apparatus such as communications mapping apparatus 201 in FIG. 2, policy apparatus such as policy apparatus 301 in FIG. 3, lookup apparatus such as lookup apparatus 401 in FIG. 4, publishing apparatus such as publishing apparatus 501 in FIG. 5, root server connector apparatus such as root server connector apparatus 601 in FIG. 6, root server apparatus such as root server apparatus 701 in FIG. 7, root server policy apparatus such as root server policy apparatus 801 in FIG. 8, pooling apparatus such as pooling apparatus 901 in FIG. 9.

In an example discovery apparatus, there are at least two central interconnect fabrics which may connect any component to any component directly. Interconnect fabrics also connect to each other directly.

In this example, interconnect fabric A 4501 connects one or more of the CPU 4504, level 1 4505, level 2 4506, level C−1 4607 to level C cache 4508, memory 4509, GPU 4503, general expansion ports 1 to m 4502.

Interconnect fabric A 4501 connects 4517 to interconnect fabric B 4510.

Interconnect fabric B connects one or more of audio I/O 4516, network I/O 4515, storage I/O 4514, I/O expansion ports 1 to l 4513, local I/O 4512, firmware 4511.

Interconnect fabric A 4501 may connect any component to any component over a dedicated channel that is established between two components that is connected over interconnect fabric A 4501. This allows any to any communication without effecting or disrupting the communications between other components. If two or more components need to communicate with same component, an arbitration process with priority schemes makes sure they have their turns to be able to communicate.

Interconnect fabric B 4510 may connect any component to any component over a dedicated channel that is established between two components that is connected over interconnect fabric B 4510. This allows any to any communication without effecting or disrupting the communications between other components. If two or more components need to communicate with same component, an arbitration process with priority schemes makes sure they have their turns to be able to communicate.

Devices connected to interconnect fabric A 4501 may communicate with devices on interconnect fabric B 4510 over connection 4517 between interconnect fabric A 4501 and interconnect fabric B 4510.

Having dedicated communications between components in a system may allow removal of common bus bottleneck.

In other embodiments, there may be two or more interconnect fabrics interconnected in a way that each interconnect fabric may access other interconnect fabrics directly or through another interconnect fabric.

Interconnect fabric may have features like prioritization of communications such as giving CPU highest access to any resource, queuing of communications such as requests from storage, buffering communications such as data waiting to be written to storage, multilevel queuing with multilevel priority communications such as memory access with four different queues for CPU, GPU, storage and the rest of the components and giving the highest priority to queue for CPU, then queue for GPU, then queue for storage and then queue for the rest of components. Other features may be security and access control to allow/disallow certain components to communicate with certain other components.

Embodiment described herein may be used for other computing applications other than the discovery apparatus and systems.

Figure 46:
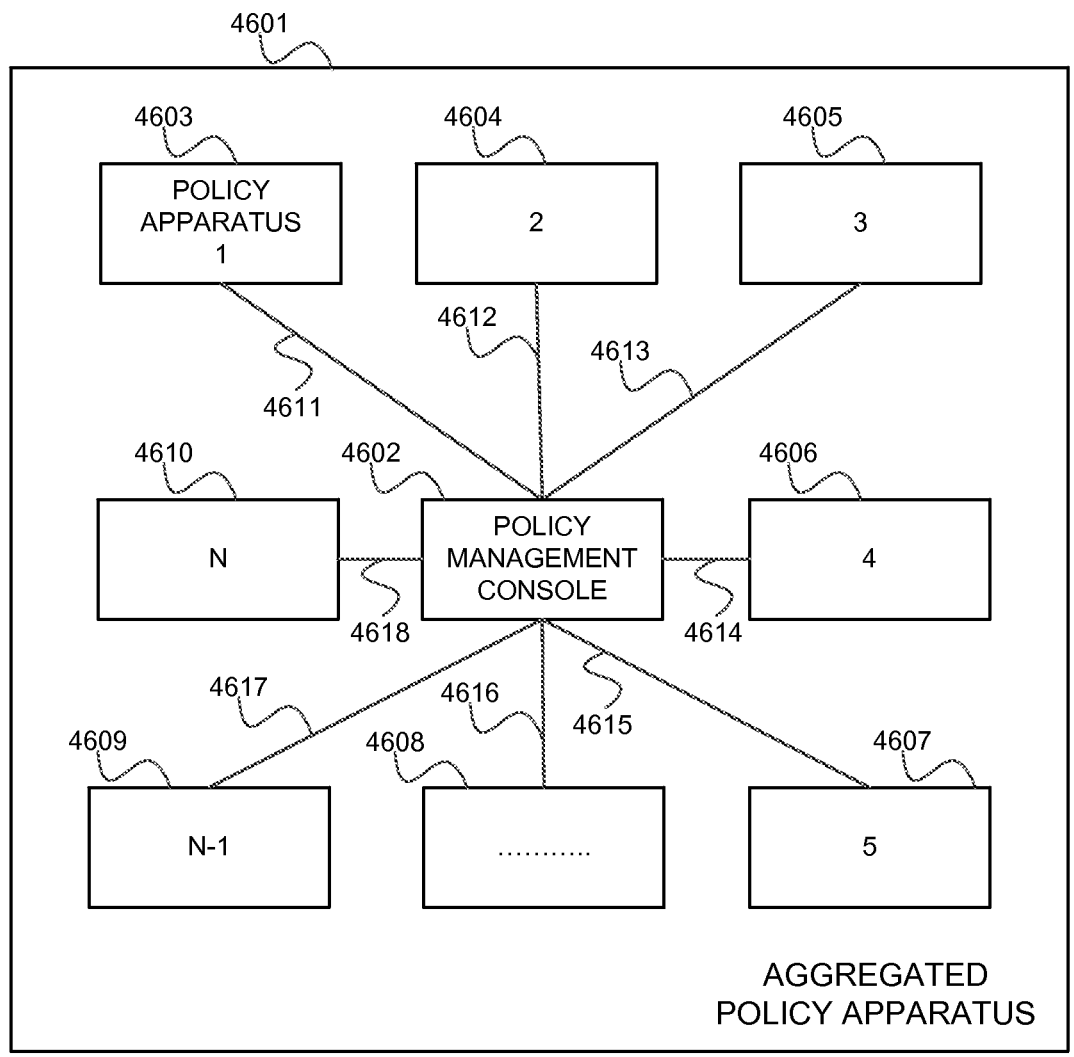
FIG. 46 illustrates an example aggregated policy apparatus such as policy apparatus 301 in FIG. 3.

FIG. 46 illustrates an example aggregated policy apparatus such as policy apparatus 301 in FIG. 3.

In FIG. 46, an aggregated policy apparatus 4601 has a policy management console 4602 and one or more policy apparatuses 1 4603, 2 4604, 3 4605, 4 4606, 5 4607, between 5 and N−1 4608, N−1 4609 to N 4610.

Policy management console 4602 may communicate to policy apparatuses 1, 2, 3, 4, 5, between 5 and N−1, and N and configure them as shown by 4611, 4612, 4613, 4614, 4615, 4616, 4617, 4618 respectively.

FIG. 47 illustrates an example of initial discovery method.

In this example, initial discovery method, which may be used by discovery apparatus, keeps a database of all known devices.

When started 4701, in order to discover devices with minimal or no user interaction, initial discovery method gathers a master list of commands for each device 4702. If device supports multiple command sets such as CLI, XML, etc., then all those commands are added to master database. If device has multiple connection methods such as Ethernet, RS232 serial, all those are added to database. If each connection method uses a different command set that is added to database. If there are multiple firmware versions of the device and for each firmware version there are different command sets that is added to database.

After building the database, initial discovery method builds a list of unique commands that only exist in one device and not others. This means if the command is unique to one device only, and when that command is sent to a device we receive a response as specified in the command definition, then we may deduct that device we are talking to is the device that command belongs to. Next step is to build a list that belongs to two devices, then a list with commands that build to 3 devices, 4 devices, N devices, where N is the maximum number of devices known to initial discovery method.

Using the lists of unique commands, and list commands that belong to 2 to N devices, a decision tree is built 4703 which allows running commands in order and with every run the possibility of the devices are narrowing down.

Once the decision tree is built, initial discovery method starts querying the devices 4704 by going through the decision tree. If all devices are identified, initial discovery method reports them, if there are unidentified devices left, initial discovery method requests operator or system to identify/clarify unidentified devices 4705 and then ends 4706.

If a device may not be identified it may be because it may not be in the database, or it may not allow two way communications to receive feedback to commands being sent, which means external assistance may be needed.

Figure 48:
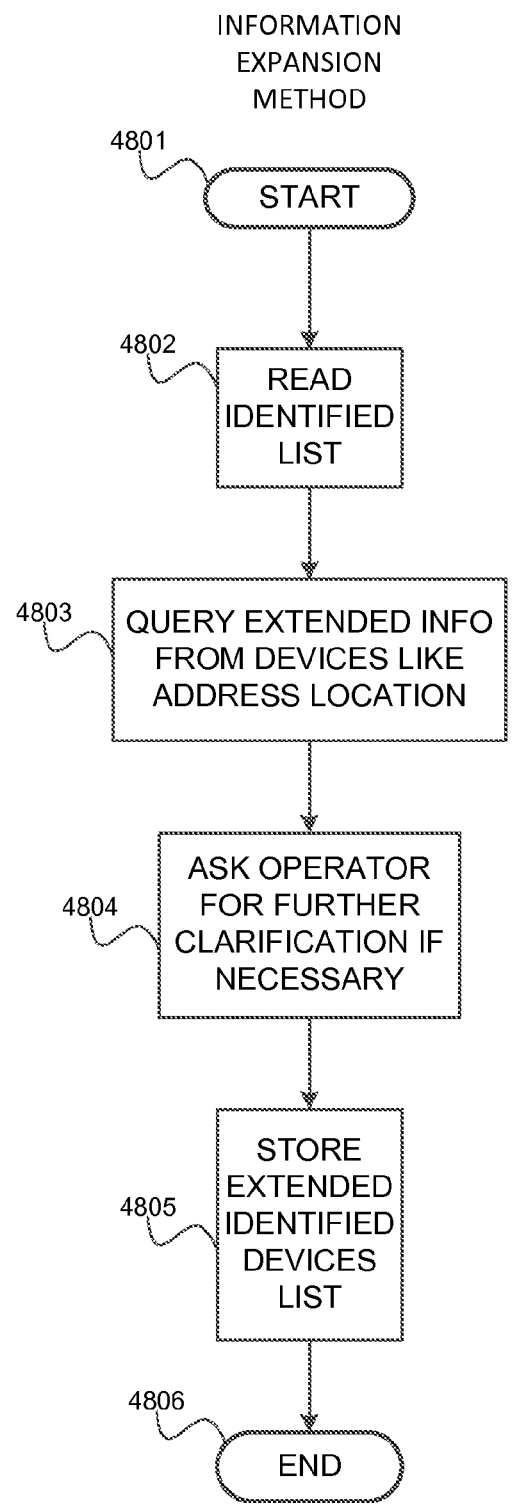
FIG. 48 illustrates an information expansion method

FIG. 48 illustrates an information expansion method.

Information expansion method expands the information about the devices identified.

When process starts 4801, information expansion method reads the list of identified devices 4802.

It then queries the devices for extended information such as address, location, connections to other devices, status of ports or components, etc. 4903.

If some information needs to be clarified by operator or external input information expansion method asks for that information 4804.

Once extended information is collected extended identified devices list is stored 4805 and process ends 4806.

Figure 49:
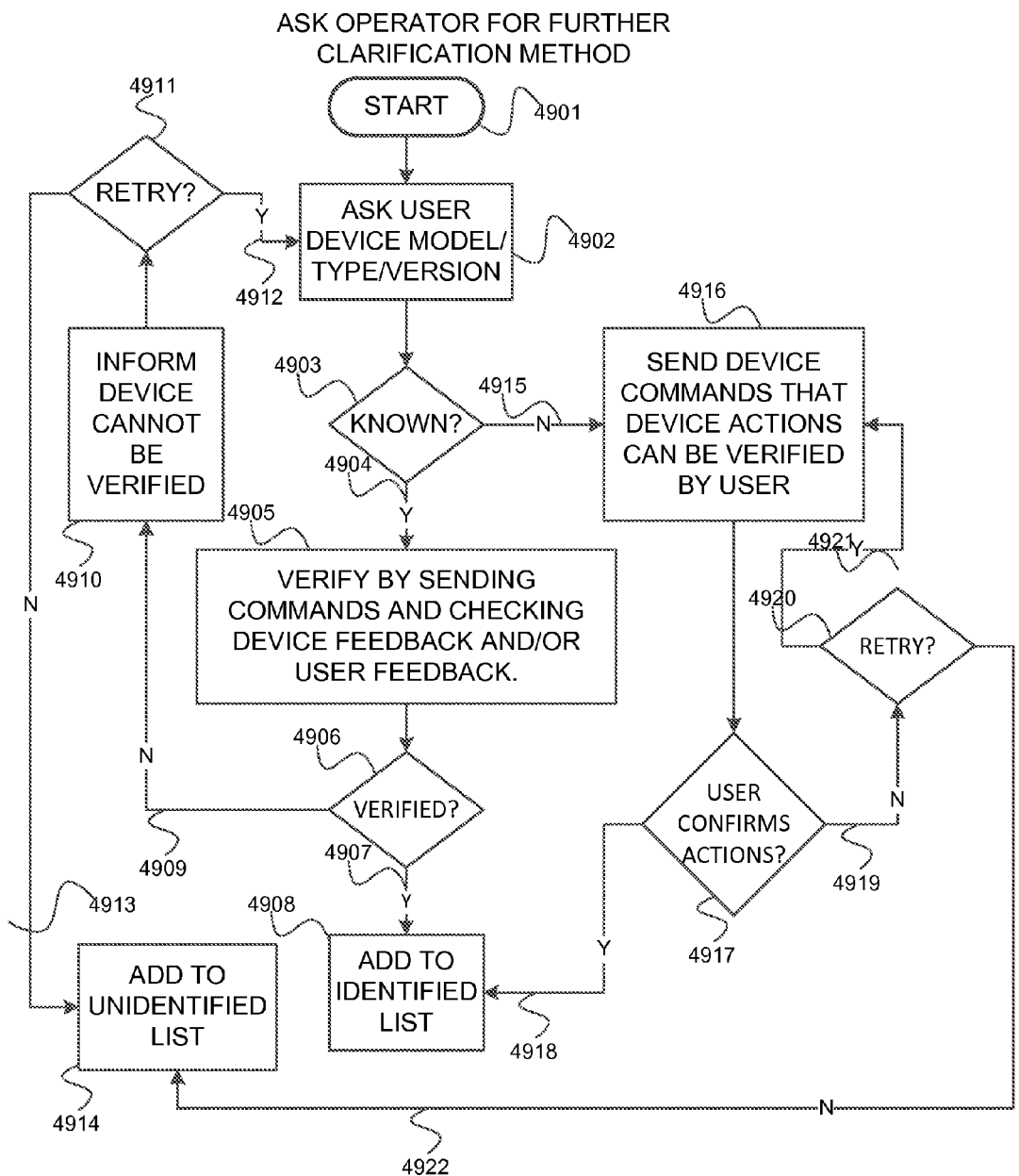
FIG. 49 illustrates an ask operator for further clarification method

FIG. 49 illustrates an ask operator for further clarification method.

When process starts 4901 method asks user device/model/type/version/firmware version and any other information that may exist about the device 4902.

Next, whether the device is known 4903 determined. If it is a known device 4904, method sends commands to device 4916 and checks device feedback for positive response or user feedback if device may not send a feedback due to one way communication 4917.

If device is verified 4918, it is added to verified list 4908.

If it is not verified 4919, user is informed as device may not be identified and user is asked whether user wants to retry 4920, if user chooses retry 4921 process goes back to beginning, if user chooses not to retry 4922, device is added to unidentified list 4914.

If the device is unknown 4904, then method may send commands to device from the decision tree, such as the decision tree created in initial discovery method explained in FIG. 47 and asks user to provide feedback 4905 or uses external components to get feedback such as light sensor to see whether lights are turning on. If command results are verified 4906 by user or external components, then device is added to identified list 4908. If command results are not verified, user is informed that device may not be verified 4910, and asked to retry 4911. If user retries 4912 the process goes to the beginning, otherwise 4913 it is added to unidentified list 4914.

FIG. 50 illustrates mapping method.

When process starts 5001, method finds devices that are in the same logical or physical area such as same network, communications, bus, etc. 5002.

Method finds information about extended information about the device, information about inter-device events, such as access speed, and delays for each device and for each access method the device might have 5003.

Method finds cost information, which may be stored in the device, databases, or input by user 5004.

Method finds cost of different access methods to a certain device from different devices inside and outside the organization.

Method creates a computer graph with nodes, vertexes, links, costing for each one of the extended information type and inter device information type 5005, such as a graph for delays, another for calling costs, another for available bandwidth, another one for signal to noise ratio etc. The graphs may be based on one parameter or combination of parameters, such as delay, packet loss and number of hops may be combined together with weights to create a graph which may be used to make a decision on which path the video conferencing will be transmitted through.

Method stores results in a device access map 5006.

Process ends 5007.

Figure 51:
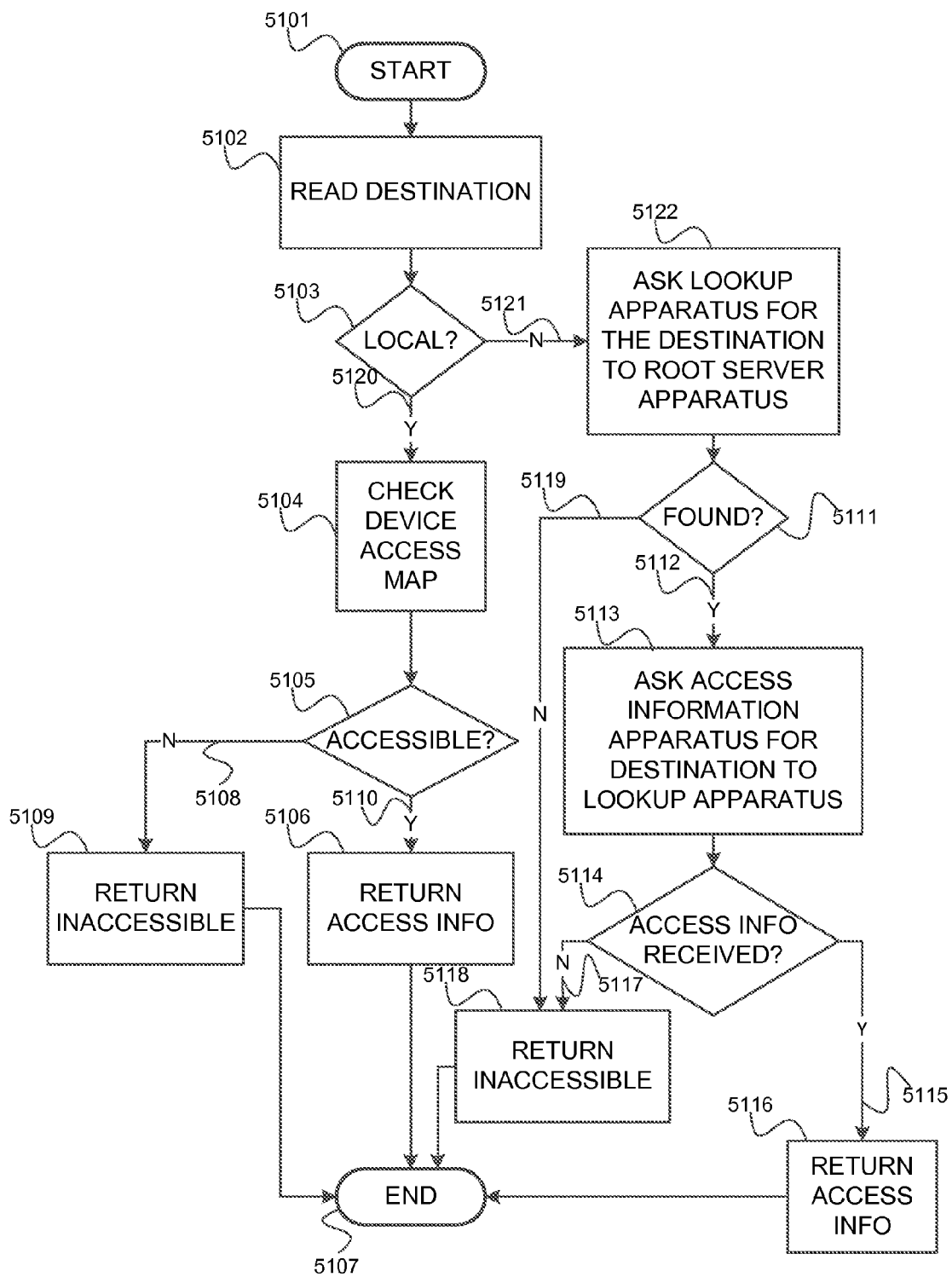
FIG. 51 illustrates lookup method

FIG. 51 illustrates lookup method.

When process starts 5101, method reads the destination that is being looked up 5102.

Next whether the destination is local or not is determined 5103. If destination is local 5120, destination access map is checked 5104, device accessibility is checked 5105, if destination access map shows device as accessible 5110, device access information is returned 5106 and process ends 5107. If device is inaccessible 5108, device inaccessible is returned 5109 and process ends 5107.

If device is not local 5121, root server apparatus is contacted and lookup apparatus for destination is asked 5122. Next, if lookup apparatus for destination is found 5111 is determined. If root server finds the lookup apparatus for the destination 5112, method asks access information for the destination to lookup apparatus 5113. If lookup apparatus is not found 5119, method returns inaccessible 5117 and then ends 5107. Next whether the access information is received determined 5114. If access information is received from remote lookup apparatus 5115, method returns access information 5116 and ends 5107. if remote lookup apparatus does not return access information 5117, method returns inaccessible 5118 and ends 5107.

Figure 52:
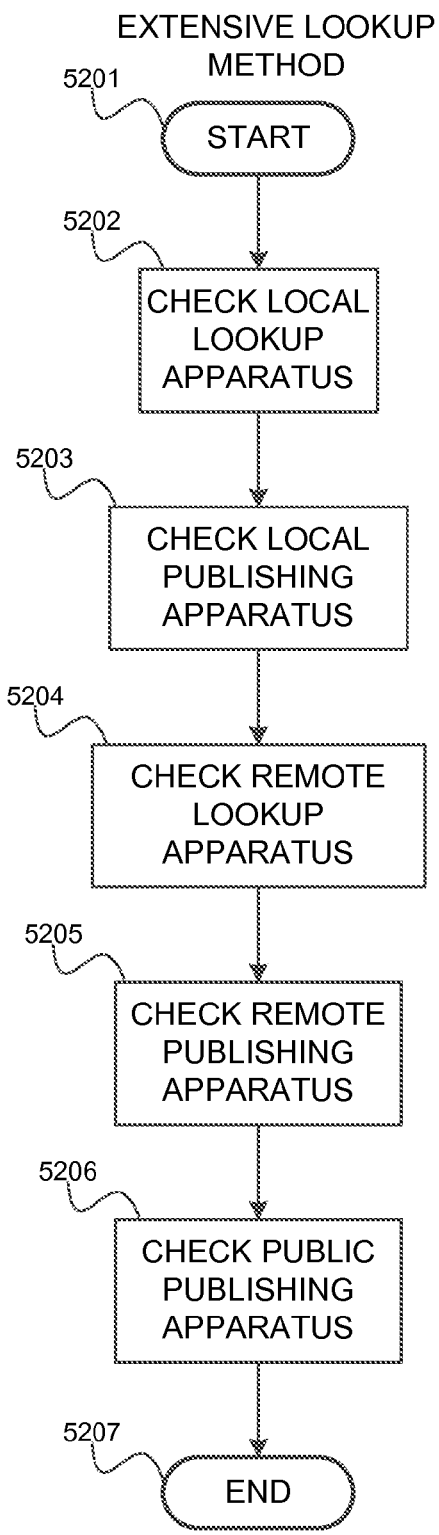
FIG. 52 illustrates extensive lookup method.

FIG. 52 illustrates extensive lookup method.

When process starts 5201, method checks local lookup apparatus and reports access information, if found 5202.

If not found, method checks local publishing apparatus and reports access information, if found 5203.

If not found, method checks remote lookup apparatus and reports access information, if found 5204.

If not found, method checks remote publishing apparatus and reports access information, if found 5205.

If not found, method checks public publishing apparatus and reports access information, if found 5206.

If still not found, returns inaccessible and ends 5207.

Figure 53:
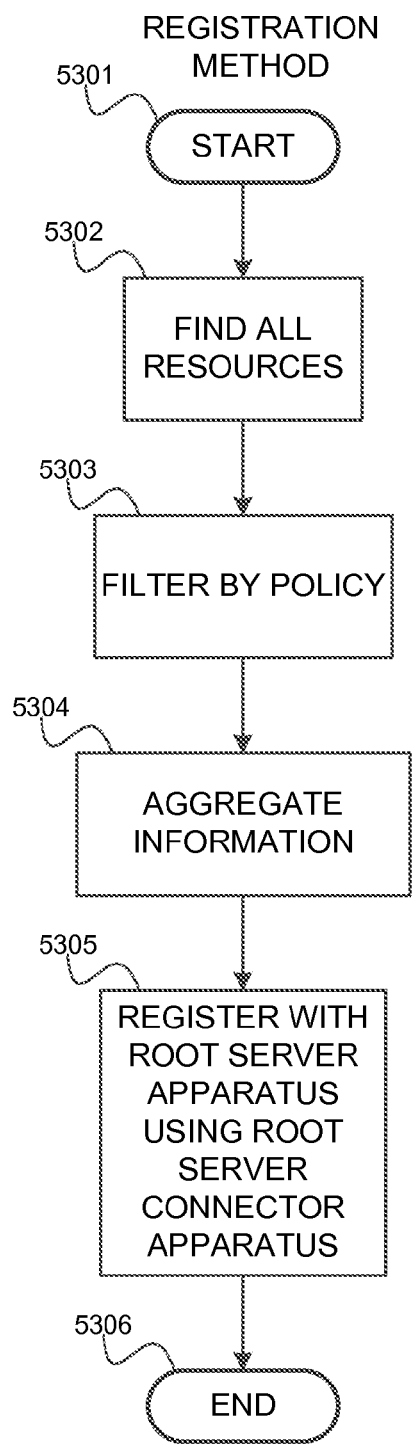
FIG. 53 illustrates registration method

FIG. 53 illustrates registration method.

When process starts 5301, method finds all resources that will be publicly available 5302.

Method applies policies to filter the information that complies with policies 5303.

Method aggregates and summarizes the information, if possible 5304.

Method registers the information with root server apparatus using root server connector apparatus 5305.

Process ends 5306.

Figure 54:
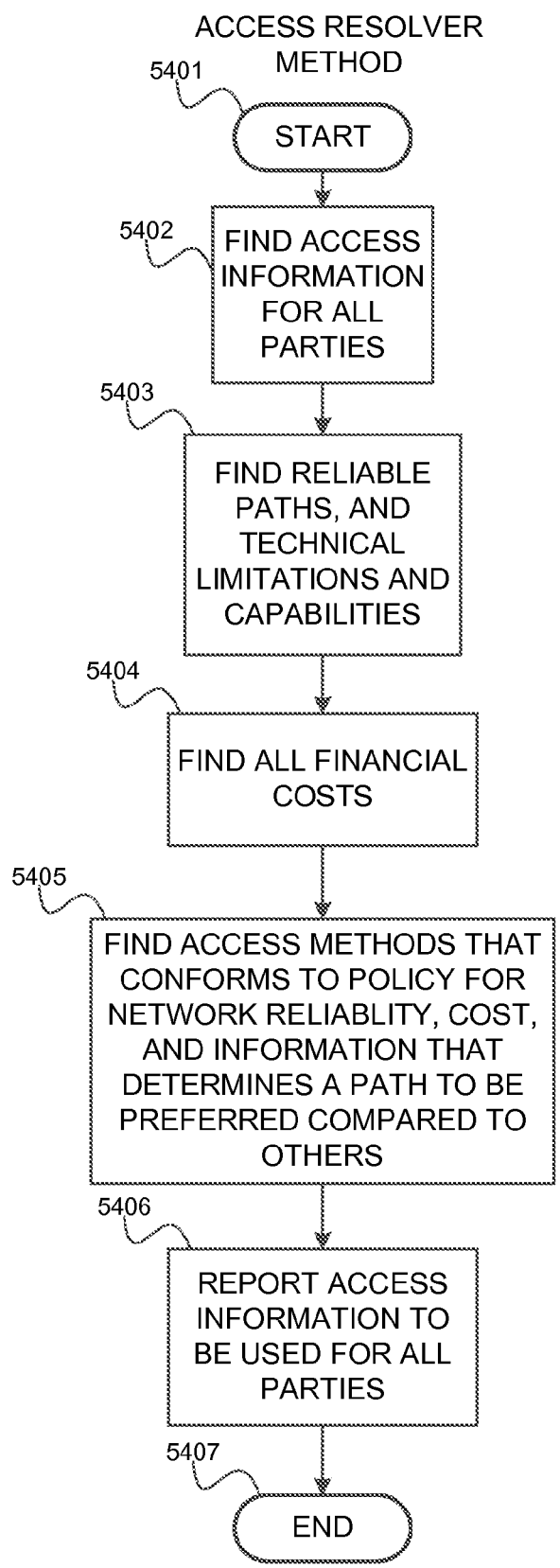
FIG. 54 illustrates access resolver method

FIG. 54 illustrates access resolver method.

When process starts 5401, method finds one or more access information for all parties in a conference call 5402. If a party has more than one way to be accessible, that is found and stored.

Method finds reliable paths, technical limitations and capabilities for each party and for multiple access methods each party might have 5403.

Method finds costs of conference call for each party and access methods 5404.

Method creates a matrix about the parties such as access methods, reliability, costs, etc. and filters the matrix by the policy for access methods to use, reliability, costs allowed by the policy 5405. For example a conference call may be required to be on ISDN, another may be required to be on cheapest line, another one may require very reliable line for an important board meeting with cost being secondary importance.

Based on the filtering, best access methods are found and reported 5406, process ends 5407.

Figure 55:
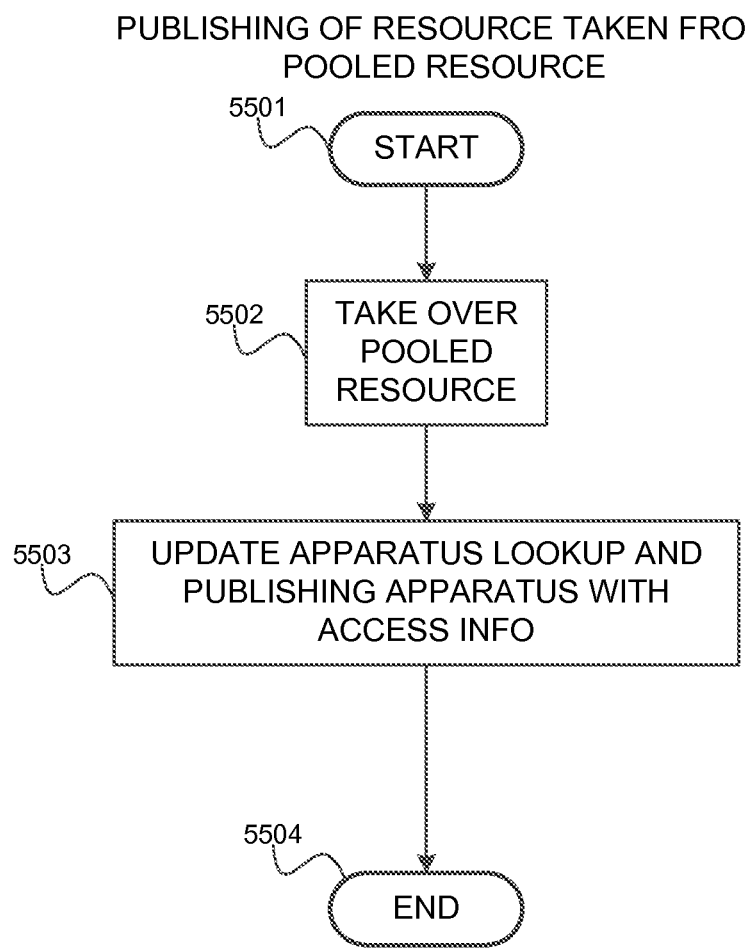
FIG. 55 illustrates publishing of resource taken from pooled resources method

FIG. 55 illustrates publishing of resource taken from pooled resources method Method, when started 5501, takes the resource from the pool 5502.

It updates lookup apparatus and publishing apparatus as resource not available 5503.

Method ends 5504.

Figure 56:
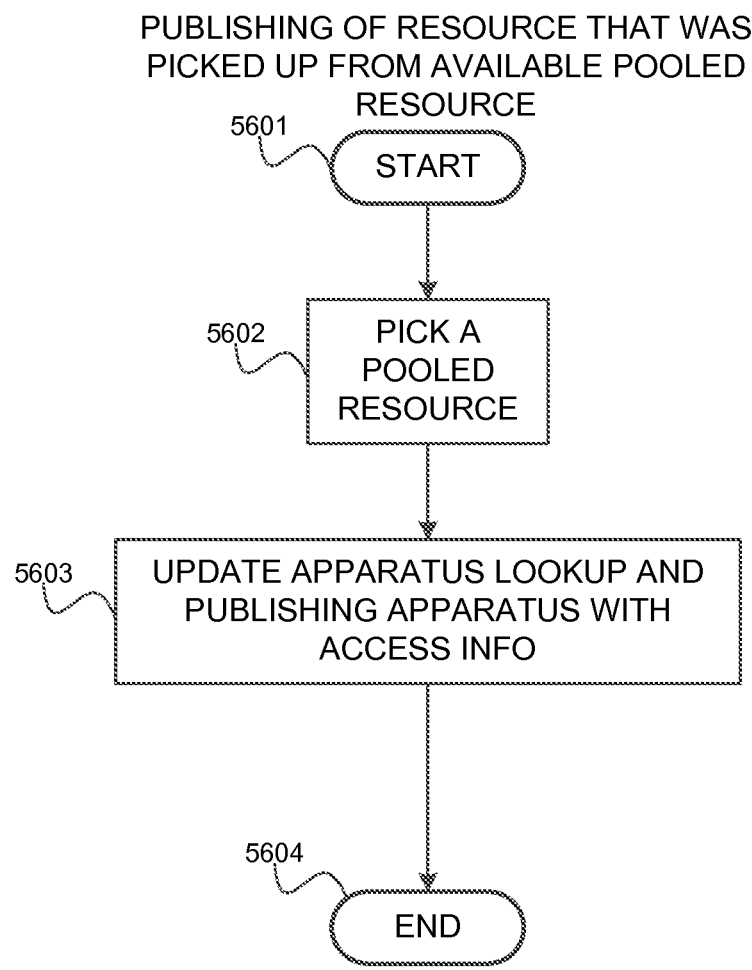
FIG. 56 illustrates publishing of resource that was picked up from available pooled resources method

FIG. 56 illustrates publishing of resource that was picked up from available pooled resources method.

Method, when started 5601, takes the resource from the pool by specific resource in the pool 5602.

It updates lookup apparatus and publishing apparatus as resource not available 5603. Method ends 5604.

I claim:

1. A system, comprising:
    a discovery apparatus configured to discover a plurality of devices of an organization;
    a communications mapping apparatus configured to create a mapping of the plurality of devices of the organization discovered by the discovery apparatus;
    a publishing apparatus configured to provide public information about the organization based on communications received from the communications mapping apparatus;
    a root server connector apparatus configured to register itself as a point of contact for the organization with a root server, wherein the root server connector apparatus is further configured to publish access information for the communications mapping apparatus, publishing apparatus, or both;
    a lookup apparatus configured to provide lookup services and also to communicate with the communications mapping apparatus to respond to requests from outside the system, wherein the lookup apparatus comprises:
        a caching engine configured to store information;
        a storage configured to store information; and
        a lookup engine configured to look up requested information from a direct connection, the caching engine, or the storage; and
    a policy apparatus configured to filter the information looked up by the lookup engine, wherein the policy apparatus comprises:
        an input buffer configured to buffer and prioritize information received from the lookup engine;
        decision criteria configured to store policy information;
        decision logic configured to process information from the input buffer based on the policy information stored by the decision criteria; and
        an output buffer configured to send the processed information to a policy apparatus output.

2. The system of claim 1, further comprising an email apparatus configured to be discovered by the discovery apparatus.

3. The system of claim 1, further comprising a calendaring apparatus configured to be discovered by the discovery apparatus.

4. The system of claim 1, wherein the root server is in the cloud.

5. The system of claim 1, wherein the discovery apparatus is connected to each of the plurality of devices over a connection.

6. The system of claim 5, wherein the connection is one of a group consisting of the following: wet contact switch, dry contact switch, data communication, analog circuit state, digital circuit state, serial communication, RS422, RS232, parallel communication, wireless communication, Bluetooth, Infrared, wired communication, interfaces with other apparatuses, interfaces with other systems, TCP/IP communications.

7. The system of claim 1, wherein the discover apparatus is further configured to identify device information about each of the plurality of devices.

8. The system of claim 7, wherein the device information includes at least one of a group consisting of the following: manufacturer of the device, model of the device, version of the device, firmware version, and systems that the device may have information about.

9. The system of claim 1, wherein the discovery apparatus comprises:
    a query engine configured to query information from the plurality of devices;
    a classifying engine configured to process information received from the plurality of devices and further to classify the information based on a plurality of classification parameters; and
    a referencing engine configured to send information to the communications mapping apparatus.

10. The system of claim 9, further comprising a storage configured to at least one of a group consisting of the following: the information from the query engine, the processed information from the classifying engine, and the information sent by the referencing engine.

11. The system of claim 1, wherein the communications mapping apparatus comprises:
    a graphing engine configured to query information from the discovery apparatus;
    a conflict resolution engine configured to process information received from the graphing engine and further to find conflicting information or missing information; and
    a reporting engine configured to send information to the publishing apparatus.

12. The system of claim 11, further comprising a storage configured to at least one of a group consisting of the following: the information from the graphing engine, the processed information from the conflict resolution engine, and the information sent by the reporting engine.

13. The system of claim 1, further comprising a proxy lookup apparatus comprising:
    at least one cache configured to store information;
    a storage configured to store information;
    a lookup engine configured to look up requested information from a cache or the storage; and
    a lookup proxy engine configured to look up requested information from a separate cache or the storage.

14. The system of claim 13, wherein the lookup proxy engine is further configured to communicate with the lookup apparatus.

* * * * *